US011690374B2

(12) United States Patent
Hampton et al.

(10) Patent No.: US 11,690,374 B2
(45) Date of Patent: Jul. 4, 2023

(54) BIOCONTROL COMPOSITIONS

(71) Applicant: Lincoln University, Lincoln (NZ)

(72) Inventors: John Graham Hampton, Christchurch (NZ); Eline Van Zijll De Jong, Lincoln (NZ)

(73) Assignee: Lincoln University, Lincoln (NZ)

(*) Notice: Subject to any disclaimer, the term of this patent is extended or adjusted under 35 U.S.C. 154(b) by 659 days.

(21) Appl. No.: 16/324,839

(22) PCT Filed: Aug. 3, 2017

(86) PCT No.: PCT/IB2017/054742
§ 371 (c)(1),
(2) Date: Feb. 11, 2019

(87) PCT Pub. No.: WO2018/029579
PCT Pub. Date: Feb. 15, 2018

(65) Prior Publication Data

US 2019/0343125 A1 Nov. 14, 2019

(30) Foreign Application Priority Data

Aug. 12, 2016 (NZ) ........................................ 723115

(51) Int. Cl.

| | |
|---|---|
| ***A01N 25/12*** | (2006.01) |
| ***A01N 25/00*** | (2006.01) |
| ***A01N 63/20*** | (2020.01) |

(52) U.S. Cl.
CPC ............. *A01N 25/00* (2013.01); *A01N 25/12* (2013.01); *A01N 63/20* (2020.01)

(58) Field of Classification Search
CPC ......... A01N 25/00; A01N 25/12; A01N 63/20
See application file for complete search history.

(56) References Cited

U.S. PATENT DOCUMENTS

| | | | |
|---|---|---|---|
| 5,888,501 | A | 3/1999 | Backman et al. |
| 10,004,236 | B2 | 6/2018 | Glare et al. |
| 2010/0266560 | A1 | 10/2010 | Swaminathan et al. |

FOREIGN PATENT DOCUMENTS

| | | |
|---|---|---|
| WO | WO 2008/023999 | 2/2008 |
| WO | WO 2009/061221 | 5/2009 |

OTHER PUBLICATIONS

Ateyyat Ma et al., Culturable Whitefly Associated Bacteria and Their Potential as Biological Control Agents, Jordan Journal of Biological Sciences, 2009,2:139-144, see abstract and pp. 140 and 141.*

Jafra S et al., Potential of bulb-associated bacteria for biocontrol of hyacinth soft rot caused by Dickeya zeae, Journal of Applied Microbiology, 2009,106:268-277 and Gen Bank Accession No. EF693789, Jan. 15, 2009.*

Jafra et al., Potential of bulb-associated bacteria for biocontrol of hyacinth soft rot caused by Dickeya zeae, 2008, Journal of Applied Microbiology, vol. 106, pp. 268-277. (Year: 2008).*

Lee et al., Microbiota on Spoiled Vegetables and Their Characterization, Journal of Food Protection, 2013, vol. 76 No. 8, pp. 1350-1358. (Year: 2013).*

Chinese Office Action, dated Sep. 21, 2020, corresponding to Chinese Patent Application No. 2017800465195, 10 pp.

Indian Examination Report dated Jan. 9, 2023 in corresponding Indian Patent Application No. 201817047886.

Cho et al. (2007) "Endophytic Bacterial Communities in Ginseng and their Antifungal Activity Against Pathogens," Microbial Ecology 54(2): 341-351.

Extended European Search Report, dated Jan. 8, 2020, corresponding to European Patent Application No. 17838887.2, 10 pp.

Rasche et al. (2006) "Structural characteristics and plant-beneficial effects of bacteria colonizing the shoots of field grown conventional and genetically modified T4-lysozyme producing potatoes," Plant Soil 289(1-2): 123-140.

Ateyyat et al. (2009) "Culturable Whitefly Associated Bacteria and Their Potential as Biological Control Agents," Jordan Journal of Biological Sciences 2(3): 139-144.

Berg et al. (2005) "PCR-based detection of *Xanthomonas campestris* pathovars in *Brassica* seed," Plant Pathol 54: 416-427.

Brenner et al. (1994) "'*Erwinia nulandii*' Is a Subjective Synonym of *Erwinia persicinus*," International Journal of Systematic Bacteriology 44: 282-284.

Chun et al. (2007) "EzTaxon: A web-based tool for the identification of prokaryotes based on 16S ribosomal RNA gene sequences," Int J Syst Evol Micr 57: 2259-2261.

Cook et al. (1986) "Active resistance of cabbage (*Brassica oleracea*) to *Xanthomonas campestris* pv. *carotae* and protection against the causal agent of black rot *X.campestris* pv. *campestris*, by co-inoculation," Physiological and Molecular Plant Pathology 28: 41-52.

Danielson et al. (1973) "The Abundance of Trichoderma Propagules and the Distribution of Species in Forest Soils," Soil Biol. Biochem 5: 485-494.

Desai et al. (Oct. 2015) "Draft genome sequences of two New Zealand *Xanthomonas campestris* pv. *campestris* isolates, ICMP 4013 and ICMP 21080," Genome Announcements 3(5): 1-2 (e01247-15).

GenBank Accession No. EF693789, Jan. 15, 2009.

GenBank Accession No. KJ130483, Mar. 18, 2014.

Goryluk-Salmonowicz et al. (Sep. 2016) "Endophytic Detection in Selected European Herbal Plants," Polish Journal of Microbiology 65(3): 369-375.

Hao et al. (1990) "*Erwinia percisinus*, a new species isolated from plants," Int J Syst Bacteriol. 40(4): 379-383.

(Continued)

*Primary Examiner* — Ali Soroush
(74) *Attorney, Agent, or Firm* — Leydig, Voit & Mayer, Ltd.

(57) ABSTRACT

The invention provides isolated *Erwinia persicina* strains with activity against: a) at least one *Xanthomonas* species, and/or b) at least one Brassicaceae pathogen. In particular the invention provides the isolated *E. persicina* strains deposited as DSM 32302, DSM 32304, DSM 32305 and DSM 32303. The invention provides compositions comprising one or more strains of the invention. The invention also provides methods of use of one or more strains or compositions of the inventions to control plant pathogens, particularly *Xanthomonas campestris* pv. *campestris*.

12 Claims, 49 Drawing Sheets

Specification includes a Sequence Listing.

(56) References Cited

OTHER PUBLICATIONS

Hasegawa et al. (1985) "Dating the human-ape splitting by a molecular clock of mitochondrial DNA," Journal of Molecular Evolution 22: 160-174.
Hauben et al. (2005) "Family I. Enterobacteriaceae, Genus *XIII*," Erwinia in Bergey's Manual of Systematic Bacteriology, Second Edition, vol. Two The Proteobacteria, Part B The Gammaproteobacteria. Editors vol. Two: Brenner, D.J., Krieg, N. R., and Staley, J. T. Editor-in-Chief: Garrity, G. M. Springer USA. pp. 670 -679.
International Preliminary Report on Patentability, dated Jul. 5, 2018, corresponding to International Application No. PCT/IB2017/054742 (filed Aug. 3, 2017) 20 pp.
Jafra et al. (2009) "Potential of bulb-associated bacteria for biocontrol of hyacinth soft rot caused by *Dickeya zeae*," Journal of Applied Microbiology 106: 268-277.
Kang et al. (2014) "A Plant Growth-Promoting Rhizobacteria (PGPR) Mixture Does Not Display Synergistic Effects, Likely by Biofilm But Not Growth Inhibition," Microbiology 83(5): 666-673.
Kimura (1980) "A simple method for estimating evolutionary rate of base substitutions through comparative studies of nucleotide sequences," Journal of Molecular Evolution 16: 111-120.
Kwon et al. (1997) "Phylogenetic Analysis of *Erwinia* Species Based on 16S rRNA Gene Sequences," International Journal of Systematic Bateriology 47(4): 1061-1067.
Lee et al. (2013) "Microbiota on Spoiled Vegetables and Their Characterization," Journal of Food Protection 76(8): 1350-1358.
Leslie et al. (1995) "Trehalose and Sucrose Protect Both Membranes and Proteins in Intact Bacteria during Drying," Applied and Environmental Microbiology 61(10): 3592-3597.
Lipson et al. (2004) "Seasonal changes in an alpine soil bacterial community in the Colorado Rocky Mountains," Applied and Environmental Microbiology 70(5): 2867-2879.
Nayaka et al. (2010) "Seed biopriming with novel strain of *Trichoderma harzianum* for the control of toxigenic *Fusarium verticillioides* and fumonisins in maize," Archives of Phytopathology and Plant Protection 43(3): 264-282.
Ownley et al. (2008) "*Beauveria bassiana*: Endophytic colonization and plant disease control," Journal of Invertebrate Pathology 98: 267-270.
Parkinson et al. (2007) "Phylogenetic analysis of *Xanthomonas* species by comparison of partial gyrase B gene sequences," Int J Syst Evol Micr 57: 2881-2887.
Raaijmakers et al. (1995) "Dose-Response Relationships in Biological Control of Fusarium Wilt of Radish by *Pseudomonas* spp," Biological Control 85(10): 1075-1081.
Roberts et al. (2006) "7-019: Detection of *Xanthomonas campestris* pv. *campestris* on *Brassica* spp.," Bassersdorf: International Seed Testing Association (ISTA), 16 pp.
Roberts et al. (2007) "Modelling the spread of *Xanthomonas campestris* pv. *campestris* in module-raised brassica transplants," Plant Pathology 56: 391-401.
Schaad et al. (1980) "Relationship of incidence of seedborne *Xanthomonas campestris* to black rot of crucifers," Plant Disease 64(1): 91-92.
Schuster et al. (1981) "A New Bacterium Pathogenic For Beans (*Phaseolus vulgaris* L.)," Fitopatologia Brasileira 6: 345-358.
Search Report and Written Opinion, dated Oct. 19, 2017, corresponding to International Application No. PCT/IB2017/054742 (filed Aug. 3, 2017) 10 pp.
Shen et al. (2012) "Effect of Plant Growth-promoting Rhizobacteria (PGPRs) on plant growth, yield, and quality of tomato (*Lycopersicon esculentum* Mill.) under simulated seawater irrigation," J Gen Appl Microbiol 58: 253-262.
Swaminathan et al. (publicly available Nov. 2015) "Formulations for delivering *Trichoderma atroviridae* spores as seed coatings, effects of temperature and relative humidity on storage stability," Journal of Applied Microbiology 120: 425-431 (published Feb. 2016).
Tamura (1992) "Estimation of the number of nucleotide substitutions when there are strong transition-transversion and G + C-content biases," Molecular Biology and Evolution 9(4): 678-687.
Tamura et al. (1993) "Estimation of the No. of nucleotide substitutions in the control region of mitochondrial DNA in humans and chimpanzees," Molecular Biology and Evolution 10(3): 512-526.
Tamura et al. (2013) "MEGA6: Molecular Evolutionary Genetics Analysis version 6.0," Molecular Biology and Evolution 30(12): 2725-2729.
Wessman et al. (2013) "Formulations for freeze-drying of bacteria and their influence on cell survival," Journal of Visualized Experiments 78: e4058, doi:10.3791/4058, pp. 1-5.
Zhang et al. (2000) "A greedy algorithm for aligning DNA sequences," J Comput Biol 7(1/2): 203-214.

* cited by examiner

FIGURE 1

| Target gene | Primer name | Primer sequence (5'-3') | Expected product size (bp) |
|---|---|---|---|
| *dnaJ* | EpdnaJ1F | TGGAAGAAGCGGTACGCGGC (SEQ ID NO:17) | 686 |
| | EpdnaJ1R | ACCGGATGGACCGCCAAAGC (SEQ ID NO:18) | |
| *gapDH* | EpgapDH1F | TGGCACCGTGGAAGTCAAAGACG (SEQ ID NO:19) | 425 |
| | EpgapDH1F | CGCCGCGCCAGTCTTTGTGA (SEQ ID NO:20) | |
| *recA* | EprecA1F | CTGACGCTGCAGGTTATCGCT (SEQ ID NO:21) | 551 |
| | EprecA1R | GCCTGTTTAAACGGTGCTGCG (SEQ ID NO:22) | |

(B)

(C)

```
1  AGTCGAACGGTAGCACAGAGAGCTTGCTCTCGGGTGACGAGTGGCGGACGGGTGAGTAATGTC
5  AGTCGAACGGTAGCACAGAGAGCTTGCTCTCGGGTGACGAGTGGCGGACGGGTGAGTAATGTC
9  AGTCGAACGGTAGCACAGAGAGCTTGCTCTCGGGTGACGAGTGGCGGACGGGTGAGTAATGTC
13 AGTCGAACGGTAGCACAGAGAGCTTGCTCTCGGGTGACGAGTGGCGGACGGGTGAGTAATGTC

1  TGGGAAACTGCCCGATGGAGGGGGATAACTACTGGAAACGGTAGCTAATACCGCATAACGTCTT
5  TGGGAAACTGCCCGATGGAGGGGGATAACTACTGGAAACGGTAGCTAATACCGCATAACGTCTT
9  TGGGAAACTGCCCGATGGAGGGGGATAACTACTGGAAACGGTAGCTAATACCGCATAACGTCTT
13 TGGGAAACTGCCCGATGGAGGGGGATAACTACTGGAAACGGTAGCTAATACCGCATAACGTCTT

1  CGGACCAAAGTGGGGGACCTTCGGGCCTCACACCATCGGATGTGCCCAGATGGGATTAGCTAG
5  CGGACCAAAGTGGGGGACCTTCGGGCCTCACACCATCGGATGTGCCCAGATGGGATTAGCTAG
9  CGGACCAAAGTGGGGGACCTTCGGGCCTCACACCATCGGATGTGCCCAGATGGGATTAGCTAG
13 CGGACCAAAGTGGGGGACCTTCGGGCCTCACACCATCGGATGTGCCCAGATGGGATTAGCTAG

1  TAGGTGGGGTAACGGCTCACCTAGGCGACGATCCCTAGCTGGTCTGAGAGGATGACCAGCCAC
5  TAGGTGGGGTAACGGCTCACCTAGGCGACGATCCCTAGCTGGTCTGAGAGGATGACCAGCCAC
9  TAGGTGGGGTAACGGCTCACCTAGGCGACGATCCCTAGCTGGTCTGAGAGGATGACCAGCCAC
13 TAGGTGGGGTAACGGCTCACCTAGGCGACGATCCCTAGCTGGTCTGAGAGGATGACCAGCCAC

1  ACTGGAACTGAGACACGGTCCAGACTCCTACGGGAGGCAGCAGTGGGGAATATTGCACAATGG
5  ACTGGAACTGAGACACGGTCCAGACTCCTACGGGAGGCAGCAGTGGGGAATATTGCACAATGG
9  ACTGGAACTGAGACACGGTCCAGACTCCTACGGGAGGCAGCAGTGGGGAATATTGCACAATGG
13 ACTGGAACTGAGACACGGTCCAGACTCCTACGGGAGGCAGCAGTGGGGAATATTGCACAATGG

1  GCGCAAGCCTGATGCAGCCATGCCGCGTGTATGAAGAAGGCCTTCGGGTTGTAAAGTACTTTCA
5  GCGCAAGCCTGATGCAGCCATGCCGCGTGTATGAAGAAGGCCTTCGGGTTGTAAAGTACTTTCA
9  GCGCAAGCCTGATGCAGCCATGCCGCGTGTATGAAGAAGGCCTTCGGGTTGTAAAGTACTTTCA
13 GCGCAAGCCTGATGCAGCCATGCCGCGTGTATGAAGAAGGCCTTCGGGTTGTAAAGTACTTTCA

1  GTGGGGAGGAAGGCGATGAAGTTAATAACTTCGTCGATTGACGTTACCCGCAGAAGAAGCACCG
5  GTGGGGAGGAAGGCGATGAAGTTAATAACTTCGTCGATTGACGTTACCCGCAGAAGAAGCACCG
9  GTGGGGAGGAAGGCGATGAAGTTAATAACTTCGTCGATTGACGTTACCCGCAGAAGAAGCACCG
13 GTGGGGAGGAAGGCGATGAAGTTAATAACTTCGTCGATTGACGTTACCCGCAGAAGAAGCACCG

1  GCTAACTCCGTGCCAGCAGCCGCGGTAATACGGAGGGTGCAAGCGTTAATCGGAATTACTGGG
5  GCTAACTCCGTGCCAGCAGCCGCGGTAATACGGAGGGTGCAAGCGTTAATCGGAATTACTGGG
9  GCTAACTCCGTGCCAGCAGCCGCGGTAATACGGAGGGTGCAAGCGTTAATCGGAATTACTGGG
13 GCTAACTCCGTGCCAGCAGCCGCGGTAATACGGAGGGTGCAAGCGTTAATCGGAATTACTGGG

1  CGTAAAGCGCACGCAGGCGGTCTGTCAAGTCGGATGTGAAATCCCCGGGCTCAACCTGGGAAC
5  CGTAAAGCGCACGCAGGCGGTCTGTCAAGTCGGATGTGAAATCCCCGGGCTCAACCTGGGAAC
9  CGTAAAGCGCACGCAGGCGGTCTGTCAAGTCGGATGTGAAATCCCCGGGCTCAACCTGGGAAC
13 CGTAAAGCGCACGCAGGCGGTCTGTCAAGTCGGATGTGAAATCCCCGGGCTCAACCTGGGAAC

1  TGCATTCGAAACTGGCAGGCTAGAGTCTTGTAGAGGGGGGTAGAATTCCAGGTGTAGCGGTGA
5  TGCATTCGAAACTGGCAGGCTAGAGTCTTGTAGAGGGGGGTAGAATTCCAGGTGTAGCGGTGA
9  TGCATTCGAAACTGGCAGGCTAGAGTCTTGTAGAGGGGGGTAGAATTCCAGGTGTAGCGGTGA
13 TGCATTCGAAACTGGCAGGCTAGAGTCTTGTAGAGGGGGGTAGAATTCCAGGTGTAGCGGTGA

1  AATGCGTAGAGATCTGGAGGAATACCGGTGGCGAAGGCGGCCCCCTGGACAAAGACTGACGCT
5  AATGCGTAGAGATCTGGAGGAATACCGGTGGCGAAGGCGGCCCCCTGGACAAAGACTGACGCT
9  AATGCGTAGAGATCTGGAGGAATACCGGTGGCGAAGGCGGCCCCCTGGACAAAGACTGACGCT
13 AATGCGTAGAGATCTGGAGGAATACCGGTGGCGAAGGCGGCCCCCTGGACAAAGACTGACGCT

1  CAGGTGCGAAAGCGTGGGGAGCAAACAGGATTAGATACCCTGGTAGTCCACGCCGTAAACGAT
```

Fig. 3

```
5   CAGGTGCGAAAGCGTGGGGAGCAAACAGGATTAGATACCCTGGTAGTCCACGCCGTAAACGAT
9   CAGGTGCGAAAGCGTGGGGAGCAAACAGGATTAGATACCCTGGTAGTCCACGCCGTAAACGAT
13  CAGGTGCGAAAGCGTGGGGAGCAAACAGGATTAGATACCCTGGTAGTCCACGCCGTAAACGAT

1   GTCGACTTGGAGGTTGTGCCCTTGAGGCGTGGCTTCCGGAGCTAACGCGTTAAGTCGACCGCCT
5   GTCGACTTGGAGGTTGTGCCCTTGAGGCGTGGCTTCCGGAGCTAACGCGTTAAGTCGACCGCCT
9   GTCGACTTGGAGGTTGTGCCCTTGAGGCGTGGCTTCCGGAGCTAACGCGTTAAGTCGACCGCCT
13  GTCGACTTGGAGGTTGTGCCCTTGAGGCGTGGCTTCCGGAGCTAACGCGTTAAGTCGACCGCCT

1   GGGGA
5   GGGGA
9   GGGGA
13  GGGGA
```

2 ACGCTGGAGAGTGTGATGTCTGCCACGGCAGTGGCGCGAAAGCGGGTACCAAGCCGCAAACCT
6 ACGCTGGAGAGTGTGATGTCTGCCACGGCAGTGGCGCGAAAGCGGGTACCAAGCCGCAAACCT
10 ACGCTGGAGAGTGTGATGTCTGCCACGGCAGTGGCGCGAAAGCGGGTACCAAGCCGCAAACCT
14 ACGCTGGAGAGTGTGATGTCTGCCACGGCAGTGGCGCGAAAGCGGGTACCAAGCCGCAAACCT

2 GTTCAACCTGCCATGGTGCGGGCCAGGTTCAGATGCGTCAGGGCTTCTTTACTGTGCAGCAGGC
6 GTTCAACCTGCCATGGTGCGGGCCAGGTTCAGATGCGTCAGGGCTTCTTTACTGTGCAGCAGGC
10 GTTCAACCTGCCATGGTGCGGGCCAGGTTCAGATGCGTCAGGGCTTCTTTACTGTGCAGCAGGC
14 GTTCAACCTGCCATGGTGCGGGCCAGGTTCAGATGCGTCAGGGCTTCTTTACTGTGCAGCAGGC

2 GTGTCCGACCTGTCATGGTCGCGGCTCGGTCATTAAAGATCCGTGCAATGCCTGTCATGGTCAT
6 GTGTCCGACCTGTCATGGTCGCGGCTCGGTCATTAAAGATCCGTGCAATGCCTGTCATGGTCAT
10 GTGTCCGACCTGTCATGGTCGCGGCTCGGTCATTAAAGATCCGTGCAATGCCTGTCATGGTCAT
14 GTGTCCGACCTGTCATGGTCGCGGCTCGGTCATTAAAGATCCGTGCAATGCCTGTCATGGTCAT

2 GGCCGGGTAGAACGTTCGAAGACGCTATCGGTGAAAATTCCGGCGGGCGTGGATACCGGTGAC
6 GGCCGGGTAGAACGTTCGAAGACGCTATCGGTGAAAATTCCGGCGGGCGTGGATACCGGTGAC
10 GGCCGGGTAGAACGTTCGAAGACGCTATCGGTGAAAATTCCGGCGGGCGTGGATACCGGTGAC
14 GGCCGGGTAGAACGTTCGAAGACGCTATCGGTGAAAATTCCGGCGGGCGTGGATACCGGTGAC

2 CGCATTCGTCTGACTGGCGAAGGGGAAGCGGGTGAGCAGGGCGCGCCAGCGGGCGATCTGTA
6 CGCATTCGTCTGACTGGCGAAGGGGAAGCGGGTGAGCAGGGCGCGCCAGCGGGCGATCTGTA
10 CGCATTCGTCTGACTGGCGAAGGGGAAGCGGGTGAGCAGGGCGCGCCAGCGGGCGATCTGTA
14 CGCATTCGTCTGACTGGCGAAGGGGAAGCGGGTGAGCAGGGCGCGCCAGCGGGCGATCTGTA

2 TGTCCAGGTGCAGGTGCGTAAGCACAATATCTTTGAACGTGAAGAGAATAACCTGTACTGCGAA
6 TGTCCAGGTGCAGGTGCGTAAGCACAATATCTTTGAACGTGAAGAGAATAACCTGTACTGCGAA
10 TGTCCAGGTGCAGGTGCGTAAGCACAATATCTTTGAACGTGAAGAGAATAACCTGTACTGCGAA
14 TGTCCAGGTGCAGGTGCGTAAGCACAATATCTTTGAACGTGAAGAGAATAACCTGTACTGCGAA

2 GTGCCGATTAACTTTGTGATGGCGGCACTGGGGGGAGAAATCGAAGTCCCTACGCTGGATGGC
6 GTGCCGATTAACTTTGTGATGGCGGCACTGGGGGGAGAAATCGAAGTCCCTACGCTGGATGGC
10 GTGCCGATTAACTTTGTGATGGCGGCACTGGGGGGAGAAATCGAAGTCCCTACGCTGGATGGC
14 GTGCCGATTAACTTTGTGATGGCGGCACTGGGGGGAGAAATCGAAGTCCCTACGCTGGATGGC

2
CGCGTGAAGCTGAAGGTTCCGGCGGAAACGCAGACCGGTAAGCTGTTCCGCATGCGGGGCAAG
6 CGCGTGAAGCTGAAGGTTCCGGCGGAAACGCAGACCGGTAAGCTGTTCCGCATGCGGGGCAAG
10 CGCGTGAAGCTGAAGGTTCCGGCGGAAACGCAGACCGGTAAGCTGTTCCGCATGCGGGGCAAG
14 CGCGTGAAGCTGAAGGTTCCGGCGGAAACGCAGACCGGTAAGCTGTTCCGCATGCGGGGCAAG

2 GGTGTGAAATCCGTACGCGGTGGTGCACAGGGTGACCTGCTGTGCCGCGTAGTGGTCGAAACC
6 GGTGTGAAATCCGTACGCGGTGGTGCACAGGGTGACCTGCTGTGCCGCGTAGTGGTCGAAACC
10 GGTGTGAAATCCGTACGCGGTGGTGCACAGGGTGACCTGCTGTGCCGCGTAGTGGTCGAAACC
14 GGTGTGAAATCCGTACGCGGTGGTGCACAGGGTGACCTGCTGTGCCGCGTAGTGGTCGAAACC

2 CCGGTCAGCCTGAATGAGAAGCAGAAATCGCTGCTACGTGAACTGGAGGAAAGCTTTGGCG
6 CCGGTCAGCCTGAATGAGAAGCAGAAATCGCTGCTACGTGAACTGGAGGAAAGCTTTGGCG
10 CCGGTCAGCCTGAATGAGAAGCAGAAATCGCTGCTACGTGAACTGGAGGAAAGCTTTGGCG
14 CCGGTCAGCCTGAATGAGAAGCAGAAATCGCTGCTACGTGAACTGGAGGAAAGCTTTGGCG

FIGURE 5

3 ACCATCCGTGTTACCGCTGAGCGCGACCCGGCTAACCTGAAGTGGGATGCAGTAGGCGTGGAT
7 ACCATCCGTGTTACCGCTGAGCGCGACCCGGCTAACCTGAAGTGGGATGCAGTAGGCGTGGAT
11 ACCATCCGTGTTACCGCTGAGCGCGACCCGGCTAACCTGAAGTGGGATGCAGTAGGCGTGGAT
15 ACCATCCGTGTTACCGCTGAGCGCGACCCGGCTAACCTGAAGTGGGATGCAGTAGGCGTGGAT

3 GTGGTTGCAGAAGCGACCGGTATCTTCCTGACCGACGAAACTGCACGTAAACACATCGAAGCGG
7 GTGGTTGCAGAAGCGACCGGTATCTTCCTGACCGACGAAACTGCACGTAAACACATCGAAGCGG
11 GTGGTTGCAGAAGCGACCGGTATCTTCCTGACCGACGAAACTGCACGTAAACACATCGAAGCGG
15 GTGGTTGCAGAAGCGACCGGTATCTTCCTGACCGACGAAACTGCACGTAAACACATCGAAGCGG

3 GCGCGAAGAAAGTTGTTCTGACCGGTCCATCTAAAGATGACACCCCAATGTTCGTTATGGGTGTA
7 GCGCGAAGAAAGTTGTTCTGACCGGTCCATCTAAAGATGACACCCCAATGTTCGTTATGGGTGTA
11 GCGCGAAGAAAGTTGTTCTGACCGGTCCATCTAAAGATGACACCCCAATGTTCGTTATGGGTGTA
15 GCGCGAAGAAAGTTGTTCTGACCGGTCCATCTAAAGATGACACCCCAATGTTCGTTATGGGTGTA

3 AACCACAAGTCTTACGCTGGCCAGGATATCGTTTCAAATGCTTCCTGTACCACCAACTGCCTGGC
7 AACCACAAGTCTTACGCTGGCCAGGATATCGTTTCAAATGCTTCCTGTACCACCAACTGCCTGGC
11 AACCACAAGTCTTACGCTGGCCAGGATATCGTTTCAAATGCTTCCTGTACCACCAACTGCCTGGC
15 AACCACAAGTCTTACGCTGGCCAGGATATCGTTTCAAATGCTTCCTGTACCACCAACTGCCTGGC

3 ACCGCTGGCAAAAGTGATCAACGACAACTTCGGTATCGTTGAAGCACTGATGACCACTGTACAC
7 ACCGCTGGCAAAAGTGATCAACGACAACTTCGGTATCGTTGAAGCACTGATGACCACTGTACAC
11 ACCGCTGGCAAAAGTGATCAACGACAACTTCGGTATCGTTGAAGCACTGATGACCACTGTACAC
15 ACCGCTGGCAAAAGTGATCAACGACAACTTCGGTATCGTTGAAGCACTGATGACCACTGTACAC

3 GCAACAACTGCGACTCAGAAAACCGTTGATGGCCCGTCTCACAAAGA
7 GCAACAACTGCGACTCAGAAAACCGTTGATGGCCCGTCTCACAAAGA
11 GCAACAACTGCGACTCAGAAAACCGTTGATGGCCCGTCTCACAAAGA
15 GCAACAACTGCGACTCAGAAAACCGTTGATGGCCCGTCTCACAAAGA

FIGURE 6

4 CTGTGCATTTATCGATGCCGAGCATGCTCTGGACCCGGTCTACGCTAAAAAACTGGGCGTGGAT
8 CTGTGCATTTATCGATGCCGAGCATGCTCTGGACCCGGTCTACGCTAAAAAACTGGGCGTGGAT
12 CTGTGCATTTATCGATGCCGAGCATGCTCTGGACCCGGTCTACGCTAAAAAACTGGGCGTGGAT
16 CTGTGCATTTATCGATGCCGAGCATGCTCTGGACCCGGTCTACGCTAAAAAACTGGGCGTGGAT

4 ATCGATAACTTGCTGTGTTCTCAGCCGGATACCGGTGAGCAGGCGCTGGAAATCTGTGATGCGC
8 ATCGATAACTTGCTGTGTTCTCAGCCGGATACCGGTGAGCAGGCGCTGGAAATCTGTGATGCGC
12 ATCGATAACTTGCTGTGTTCTCAGCCGGATACCGGTGAGCAGGCGCTGGAAATCTGTGATGCGC
16 ATCGATAACTTGCTGTGTTCTCAGCCGGATACCGGTGAGCAGGCGCTGGAAATCTGTGATGCGC

4 TGGCCCGTTCCGGTGCGGTTGACGTCATCATCGTCGACTCCGTAGCGGCGTTGACACCAAAAG
8 TGGCCCGTTCCGGTGCGGTTGACGTCATCATCGTCGACTCCGTAGCGGCGTTGACACCAAAAG
12 TGGCCCGTTCCGGTGCGGTTGACGTCATCATCGTCGACTCCGTAGCGGCGTTGACACCAAAAG
16 TGGCCCGTTCCGGTGCGGTTGACGTCATCATCGTCGACTCCGTAGCGGCGTTGACACCAAAAG

4 CAGAAATCGAAGGTGAAATCGGTGACTCTCATATGGGCCTTGCGGCACGTATGATGAGCCAGGC
8 CAGAAATCGAAGGTGAAATCGGTGACTCTCATATGGGCCTTGCGGCACGTATGATGAGCCAGGC
12 CAGAAATCGAAGGTGAAATCGGTGACTCTCATATGGGCCTTGCGGCACGTATGATGAGCCAGGC
16 CAGAAATCGAAGGTGAAATCGGTGACTCTCATATGGGCCTTGCGGCACGTATGATGAGCCAGGC

4 GATGCGTAAGCTGGCCGGTAACCTGAAGAACTCCGGTACGCTGCTGATCTTTATCAACCAGATC
8 GATGCGTAAGCTGGCCGGTAACCTGAAGAACTCCGGTACGCTGCTGATCTTTATCAACCAGATC
12 GATGCGTAAGCTGGCCGGTAACCTGAAGAACTCCGGTACGCTGCTGATCTTTATCAACCAGATC
16 GATGCGTAAGCTGGCCGGTAACCTGAAGAACTCCGGTACGCTGCTGATCTTTATCAACCAGATC

4 CGTATGAAAATTGGCGTGATGTTCGGTAACCCGGAAACCACTACCGGTGGTAACGCTCTGAAAT
8 CGTATGAAAATTGGCGTGATGTTCGGTAACCCGGAAACCACTACCGGTGGTAACGCTCTGAAAT
12 CGTATGAAAATTGGCGTGATGTTCGGTAACCCGGAAACCACTACCGGTGGTAACGCTCTGAAAT
16 CGTATGAAAATTGGCGTGATGTTCGGTAACCCGGAAACCACTACCGGTGGTAACGCTCTGAAAT

4 TCTACGCTTCTGTCCGTCTGGATATTCGCCGCATCGGCGCGATCAAAGAGGGTGATGAAGTGGT
8 TCTACGCTTCTGTCCGTCTGGATATTCGCCGCATCGGCGCGATCAAAGAGGGTGATGAAGTGGT
12 TCTACGCTTCTGTCCGTCTGGATATTCGCCGCATCGGCGCGATCAAAGAGGGTGATGAAGTGGT
16 TCTACGCTTCTGTCCGTCTGGATATTCGCCGCATCGGCGCGATCAAAGAGGGTGATGAAGTGGT

4 GGGTAGCGAAACCCGCGTTAAAGTGGTGAAAAACAAAATCGCAGCACCG
8 GGGTAGCGAAACCCGCGTTAAAGTGGTGAAAAACAAAATCGCAGCACCG
12 GGGTAGCGAAACCCGCGTTAAAGTGGTGAAAAACAAAATCGCAGCACCG
16 GGGTAGCGAAACCCGCGTTAAAGTGGTGAAAAACAAAATCGCAGCACCG

FIGURE 7

| Putative genus | Total isolates tested | Non-bioactive isolates | Bioactive isolates | | |
|---|---|---|---|---|---|
| | | | Xcc and Ss | Xcc only | Ss only |
| *Bacillus* | 179 | 126 | 16 | 32 | 5 |
| *Paenibacillus* | 31 | 16 | 7 | 3 | 5 |
| *Pseudomonas* | 39 | 21 | 5 | 9 | 4 |
| *Erwinia* | 6 | | 5 | 1 | |
| Unknown | 176 | 155 | 4 | 12 | 5 |
| *Brevibacillus* | 1 | | 1 | | |
| *Pantoea* | 13 | 8 | | 2 | 3 |
| *Chryseobacterium* | 4 | 3 | | 1 | |
| *Variovorax* | 3 | 2 | | | 1 |
| **Total** | **512** | **391**[a] | **38** | **60** | **23** |

[a]No bioactivity was recorded against Xcc or Ss with isolates from the genera: *Acidovorax* (2), *Acinetobacter* (1), *Arthrobacter* (3), *Brevundimonas* (1), *Curtobacterium* (5), *Enterococcus* (2), *Exiguobacterium* (3), *Flavimonas* (1), *Frigoribacterium* (3), *Herbaspirillum* (1), *Leucobacter* (3), *Lysinibacillus* (2), *Microbacterium* (12), *Mitsuaria* (1), *Mycobacterium* (1), *Oceanobacillus* (1), *Planomicrobium* (2), *Plantibacter* (1), *Pseudoclavibacter* (1), *Psychrobacter* (1), *Rathayibacter* (3), *Rhizobium* (4), *Sporosarcina* (1), *Staphylococcus* (4) and *Streptomyces* (1)

| Assay date and number | 14/01/09 1 | 28/01/09 2 | 11/02/09 3 | 25/02/09 4 | 20/05/09 6 | 10/06/09 7 | 10/06/09 7 | 30/07/09 8 | 30/07/09 8 | 30/07/09 9 | 30/07/09 9 | 09/09/09 11 | 09/09/09 11 | Combined | | | | |
|---|---|---|---|---|---|---|---|---|---|---|---|---|---|---|---|---|---|---|
| Test crop Xcc isolate | Cabbage ICMP 4013 | Cabbage ICMP 4013 | Cabbage ICMP 4013 | Cabbage ICMP 4013 | Cabbage ICMP 4013 | Cabbage ICMP 4013 | Rape ICMP 4013 | Rape ICMP 6497 | Rape ICMP 6497 | Cabbage ICMP 4013 | Cabbage ICMP 6497 | Cabbage ICMP 6497 | Cabbage ICMP 6497 | Cabbage | Rape | ICMP 4013 | ICMP 6497 | Total |
| Negative control | [0.5]* | [0.5] | [0.2] | [2.7] | [0.9] | [0.3] | [13.8] | [0.8] | [2.8] | [0.0] | [0.0] | [1.1] | [0.7] | 0.6 | 7.6 | 1.7 | 0.9 | 1.7 |
| Positive control | 93.4 | 50.7 | 98.9 | 86.2 | 94.2 | 80.9 | 38.5 | 72.8 | 83.3 | 81.8 | 82.5 | 96.7 | 94.4 | 82.4 | 69.2 | 78.0 | 86.3 | 80.1 |
| 75 | | | 7.5 | | | | | | | | | | | 1.9 | | 2.3 | | 1.2 |
| 76 | [1.4] | | | | 9.1 | 5.7 | 13.4 | [5.4] | [2.9] | [0.0] | [1.2] | 5.0 | 5.4 | 3.7 | 8.8 | 5.7 | 3.5 | 5.5 |
| 80 | | [1.9] | | | | [2.7] | 14.3 | [0.9] | [2.6] | | | 7.7 | 2.1 | 7.0 | 8.0 | 14.4 | 2.3 | 9.4 |
| 1431 | | | 30.0 | | | 8.6 | 33.1 | 7.5 | 8.9 | | | 10.4 | 7.7 | 13.9 | 20.2 | 26.0 | 7.1 | 17.3 |
| 16 | | | | 35.1 | | 9.6 | 11.9 | | | | | | | 24.1 | 9.7 | 21.2 | | 23.3 |
| 1117 | | | 28.0 | | | 24.5 | 19.3 | | | | | | | 27.3 | 17.8 | 26.1 | | 25.6 |
| 707 | | 18.4 | | | | 24.5 | 11.0 | 5.0 | 14.6 | 19.8 | 20.9 | 50.3 | 26.0 | 29.1 | 10.4 | 28.2 | 23.0 | 26.9 |
| 31 | | | | 42.4 | | 18.4 | 16.9 | 7.9 | 7.5 | | | 81.8 | 78.7 | 45.2 | 12.3 | 27.8 | 43.2 | 37.5 |
| 873 | | | 61.0 | | | 38.0 | 23.0 | | | | | | | 46.1 | 20.9 | 41.3 | | 40.8 |
| 2009 | | | | | | | 37.7 | | | | | | | | 35.5 | 44.0 | | 44.2 |
| 1708 | | 33.3 | | | | | | | | | | | | 45.7 | | 45.5 | | 45.4 |
| 599 | 50.1 | | | | | | | | | | | | | 47.3 | | 46.1 | | 47.4 |
| 30 | | | | 54.8 | | | | | | | | | | 51.5 | | 45.1 | | 49.1 |
| 893 | | 37.0 | | | | | | | | | | | | 49.4 | | 49.2 | | 49.1 |
| 871 | | | 66.6 | | | | | | | | | | | 49.9 | | 50.3 | | 49.1 |
| 92 | | 40.2 | | | | | | | | | | | | 52.6 | | 52.4 | | 52.3 |
| 571 | | 40.4 | | | | | | | | | | | | 52.8 | | 52.6 | | 52.5 |
| 28 | | | | 60.1 | | | | | | | | | | 56.9 | | 50.5 | | 54.4 |
| 25 | 58.9 | | | | | | | | | | | | | 56.1 | | 54.9 | | 56.2 |
| 1902 | | 44.3 | | | | | | | | | | | | 56.7 | | 56.5 | | 56.4 |
| 394 | | | | 64.1 | | | | | | | | | | 60.9 | | 54.4 | | 58.4 |
| 859 | 61.2 | | | | | | | | | | | | | 58.4 | | 57.2 | | 58.5 |
| 1873 | 61.9 | | | | | | | | | | | | | 59.1 | | 57.9 | | 59.2 |
| 1825 | | 49.2 | | | | | | | | | | | | 60.6 | | 60.4 | | 60.3 |
| 710 | | | 68.0 | | | | | | | | | | | 62.5 | | 62.8 | | 61.7 |

Fig. 8

| | | | | | | | | |
|---|---|---|---|---|---|---|---|---|
| 1452 | | | 70.3 | | | 64.8 | 65.1 | 64.0 |
| 451 | | | 70.8 | | | 65.0 | 65.4 | 64.3 |
| 465 | | | 72.1 | | | 66.6 | 66.9 | 65.8 |
| 1899 | | | 72.8 | | | 67.1 | 67.4 | 66.3 |
| 1341 | | | | 72.5 | | 69.3 | 62.9 | 66.8 |
| 2181 | | | | 72.9 | | 69.7 | 63.3 | 67.2 |
| 2182 | | | | 74.3 | | 71.0 | 64.6 | 68.6 |
| 434 | | | 76.0 | | | 70.5 | 70.8 | 69.7 |
| 1589 | | | | 76.2 | | 72.9 | 66.5 | 70.5 |
| 592 | | | 77.0 | | | 71.5 | 71.8 | 70.7 |
| 399 | | | 77.3 | | | 71.7 | 72.1 | 71.0 |
| 438 | | | 79.8 | | | 74.3 | 74.7 | 73.6 |
| LU1247 | 78.5 | | | | | 73.7 | 72.5 | 73.8 |
| 1833 | | | | | 79.9 | 74.1 | 72.9 | 74.3 |
| 573 | | | | | 82.4 | 76.8 | 75.4 | 76.9 |
| 448 | | 84.8 | | | | 77.2 | 77.0 | 76.9 |
| 432 | | | 83.3 | | | 77.9 | 78.1 | 77.0 |
| 454 | | | | 83.5 | | 80.2 | 73.8 | 77.8 |
| 1354 | | | | 84.2 | | 81.0 | 74.6 | 78.5 |
| 421 | | | | 84.5 | | 81.3 | 74.9 | 78.8 |
| 474 | | | 85.3 | | | 79.8 | 80.1 | 79.0 |
| 159 | | | 86.0 | | | 80.4 | 80.8 | 79.7 |
| 1185 | | | | 85.8 | | 82.8 | 76.2 | 80.1 |
| 84 | | | | 87.5 | | 84.2 | 77.8 | 81.8 |
| 457 | | | | 88.3 | | 85.0 | 78.6 | 82.6 |
| 1489 | | | | 91.2 | | 88.0 | 81.6 | 85.5 |
| 1520 | | | | 91.3 | | 88.0 | 81.8 | 85.6 |
| 1753 | | | 92.4 | | | 86.8 | 87.2 | 86.1 |
| 593 | | | | 92.3 | | 89.0 | 82.6 | 86.6 |
| 410 | | | 93.3 | | | 87.8 | 88.1 | 87.0 |
| 1588 | | | 94.4 | | | 88.8 | 89.2 | 88.1 |
| 1936 | | | 95.1 | | | 89.5 | 89.9 | 88.7 |
| 312 | | | 95.1 | | | 89.5 | 89.9 | 88.8 |
| 748 | | | [97.3] | | | 91.7 | 92.1 | 91.0 |
| 1821 | | | [99.0] | | | 93.4 | 93.8 | 92.7 |
| 1909 | | | | | [98.4] | 92.6 | 91.4 | 92.8 |

Fig. 8 cont.

| | | | | | | | | | | | | | | | | | | |
|---|---|---|---|---|---|---|---|---|---|---|---|---|---|---|---|---|---|---|
| LSD (5%) | 14.6[b] | 14.1[b] | 12.9[b] | 11.6[b] | 10.4[b] | 12.0[b] | 16.0[b] | 11.3[b] | 11.3[b] | 17.7[f] | 17.7[f] | 7.8[g] | 7.8[g] | 11.7[i] | 35.8[i] | 10.6[i] | 22.5[i] | 13.1[i] |
| | 12.0[c] | 11.5[c] | 10.0[c] | 9.0[c] | 8.2[c] | 9.8[c] | 13.0[c] | 9.2[c] | 9.2[c] | | | 6.3[h] | 6.3[h] | 34.3[j] | 42.0[j] | 23.3[j] | 31.7[j] | 38.1[j] |
| | | | | | | | | | | | | | | 33.4[k] | 60.6[k] | 32.5[k] | 34.9[k] | 42.7[k] |
| LSEffect | 10.3[b] | 10.0[b] | | | | 8.5[b] | | 8.0[b] | 8.0[b] | 12.5[f] | 12.5[f] | | | | | | | |
| (5%) | 8.5[e] | 8.2[e] | 7.1[c] | 6.3[e] | 5.8[e] | 7.0[e] | 9.2[c] | 6.5[e] | 6.5[e] | | | 4.5[g] | 4.5[g] | | | | | |
| | 6.0[d] | 5.8[d] | 4.1[d] | 3.7[d] | 3.7[d] | 4.9[d] | 6.5[d] | 4.6[d] | 4.6[d] | | | 3.2[h] | 3.2[h] | | | | | |

[a]Values in square brackets omitted from ANOVA to achieve homogeneity of variance

[b]For pairwise statistical comparisons of variable bacterial isolates

[c]For pairwise statistical comparisons of a variable bacterial isolate with the positive control

[d]For pairwise statistical comparisons of a variable bacterial isolate with a constant bacterial isolate (i.e. one in square brackets)

[e]For pairwise statistical comparisons of a variable bacterial isolate with the negative control

[f]For pairwise statistical comparisons of the positive and negative controls

[g]For pairwise statistical comparisons of variable values

[h]For pairwise statistical comparisons of a variable value with a constant value (i.e. a value in square brackets)

[i]For pairwise statistical comparisons of values with the minimum level of replication

[j]For pairwise statistical comparisons of values with the mean level of replication

[k]For pairwise statistical comparisons of values with the maximum level of replication

Fig. 8 cont.

| Assay date and number | 14/01/09 1 | 28/01/09 2 | 11/02/09 3 | 25/02/09 4 | 20/05/09 6 | 10/06/09 7 | 10/06/09 7 | 20/07/09 8 | 30/07/09 9 | 30/07/09 8 | 30/07/09 8 | 09/09/09 11 | 09/09/09 11 | Combined | | | | |
|---|---|---|---|---|---|---|---|---|---|---|---|---|---|---|---|---|---|---|
| Test crop | Cabbage | Cabbage | Cabbage | Cabbage | Cabbage | Cabbage | Rape | Rape | Rape | Cabbage | Cabbage | Cabbage | Cabbage | Cabbage | Rape | | | Total |
| Seed lot Xcc isolate | Cb21 ICMP 4013 | Cb21 ICMP 4013 | Cb21 ICMP 4012 | Cb21 ICMP 4013 | Cb21 ICMP 4013 | Cb21 ICMP 4013 | R15 ICMP 4013 | R16 ICMP 6497 | R17 ICMP 6497 | Cb21 ICMP 4013 | Cb21 ICMP 6497 | Cb22 ICMP 6497 | Cb22 ICMP 6497 | | | ICMP 4013 | ICMP 6497 | |
| Negative control | 84.7 | 78.9 | 83.8 | 78.8 | 82.3 | 82.0 | 88.8 | 93.3 | 95.5 | 81.8 | 81.8 | 94.8 | 95.7 | 82.9 | 95.8 | 82.2 | 90.4 | 84.8 |
| Positive control | 92.0 | 75.1 | 79.0 | 74.2 | 78.3 | 74.9 | 84.0 | 90.9 | 94.5 | 79.8 | 84.9 | 92.8 | 98.1 | 79.8 | 93.4 | 78.7 | 90.7 | 81.8 |
| 75 | | | 78.8 | | | | | | | | | | | 79.3 | | 80.1 | | 83.8 |
| 78 | 93.2 | | | | 89.2 | 83.8 | 95.8 | 94.0 | 98.9 | 79.8 | 74.0 | 95.8 | 95.3 | 83.3 | 95.5 | 82.5 | 88.3 | 84.9 |
| 90 | | 84.8 | | | | 90.0 | 94.8 | 95.2 | 95.2 | | | 92.4 | 95.2 | 87.3 | 95.0 | 86.7 | 90.8 | 89.9 |
| 1431 | | | 77.8 | | | 75.2 | 92.4 | 90.4 | 92.4 | | | 92.8 | 93.2 | 81.3 | 91.9 | 78.8 | 88.3 | 85.3 |
| 18 | | | | 68.8 | | 78.4 | 88.0 | | | | | | | 75.7 | 88.5 | 77.3 | | 78.9 |
| 1117 | | | 77.2 | | | 82.0 | 82.4 | | | | | | | 81.3 | 80.9 | 80.3 | | 83.1 |
| 707 | | 73.8 | | | | 84.8 | 94.0 | 89.8 | 92.0 | 80.4 | 77.2 | 93.8 | 93.8 | 84.2 | 92.4 | 81.3 | 87.2 | 85.0 |
| 31 | | | | 89.2 | | 82.0 | 84.0 | 93.8 | 97.2 | | | 93.2 | 94.8 | 82.8 | 94.7 | 78.9 | 90.8 | 88.0 |
| 873 | | | 82.0 | | | 78.8 | 96.8 | | | | | | | 82.1 | 94.1 | 82.7 | | 85.5 |
| 2008 | | | 25.8 | | | 12.4 | 87.2 | | | | | | | 20.7 | 85.7 | 30.8 | | 33.8 |
| 1708 | | 78.4 | | | | | | | | | | | | 82.3 | | 80.8 | | 84.1 |
| 599 | 80.0 | | | | | | | | | | | | | 73.2 | | 74.1 | | 74.2 |
| 30 | | | | 59.0 | | | | | | | | | | 63.2 | | 63.8 | | 64.9 |
| 693 | | 72.4 | | | | | | | | | | | | 84.3 | | 82.8 | | 86.1 |
| 671 | | | 84.0 | | | | | | | | | | | 84.5 | | 86.3 | | 88.8 |
| 69 | | 74.4 | | | | | | | | | | | | 80.3 | | 78.8 | | 82.1 |
| 571 | | 74.4 | | | | | | | | | | | | 80.3 | | 78.8 | | 82.1 |
| 28 | | | | 72.0 | | | | | | | | | | 77.2 | | 77.8 | | 78.8 |
| 25 | 85.8 | | | | | | | | | | | | | 78.8 | | 79.7 | | 79.8 |
| 1902 | | 78.4 | | | | | | | | | | | | 82.3 | | 80.8 | | 84.1 |
| 384 | | | | 79.2 | | | | | | | | | | 84.4 | | 85.0 | | 88.0 |
| 659 | 77.2 | | | | | | | | | | | | | 70.4 | | 71.3 | | 71.4 |
| 1673 | 84.0 | | | | | | | | | | | | | 77.2 | | 78.1 | | 78.2 |
| 1635 | | 80.4 | | | | | | | | | | | | 88.3 | | 84.8 | | 88.1 |
| 710 | | | 80.4 | | | | | | | | | | | 80.9 | | 81.7 | | 85.2 |

Fig. 9

| | | | | | | | | |
|---|---|---|---|---|---|---|---|---|
| 1462 | | | 76.4 | | | 76.9 | 77.7 | 81.2 |
| 451 | | | 76.9 | | | 77.3 | 78.1 | 81.6 |
| 465 | | | 86.0 | | | 86.5 | 87.3 | 90.8 |
| 1999 | | | 76.0 | | | 76.5 | 77.3 | 80.8 |
| 1341 | | | | 93.2 | | 89.4 | 89.0 | 90.0 |
| 2161 | | | | 67.2 | | 72.4 | 73.0 | 74.0 |
| 2162 | | | | 65.6 | | 70.8 | 71.4 | 72.4 |
| 434 | | | 86.0 | | | 86.5 | 87.3 | 90.8 |
| 1599 | | | | 78.8 | | 84.0 | 84.8 | 85.6 |
| 592 | | | 81.6 | | | 82.1 | 82.9 | 86.4 |
| 359 | | | 80.4 | | | 80.9 | 81.7 | 85.2 |
| 439 | | | 82.0 | | | 82.5 | 83.3 | 86.9 |
| LU1247 | 55.2 | | | | | 79.4 | 79.3 | 79.4 |
| 1633 | | | | | 82.4 | 77.8 | 80.5 | 76.2 |
| 573 | | | | | 82.8 | 78.0 | 80.9 | 76.8 |
| 446 | | 74.8 | | | | 80.7 | 79.2 | 82.5 |
| 432 | | | 75.6 | | | 76.1 | 76.9 | 80.4 |
| 454 | | | | 66.8 | | 72.0 | 72.6 | 73.6 |
| 1284 | | | | 69.2 | | 74.4 | 75.0 | 76.0 |
| 421 | | | | 78.0 | | 83.2 | 83.9 | 84.8 |
| 474 | | | 75.6 | | | 76.1 | 76.9 | 80.4 |
| 159 | | | 76.4 | | | 76.9 | 77.7 | 81.2 |
| 1185 | | | | 78.0 | | 83.2 | 83.8 | 84.8 |
| 84 | | | | 74.4 | | 79.6 | 80.2 | 81.2 |
| 457 | | | | 78.4 | | 83.6 | 84.2 | 85.2 |
| 1489 | | | | 70.4 | | 75.6 | 76.2 | 77.2 |
| 1520 | | | | 68.8 | | 74.0 | 74.6 | 75.6 |
| 1753 | | | 76.8 | | | 77.3 | 78.1 | 81.6 |
| 593 | | | | 82.0 | | 87.2 | 87.9 | 88.9 |
| 410 | | | 77.6 | | | 78.1 | 78.9 | 82.4 |
| 1588 | | | 75.6 | | | 76.1 | 76.9 | 80.4 |
| 1936 | | | 79.6 | | | 80.1 | 80.9 | 84.4 |
| 312 | | | 76.4 | | | 76.9 | 77.7 | 81.2 |
| 749 | | | 76.4 | | | 76.9 | 77.7 | 81.2 |
| 1821 | | | 78.0 | | | 78.5 | 79.3 | 82.8 |
| 1906 | | | | | 77.8 | 72.8 | 75.7 | 73.4 |

Fig. 9 cont.

| | | | | | | | | | | | | | | | | | | |
|---|---|---|---|---|---|---|---|---|---|---|---|---|---|---|---|---|---|---|
| 1008 | | | | [0.0] | 38.4 | | | | | | | | | 31.6 | | 34.5 | | 32.2 |
| 418 | | | | 17.6 | | | | | | | | | | 22.8 | | 23.4 | | 24.4 |
| LU1187 | | | | [0.0] | | | | | | | | | | 5.2 | | 5.8 | | 6.8 |
| 1050 | | | | | 28.0 | | | [0.4] | [0.8] | | | [0.0] | [0.0] | 8.8 | 2.1 | 28.1 | -3.8 | 6.0 |
| LU1222 | | | | [0.0] | 9.2 | | | | | | | | | 4.8 | | 6.6 | | 5.9 |
| LU1133 | 30.4 | | | | | [0.4] | 14.8 | [0.4] | [0.4] | | | [0.0] | [0.0] | 7.1 | 7.8 | 13.5 | -3.7 | 5.8 |
| 424 | | | | [1.8] | 6.0 | | | | | | | | | 4.0 | | 5.8 | | 5.1 |
| 462 | | | | [0.4] | 11.6 | [0.0] | 6.4 | [0.0] | [0.8] | [0.0] | [0.0] | [0.0] | [0.0] | 2.5 | 3.4 | 3.8 | 0.1 | 1.8 |
| 1958 | | | | | 5.6 | | | | | | | | | 0.8 | | 3.7 | | 1.4 |
| 263 | | | | [0.0][a] | [0.0] | | | [0.0] | [0.4] | | | [0.0] | [0.0] | -1.7 | 1.7 | 2.0 | -3.8 | -0.9 |
| LU1219 | | | | | [0.0] | | | | | | | | | -4.8 | | -1.8 | | -4.2 |
| LSD (5%) | 8.6[b] | 9.0[b] | 7.9[b] | 9.5[b] | 10.2[b] | 7.6[b] | 6.1[b] | 4.4[b] | 4.4[b] | 6.9[g] | 6.9[g] | 4.1[b] | 4.1[b] | 7.4[i] | 7.8[i] | 5.6[i] | 6.2[i] | 7.2[i] |
| | 7.0[c] | 7.4[c] | 6.1[c] | 7.3[c] | 8.1[c] | 6.2[c] | 5.0[c] | 3.6[c] | 3.6[c] | | | 3.4[c] | 3.4[c] | 20.6[j] | 9.4[j] | 14.8[j] | 7.0[j] | 19.9[j] |
| | 5.0[d] | 5.2[d] | 3.5[d] | 4.2[d] | 5.1[d] | 4.4[d] | 3.5[d] | 2.6[d] | 2.6[d] | | | 2.4[d] | 2.4[d] | 23.6[h] | 11.7[h] | 16.8[h] | 7.6[h] | 22.9[h] |
| LSEffect | | | | 6.7[e] | 7.2[e] | 5.4[e] | | 3.1[e] | 3.1[e] | 4.9[h] | 4.9[h] | 2.9[e] | 2.9[e] | | | | | |
| (5%) | | | | 5.2[f] | 5.7[f] | 4.4[f] | | 2.6[f] | 2.6[f] | | | 2.4[f] | 2.4[f] | | | | | |

[a]Values in square brackets omitted from ANOVA to achieve homogeneity of variance

[b]For pairwise statistical comparisons of variable bacterial isolates

[c]For pairwise statistical comparisons of a variable bacterial isolate with the positive or negative control

[d]For pairwise statistical comparisons of the positive and negative controls

[e]For pairwise statistical comparisons of a variable bacterial isolate with a constant bacterial isolate (i.e. one in square brackets)

[f]For pairwise statistical comparisons of the positive or negative control with a constant bacterial isolate (i.e. one in square brackets)

[g]For pairwise statistical comparisons of variable values

[h]For pairwise statistical comparisons of a variable value with a constant value (i.e. a value in square brackets)

[i]For pairwise statistical comparisons of values with the minimum level of replication

[j]For pairwise statistical comparisons of values with the mean level of replication

| Treatment | Disease incidence (%) | | | |
|---|---|---|---|---|
| | **Replicates** | **High rate** | **Replicates** | **Low rate** |
| Negative control | 48 | [0.0][a] | 30 | [0.0] |
| Positive control | 48 | 65.6 | 30 | 66.1 |
| LU633 | 16 | 14.6 | 10 | 28.3 |
| 1431 | 16 | 17.7 | 10 | 29.2 |
| 263 | 16 | 21.4 | 10 | 29.3 |
| LU1133 | 16 | 14.4 | 10 | 21.0 |
| LU668 | 16 | 12.5 | 10 | 29.2 |
| 2137 | 16 | 10.4 | 10 | 20.0 |
| 90 | 16 | 8.3 | 10 | 2.5 |
| 76 | 16 | 1.6 | 10 | 5.0 |
| **LSD (5%)** | **16 v. 16** | **13.8** | **10 v. 10** | **21.2** |
| | **16 v. 48** | **11.2** | **10 v. 30** | **17.3** |
| **LSEffect (5%)[b]** | **16 v. 16** | **9.7** | **10 v. 10** | **15.0** |
| | **16 v. 48** | **8.0** | **10 v. 30** | **12.2** |

[a]Values in square brackets omitted from ANOVA to achieve homogeneity of variance

[b]For pairwise statistical comparisons of a variable value with a constant value (i.e. a value in square brackets)

FIGURE 12

| Treatment | Emergence (%) | | | |
|---|---|---|---|---|
| | Replicates | High rate | Replicates | Low rate |
| Negative control | 48 | 83.0 | 30 | 79.8 |
| Positive control | 48 | 83.9 | 30 | 73.8 |
| LU633 | 16 | 76.6 | 10 | 55.0 |
| 1431 | 16 | 74.3 | 10 | 71.2 |
| 263 | 16 | 57.2 | 10 | 56.2 |
| LU1133 | 16 | 18.0 | 10 | 16.2 |
| LU668 | 16 | 79.7 | 10 | 61.2 |
| 2137 | 16 | 71.9 | 10 | 47.5 |
| 90 | 16 | 68.7 | 10 | 63.8 |
| 76 | 16 | 78.1 | 10 | 63.8 |
| 462 | 16 | 9.4 | 10 | 1.2 |
| **LSD (5%)** | **16 v. 16** | **13.4** | **10 v. 10** | **19.8** |
| | **16 v. 48** | **11.0** | **10 v. 30** | **16.2** |
| | **48 v. 48** | **7.8** | **30 v. 30** | **11.5** |

FIGURE 13

| Treatment | Replicates | Emergence (%) |
|---|---|---|
| Negative control | 15 | 93.4 |
| Positive control | 30 | 88.6 |
| 2049_35 | 15 | 93.4 |
| 2049_3 | 15 | 89.3 |
| 70 | 15 | 89.3 |
| 2137 | 15 | 89.2 |
| 76 | 15 | 95.0 |
| **LSD (5%)** | **15 v. 15** | **8.0** |
| | **15 v. 30** | **6.9** |

| Treatment | Rate ($\log_{10}$ [CFU/g seed]) | Replicates | Emergence (%) | Symptom infections (%) | Latent infections (%) | Total disease incidence (%) |
|---|---|---|---|---|---|---|
| Negative control | | 15 | 94.2 | [0.0][a] | [0.0] | [0.0] |
| Positive control | | 90 | 87.6 | 52.8 | 33.3 | 67.3 |
| 76 | 4.5 | 45 | 90.1 | 29.4 | –[b] | – |
| | 5.5 | 45 | 89.0 | 24.4 | – | – |
| | 6.5 | 45 | 89.4 | 16.7 | 6.7 | 23.1 |
| | 7.5 | 45 | 86.2 | 16.9 | 6.7 | 22.6 |
| | 8.5 | 45 | 87.5 | 8.0 | 13.3 | 19.5 |
| | 9.5 | 45 | 87.6 | 8.9 | 6.7 | 14.0 |
| 90 | 4.5 | 15 | 91.9 | 35.0 | – | – |
| | 5.5 | 15 | 80.8 | 31.1 | – | – |
| | 6.5 | 15 | 94.2 | 18.3 | 6.7 | 25.0 |
| | 7.5 | 15 | 93.3 | 8.3 | 13.3 | 20.0 |
| | 8.5 | 15 | 88.2 | 8.3 | 6.7 | 15.0 |
| | 9.5 | 15 | 84.2 | 6.7 | 13.3 | 16.7 |
| 1774 | 4.5 | 15 | 83.3 | 50.6 | – | – |
| | 5.5 | 15 | 87.6 | 43.3 | – | – |
| | 6.5 | 15 | 89.3 | 28.3 | 33.3 | 51.7 |
| | 7.5 | 15 | 84.4 | 34.4 | 40.0 | 59.4 |
| | 8.5 | 15 | 89.2 | 35.0 | 40.0 | 51.7 |
| | 9.5 | 15 | 85.0 | 50.6 | 13.3 | 53.9 |
| 1860 | 4.5 | 15 | 90.0 | 51.7 | – | – |
| | 5.5 | 15 | 92.5 | 35.0 | – | – |
| | 6.5 | 15 | 94.2 | 37.8 | 20.0 | 52.8 |
| | 7.5 | 15 | 93.4 | 48.3 | 40.0 | 66.7 |
| | 8.5 | 15 | 87.6 | 37.8 | 53.3 | 73.3 |
| | 9.5 | 15 | 84.2 | 46.1 | 40.0 | 60.0 |
| LSD (5%) | | **15 v. 15** | **8.1** | **16.9** | **27.5** | **23.5** |
| | | **15 v. 45** | **6.6** | **13.8** | | |
| | | **15 v. 90** | **6.2** | **12.9** | | |
| | | **45 v. 45** | **4.7** | **9.8** | | |
| | | **45 v. 90** | **4.1** | **8.5** | | |
| LSEffect (5%)[c] | | **15 v. 15** | | | **19.5** | **16.6** |
| | | **15 v. 90** | **4.4** | **9.1** | | |
| **Significance of contrasts** | | | | | | |
| (76 and 90) v. (1774 and 1860) | | | ns[d] | *** | *** | *** |
| 76 v. 90 | | | ns | ns | ns | ns |
| 1774 v. 1860 | | | ns | ns | ns | ns |
| **Significance of interaction contrasts** | | | | | | |
| *Comparison of linear slopes* | | | | | | |
| (76 and 90) v. (1774 and 1860) | | | ns | *** | ns | ns |
| 76 v. 90 | | | ns | ns | ns | ns |
| 1774 v. 1860 | | | ns | ns | * | ns |

Fig. 14

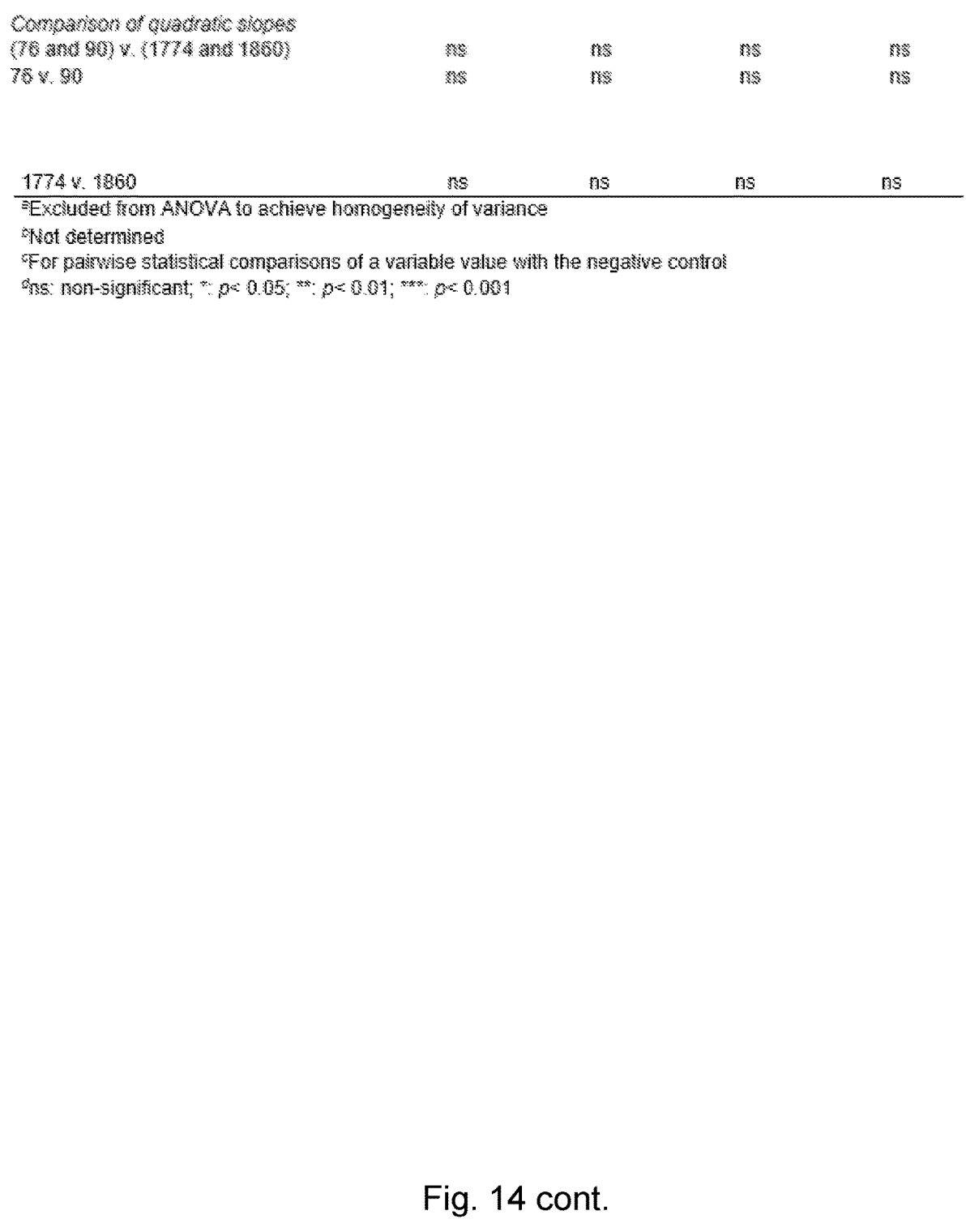

| | | | | |
|---|---|---|---|---|
| *Comparison of quadratic slopes* | | | | |
| (76 and 90) v. (1774 and 1860) | ns | ns | ns | ns |
| 76 v. 90 | ns | ns | ns | ns |
| 1774 v. 1860 | ns | ns | ns | ns |

[a]Excluded from ANOVA to achieve homogeneity of variance

[b]Not determined

[c]For pairwise statistical comparisons of a variable value with the negative control

[d]ns: non-significant; *: $p < 0.05$; : $p < 0.01$; *: $p < 0.001$

Fig. 14 cont.

FIGURE 16
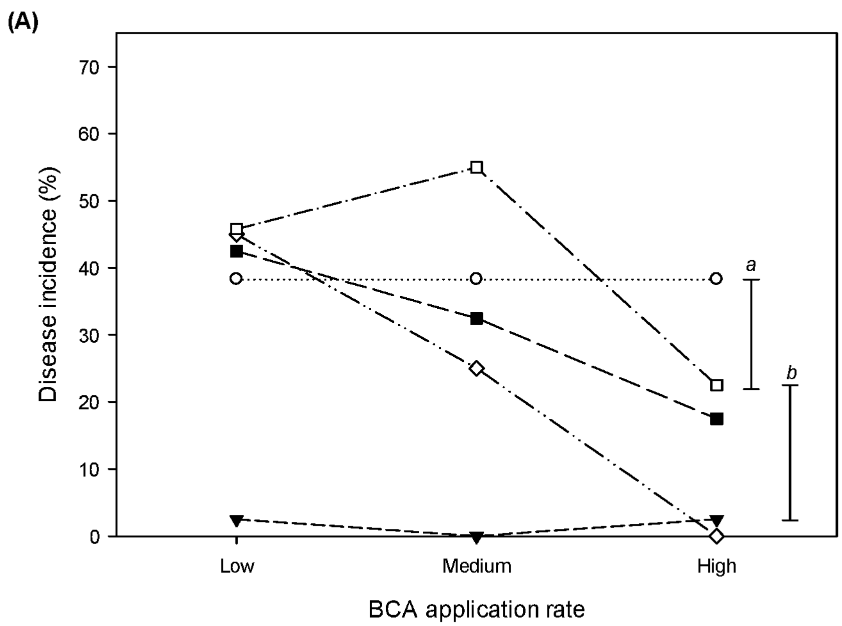
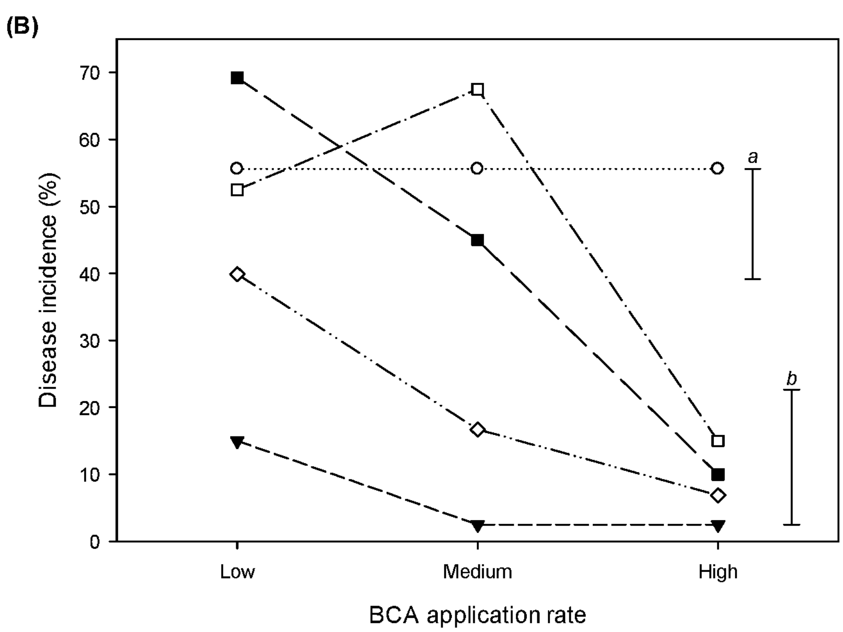

FIGURE 17
(A)
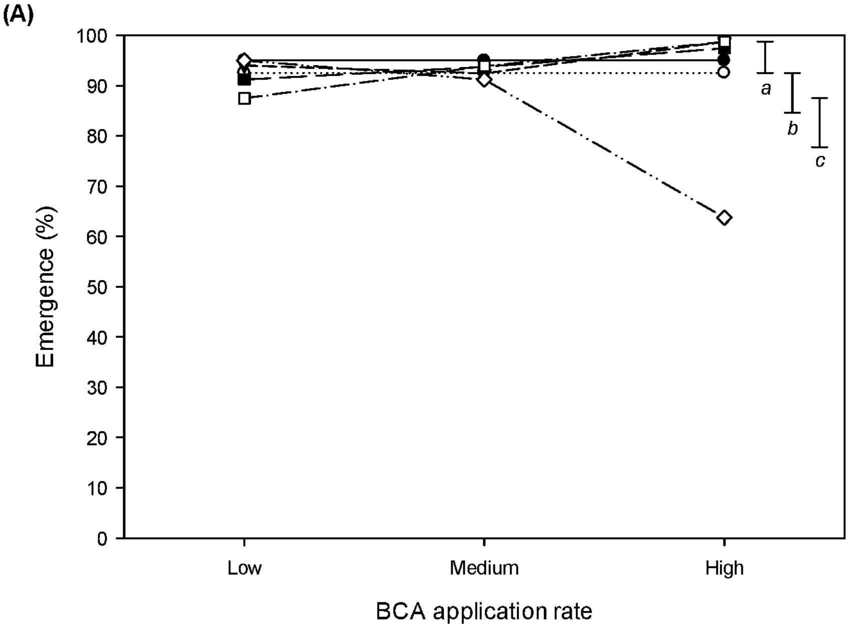
(B)
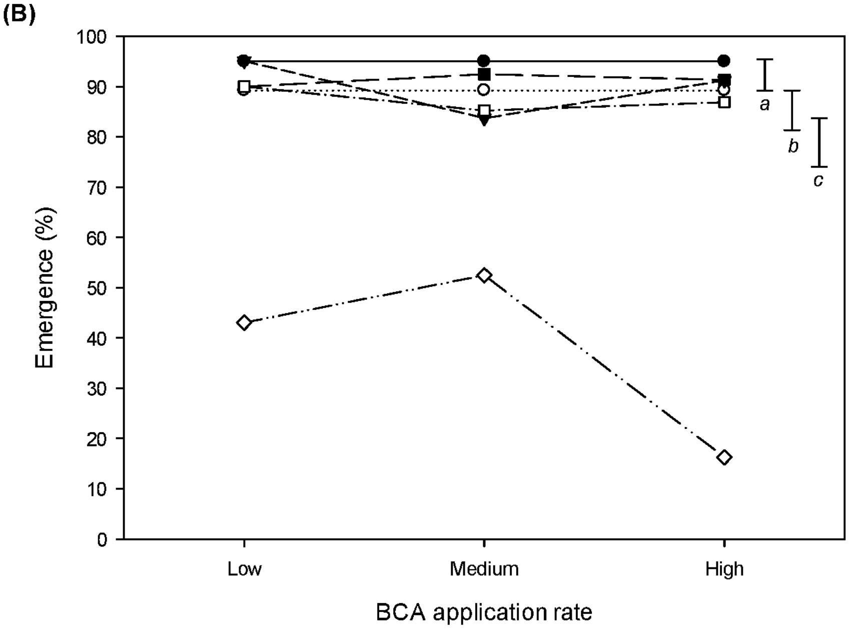

FIGURE 20

| Treatment | Replicates | Emergence (%) | Symptom infections (%) |
|---|---|---|---|
| Negative control | 5 | 96.7 | 27.5 |
| Positive control | 15 | 91.1 | 94.7 |
| 599 | 5 | 89.0 | 89.6 |
| 1657 | 5 | 91.1 | 89.1 |
| 235 | 5 | 87.8 | 88.8 |
| 1860 | 5 | 91.1 | 88.2 |
| 1774 | 5 | 90.2 | 88.1 |
| 152 | 5 | 88.9 | 87.8 |
| 1601 | 5 | 94.5 | 84.9 |
| 376 | 5 | 94.4 | 84.7 |
| 1953 | 5 | 95.6 | 83.1 |
| 76 | 5 | 95.6 | 76.1 |
| 1859 | 5 | 94.4 | 75.4 |
| 75 | 5 | 100.0 | 73.1 |
| 90 | 5 | 94.6 | 70.8 |
| **LSD (5%)** | **5 v. 5** | **8.5** | **14.5** |
| | **5 v. 15** | **7.0** | **11.9** |

FIGURE 21

| Treatment | BCA application method | Greenhouse | | Growth room | |
|---|---|---|---|---|---|
| | | Replicates | Emergence (%) | Replicates | Emergence (%) |
| Negative control | | 40 | 90.7 | 15 | 92.5 |
| Positive control | | 120 | 92.1 | 45 | 93.6 |
| 70 | Seed | 40 | 91.6 | 15 | 85.5 |
| 70 | Potting mix | 40 | 90.7 | 15 | 94.2 |
| 70 | Seed + Potting mix | 40 | 88.8 | 15 | 95.1 |
| 76 | Seed | 120 | 94.5 | 45 | 94.6 |
| 76 | Potting mix | 120 | 88.8 | 45 | 93.9 |
| 76 | Seed + Potting mix | 120 | 91.8 | 45 | 91.5 |
| 2137 | Seed | 40 | 91.6 | 15 | 89.2 |
| 2137 | Potting mix | 40 | 91.3 | 15 | 94.3 |
| 2137 | Seed + Potting mix | 40 | 92.9 | 15 | 89.2 |
| **LSD (5%)** | | **40 v. 40** | **5.1** | **15 v. 15** | **6.9** |
| | | **40 v. 120** | **4.2** | **15 v. 45** | **5.6** |
| | | **120 v. 120** | **2.9** | **45 v. 45** | **4.0** |
| | | | | | |
| **Significance of contrasts**[a] | | | | | |
| 70 | Seed | | ns | | ns |
| 70 | Potting mix | | ns | | * |
| 70 | Seed + Potting mix | | ns | | * |
| 76 | Seed | | * | | ns |
| 76 | Potting mix | | ** | | ns |
| 76 | Seed + Potting mix | | ns | | ns |
| 2137 | Seed | | ns | | * |
| 2137 | Potting mix | | ns | | ns |
| 2137 | Seed + Potting mix | | ns | | ns |
| Positive v. Negative control | | | ns | | ns |

[a]ns: non-significant; *: $p < 0.05$; **: $p < 0.01$

FIGURE 22

| Treatment | BCA application method | Replicates | Symptom infections (%) | Latent infections (%) | Total disease incidence (%) |
|---|---|---|---|---|---|
| Negative control | | 40 | [0.0][a] | 12.5 | 12.5 |
| Positive control | | 120 | 17.0 | 38.0 | 41.9 |
| 70 | Seed | 40 | 27.3 | 40.0 | 52.1 |
| 70 | Potting mix | 40 | 20.8 | 55.0 | 60.2 |
| 70 | Seed + Potting mix | 40 | 22.7 | 50.0 | 55.6 |
| 76 | Seed | 120 | 1.5 | 9.2 | 10.2 |
| 76 | Potting mix | 120 | 4.4 | 15.0 | 16.9 |
| 76 | Seed + Potting mix | 120 | 1.9 | 15.1 | 15.2 |
| 2137 | Seed | 40 | 6.3 | 20.0 | 23.8 |
| 2137 | Potting mix | 40 | 9.4 | 23.1 | 27.1 |
| 2137 | Seed + Potting mix | 40 | 16.3 | 45.0 | 46.2 |
| **LSD (5%)** | | **40 v. 40** | **7.1** | **17.7** | **17.2** |
| | | **40 v. 120** | **5.8** | **14.4** | **14.0** |
| | | **120 v. 120** | **4.1** | **10.2** | **9.9** |
| **LSEffect (5%)[b]** | | **40 v. 40** | **5.0** | | |
| | | **40 v. 120** | **4.1** | | |
| | | | | | |
| **Significance of contrasts[c]** | | | | | |
| 70 | Seed | | ** | ns | ns |
| 70 | Potting mix | | ns | * | ns |
| 70 | Seed + Potting mix | | ns | ns | ns |
| 76 | Seed | | *** | *** | *** |
| 76 | Potting mix | | *** | * | ** |
| 76 | Seed + Potting mix | | *** | *** | *** |
| 2137 | Seed | | ns | ns | ns |
| 2137 | Potting mix | | ns | ns | ns |
| 2137 | Seed + Potting mix | | *** | *** | ** |
| Positive v. negative control | | | | *** | *** |

[a]Excluded from ANOVA to achieve homogeneity of variance

[b]For pairwise statistical comparisons of a variable value with the negative control

[c]ns: non-significant; *: $p < 0.05$; : $p < 0.01$; *: $p < 0.001$

FIGURE 23

| Treatment | BCA application method | Replicates | Symptom infections (%) | Latent infections (%) | Total disease incidence (%) |
|---|---|---|---|---|---|
| Negative control[a] | | 15 | [0.0] | [0.0] | [0.0] |
| Positive control | | 45 | 25.9 | 48.9 | 59.3 |
| 70 | Seed | 15 | 40.0 | 40.0 | 57.8 |
| 70 | Potting mix | 15 | 21.7 | 13.3 | 33.3 |
| 70 | Seed + Potting mix | 15 | 27.2 | 26.7 | 46.7 |
| 76 | Seed | 45 | 5.6 | 8.9 | 13.3 |
| 76 | Potting mix | 45 | 5.6 | 2.2 | 7.8 |
| 76 | Seed + Potting mix | 45 | 3.9 | 11.1 | 14.4 |
| 2137 | Seed | 15 | 12.2 | 13.3 | 23.9 |
| 2137 | Potting mix | 15 | 20.0 | 13.3 | 28.3 |
| 2137 | Seed + Potting mix | 15 | 16.7 | 0.0 | 16.7 |
| **LSD (5%)** | | **15 v. 15** | **12.6** | **24.7** | **23.3** |
| | | **15 v. 45** | **10.3** | **20.2** | **19.0** |
| | | **45 v. 45** | **7.3** | **14.3** | **13.5** |
| **LSEffect (5%)[b]** | | **15 v. 15** | **8.9** | **17.5** | **16.5** |
| | | **15 v. 45** | **7.3** | **14.3** | **13.5** |
| | | | | | |
| **Significance of contrasts[c]** | | | | | |
| 70 | Seed | | * | ns | ns |
| 70 | Potting mix | | * | ** | * |
| 70 | Seed + Potting mix | | ns | ns | ns |
| 76 | Seed | | *** | ** | *** |
| 76 | Potting mix | | *** | *** | *** |
| 76 | Seed + Potting mix | | *** | *** | *** |
| 2137 | Seed | | * | ** | ** |
| 2137 | Potting mix | | ns | ** | * |
| 2137 | Seed + Potting mix | | ns | ns | ns |

[a]Excluded from ANOVA to achieve homogeneity of variance

[b]For pairwise statistical comparisons of a variable value with the negative control

[c]ns: non-significant; *: $p < 0.05$; : $p < 0.01$; *: $p < 0.001$

FIGURE 24

| Product | Company | Purpose | Rate | Active ingredient | | | Application time (d after sowing) | | | | |
|---|---|---|---|---|---|---|---|---|---|---|---|
| | | | | Name | Percentage | Rate | 9 | 16 | 23 | 30 | 38 |
| Acrobat MZ690 | BASF | Downy mildew | 4.00 g/L | Dimethomorph | 9.0 | 0.36 g/L | | | Yes | | |
| | | | 4.00 g/L | Mancozeb | 60.0 | 2.40 g/L | | | | | |
| Amistar WG | Syngenta | Downy mildew | 1.67 g/L | Azoxystrobin | 50.0 | 0.84 g/L | | Yes | | | Yes |
| Nautile | Etec Crop Solutions | Downy mildew | 4.00 g/L | Cymoxanil | 5.0 | 0.20 g/L | Yes | | | Yes | |
| | | | 4.00 g/L | Mancozeb | 68.0 | 2.72 g/L | | | | | |
| Agri-Fos 600 | Key Industries | General disease curative and protection | 8.00 mL/L | Phosphorous acid | 60.0 | 4.80 mL/L | Yes | Yes | Yes | Yes | Yes |
| Taratek 5F | Zelam | General disease protection | 2.67 mL/L | Chlorothalonil | 25.0 | 0.67 mL/L | Yes | Yes | Yes | Yes | Yes |
| | | | 2.67 mL/L | Thiophanate methyl | 25.0 | 0.67 mL/L | | | | | |
| Attack | Nufarm | Aphid and caterpillar | 2.00 mL/L | Pirimiphos-methyl | 47.5 | 0.95 mL/L | Yes | Yes | Yes | Yes | Yes |
| | | | 2.00 mL/L | Permethrin | 2.5 | 0.05 mL/L | | | | | |
| Bind-R Duo | SST New Zealand | Spreader/deposition/ retention agent | 1.33 mL/L | Synthetic latex | | | Yes | Yes | Yes | Yes | Yes |

FIGURE 26

| Treatment | Emergence (%) | Number leaves | | Root dry weight (g) | | Shoot dry weight (g) | |
|---|---|---|---|---|---|---|---|
| | | 22 DAS | 43 DAS | 22 DAS | 43 DAS | 22 DAS | 43 DAS |
| Negative control | 68.3 | 3.3 | 9.0 | 0.027 | 0.098 | 0.092 | 1.20 |
| 76 | 70.0 | 3.6 | 9.2 | 0.032 | 0.127 | 0.132 | 1.27 |
| 90 | 68.3 | 3.5 | 9.5 | 0.022 | 0.133 | 0.115 | 1.45 |
| 599 | 86.7 | 3.9 | 9.4 | 0.030 | 0.156 | 0.125 | 1.64 |
| 707 | 68.3 | 3.8 | 9.4 | 0.034 | 0.134 | 0.126 | 1.57 |
| 1708 | 81.7 | 3.7 | 9.2 | 0.032 | 0.127 | 0.118 | 1.53 |
| **LSD (5%)** | **17.4**[a] | **0.5**[a] | **0.8**[a] | **0.012**[a] | **0.068**[a] | **0.030**[a] | **0.42**[a] |
| | **14.2**[b] | **0.4**[b] | **0.7**[b] | **0.010**[b] | **0.056**[b] | **0.024**[b] | **0.35**[b] |

[a]For pairwise statistical comparisons of isolates

[b]For pairwise statistical comparisons of the negative control and an isolate

FIGURE 29

| Treatment | Inoculum type | Formulation concentration x $10^9$ (CFU/g) | Inoculum concentration x $10^8$ (CFU/mL) | Application rate | | | | Target rate | |
|---|---|---|---|---|---|---|---|---|---|
| | | | | Potting mix | | Seed, cell or plant | | Quantity x $10^9$ | Units |
| | | | | Quantity | Units | Quantity | Units | | |
| **Seed** | Freeze-dried | 500 | 50.0 | | | 0.60 | mL/g seed | 3.0 | CFU/g seed |
| | Non-formulated | | 50.0 | | | 0.60 | mL/g seed | 3.0 | CFU/g seed |
| **Cover mix**[a] | Granule | 8 | | 35.80 | g/L mix | 3.50 | mL mix/cell | 1.0 | CFU/cell |
| | Freeze-dried | 500 | 71.4 | 0.04 | L/L mix | 3.50 | mL mix/cell | 1.0 | CFU/cell |
| | Non-formulated | | 71.4 | 0.04 | L/L mix | 3.50 | mL mix/cell | 1.0 | CFU/cell |
| **Bulk mix**[b] | Granule | 8 | | 35.80 | g/L mix | 21.50 | mL mix/cell | 6.2 | CFU/cell |
| | Freeze-dried | 500 | 71.4 | 0.04 | L/L mix | 21.50 | mL mix/cell | 6.1 | CFU/cell |
| | Non-formulated | | 71.4 | 0.04 | L/L mix | 21.50 | mL mix/cell | 6.1 | CFU/cell |
| **Drench** | Freeze-dried | 500 | 2.9 | | | 3.50 | mL/cell | 1.0 | CFU/cell |
| | Non-formulated | | 2.9 | | | 3.50 | mL/cell | 1.0 | CFU/cell |
| **Foliar spray** | Freeze-dried | 500 | 333.0 | | | 0.03 | mL/plant | 1.0 | CFU/plant |
| | Non-formulated | | 333.0 | | | 0.03 | mL/plant | 1.0 | CFU/plant |

[a]Mix used to cover the seed
[b]Mix in which the seed was sown

| | Emergence (%) | | Disease incidence (%) | |
|---|---|---|---|---|
| | Growth room | Glasshouse[a] | Growth room | Glasshouse[a] |
| **Seed inoculant** | | | | |
| Nil | 95.2 | 93.5 | 21.9 | 33.0 |
| BCA[b] | 95.1 | 93.3 | 10.2 | 17.2 |
| **LSD (5%)** | **1.4** | **1.8** | **3.6** | **3.6** |
| *Significance of difference* | *ns*[c] | *ns* | *** | *** |
| **Seed formulation** | | | | |
| FD | 95.4 | 94.0 | 15.5 | 21.5 |
| NF | 94.9 | 92.8 | 16.6 | 28.6 |
| **LSD (5%)** | **1.4** | **1.8** | **3.6** | **3.6** |
| *Significance of difference* | *ns* | *ns* | *ns* | *** |
| **Bulk mix** | | | | |
| Nil | 95.3 | 93.4 | 17.4 | 25.1 |
| GL | 95.9 | 93.2 | 21.4 | 28.4 |
| FD | 93.7 | 93.5 | 12.4 | 25.2 |
| NF | 95.7 | 93.4 | 13.1 | 21.6 |
| **LSD (5%)** | **2.0** | **2.6** | **5.1** | **5.1** |
| *Significance of contrasts* | | | | |
| *(GL/FD/NF v. Nil)* | *ns* | *ns* | *ns* | *ns* |
| *(GL v. FD/NF)* | *ns* | *ns* | *** | * |
| *(GL v. Nil)* | *ns* | *ns* | *ns* | *ns* |
| *(FD/NF v. Nil)* | *ns* | *ns* | * | *ns* |
| *(FD v. NF)* | * | *ns* | *ns* | *ns* |
| **Cover mix** | | | | |
| Nil | 95.0 | 93.8 | 16.2 | 27.6 |
| GL | 93.9 | 94.5 | 17.8 | 28.2 |
| FD | 95.6 | 92.0 | 14.9 | 22.3 |
| NF | 96.1 | 93.2 | 15.5 | 22.2 |
| **LSD (5%)** | **2.0** | **2.6** | **5.1** | **5.1** |
| *Significance of contrasts* | | | | |
| *(GL/FD/NF v. Nil)* | *ns* | *ns* | *ns* | *ns* |
| *(GL v. FD/NF)* | * | *ns* | *ns* | ** |
| *(GL v. Nil)* | *ns* | *ns* | *ns* | *ns* |
| *(FD/NF v. Nil)* | *ns* | *ns* | *ns* | * |
| *(FD v. NF)* | *ns* | *ns* | *ns* | *ns* |
| **Drench** | | | | |
| Nil | 94.4 | 92.3 | 17.7 | 25.4 |
| FD | 95.3 | 93.8 | 14.8 | 22.4 |
| NF | 95.8 | 94.1 | 15.7 | 27.4 |
| **LSD (5%)** | **1.7** | **2.2** | **4.4** | **4.4** |
| *Significance of contrasts* | | | | |
| *(FD/NF v. Nil)* | *ns* | *ns* | *ns* | *ns* |
| *(FD v. NF)* | *ns* | *ns* | *ns* | * |

Fig. 30

| | | | | |
|---|---|---|---|---|
| **Foliar spray** | | | | |
| Nil | N/A[d] | N/A | 16.6 | 26.1 |
| FD | N/A | N/A | 16.3 | 23.4 |
| NF | N/A | N/A | 15.3 | 25.7 |
| **LSD (5%)** | | | **4.4** | **4.4** |
| *Significance of contrasts* | | | | |
| *(FD/NF v. Nil)* | | | *ns* | *ns* |
| *(FD v. NF)* | | | *ns* | *ns* |

[a]Grown in glasshouse for 30 days and greenhouse for 12 days

[b]Biocontrol agent

[c]ns: non-significant; *: $p < 0.05$; : $p < 0.01$; *: $p < 0.001$

[d]Not applicable

Fig. 30 cont.

| | Disease incidence (%) | |
|---|---|---|
| | Growth room | Glasshouse[a] |
| **Seed inoculant x seed formulation** | | |
| Nil x FD | 22.5 | 33.4 |
| Nil x NF | 21.3 | 32.5 |
| BCA[b] x FD | 8.6 | 9.6 |
| BCA x NF | 11.9 | 24.7 |
| **LSD (5%)** | **5.1** | **5.1** |
| *Significance of interaction* | *ns*[c] | *** |
| | | |
| **Seed inoculant x bulk mix** | | |
| Nil x Nil | 24.8 | 33.1 |
| Nil x GL | 30.3 | 41.8 |
| Nil x FD | 16.5 | 29.7 |
| Nil x NF | 16.1 | 27.3 |
| BCA x Nil | 10.1 | 17.1 |
| BCA x GL | 12.6 | 14.9 |
| BCA x FD | 8.2 | 20.7 |
| BCA x NF | 10.0 | 15.9 |
| **LSD (5%)** | **7.2** | **7.2** |
| *Significance of interaction contrasts* | | |
| *Seed inoculant x (GL/FD/NF v. Nil)* | *ns* | *ns* |
| *Seed inoculant x (GL v. FD/NF)* | * | *** |
| *Seed inoculant x (GL v. Nil)* | *ns* | * |
| *Seed inoculant x (FD/NF v. Nil)* | *ns* | *ns* |
| *Seed inoculant x (FD v. NF)* | *ns* | *ns* |
| | | |
| **Seed inoculant x cover mix** | | |
| Nil x Nil | 21.8 | 39.5 |
| Nil x GL | 22.6 | 36.9 |
| Nil x FD | 21.1 | 28.2 |
| Nil x NF | 22.2 | 27.3 |
| BCA x Nil | 10.6 | 15.7 |
| BCA x GL | 12.9 | 19.6 |
| BCA x FD | 8.7 | 16.3 |
| BCA x NF | 8.8 | 17.0 |
| **LSD (5%)** | **7.2** | **7.2** |
| *Significance of interaction contrasts* | | |
| *Seed inoculant x (GL/FD/NF v. Nil)* | *ns* | * |
| *Seed inoculant x (GL v. FD/NF)* | *ns* | *ns* |
| *Seed inoculant x (GL v. Nil)* | *ns* | *ns* |
| *Seed inoculant x (FD/NF v. Nil)* | *ns* | ** |
| *Seed inoculant x (FD v. NF)* | *ns* | *ns* |

Fig. 31

| | | |
|---|---|---|
| **Seed inoculant x drench** | | |
| Nil x Nil | 24.7 | 34.8 |
| Nil x FD | 19.8 | 30.6 |
| Nil x NF | 21.2 | 33.4 |
| BCA x Nil | 10.7 | 16.0 |
| BCA x FD | 9.8 | 14.1 |
| BCA x NF | 10.1 | 21.4 |
| **LSD (5%)** | **6.2** | **6.3** |
| *Significance of interaction contrasts* | | |
| *Seed inoculant x (FD/NF v. Nil)* | *ns* | *ns* |
| *Seed inoculant x (FD v. NF)* | *ns* | *ns* |
| **Seed inoculant x foliar spray** | | |
| Nil x Nil | 23.1 | 34.9 |
| Nil x FD | 21.5 | 29.4 |
| Nil x NF | 21.2 | 34.6 |
| BCA x Nil | 10.1 | 17.3 |
| BCA x FD | 11.1 | 17.3 |
| BCA x NF | 9.5 | 16.9 |
| **LSD (5%)** | **6.2** | **6.3** |
| *Significance of interaction contrasts* | | |
| *Seed inoculant x (FD/NF v. Nil)* | *ns* | *ns* |
| *Seed inoculant x (FD v. NF)* | *ns* | *ns* |

[a]Grown in glasshouse for 30 days and greenhouse for 12 days

[b]Biocontrol agent

[c]ns: non-significant; *: $p < 0.05$; : $p < 0.01$; *: $p < 0.001$

| Treatment | Symptom infections (%) | | Latent infections (%) | | Total disease incidence (%) | |
|---|---|---|---|---|---|---|
| | Method A | Method B | Method A | Method B | Method A | Method B |
| Positive control | 1.05 | 5.51 | 47.8 | 86.0 | 48.8 | 88.0 |
| Ep76 | 0.36 | 1.33 | 24.5 | 49.1 | 25.3 | 51.9 |
| **LSD (5%)** | **2.16** | | **24.6** | | **24.8** | |
| | **1.04**[a] | | **35.2**[a] | | **35.5**[a] | |

[a]For comparison of methods A and B within the same treatment

FIGURE 36

| Treatment | Incidence (%) | | | |
|---|---|---|---|---|
| | Xcc | | *Erwinia* sp. | |
| | Growth room | Nursery | Growth room | Nursery |
| Positive control | 3.19 | 3.94 | 2.00 | 2.87 |
| Ep76 | 0.30 | 0.87 | 13.57 | 10.61 |
| **LSD (5%)** | **5.23** | | **5.22** | |
| | **4.98**[a] | | **5.45**[a] | |
| | | | | |
| **Main effects** | | | | |
| Location | | | | |
| Biotron | 1.74 | | 7.78 | |
| Nursery | 2.41 | | 6.74 | |
| **LSD (5%)** | **6.57** | | **5.14** | |
| | | | | |
| Treatment | | | | |
| Positive control | 3.56 | | 2.43 | |
| Ep76 | 0.59 | | 12.09 | |
| **LSD (5%)** | **3.52** | | **3.85** | |
| | | | | |
| Block | | | | |
| 1 | [0.00] | | 14.37 | |
| 2 | 4.08 | | 7.05 | |
| 3 | 0.56 | | 3.57 | |
| 4 | 3.65 | | 4.06 | |
| **LSD (5%)** | **10.72** | | **7.26** | |
| **LSEffect (5%)**[b] | **7.60** | | | |
| | | | | |
| Significance of interaction | | | | |
| *Location x Treatment* | *ns* | | *ns* | |

[a]For comparison of treatments at the same location

[b]For pairwise statistical comparisons of a variable value with a constant value (i.e. a value in square brackets)

(A)

(B)

| Treatment | Average disease incidence (%)[a] |
|---|---|
| Positive control | 58.0 |
| 76 | 32.0 |
| 2137 | 37.1 |
| **LSD (5%)** | **9.8** |

[a]Area under the curve divided by the total number of days (A)

(B)

| Treatment | Average disease incidence (%)[a] |
| --- | --- |
| Positive control | 81.9 |
| 76 | 59.0 |
| 2137 | 59.5 |
| **LSD (5%)** | **6.6** |

[a]Area under the curve divided by the total number of days

SEQUENCE LISTING

<160> NUMBER OF SEQ ID NOS: 22

<210> SEQ ID NO 1
<211> LENGTH: 828
<212> TYPE: DNA
<213> ORGANISM: Erwinia persicinus

<400> SEQUENCE: 1

```
agtcgaacgg tagcacagag agcttgctct cgggtgacga gtggcggacg ggtgagtaat      60

gtctgggaaa ctgcccgatg gagggggata actactggaa acggtagcta ataccgcata     120

acgtcttcgg accaaagtgg gggaccttcg ggcctcacac catcggatgt gcccagatgg     180

gattagctag taggtggggt aacggctcac ctaggcgacg atccctagct ggtctgagag     240

gatgaccagc cacactggaa ctgagacacg gtccagactc ctacgggagg cagcagtggg     300

gaatattgca caatgggcgc aagcctgatg cagccatgcc gcgtgtatga agaaggcctt     360

cgggttgtaa agtactttca gtggggagga aggcgatgaa gttaataact tcgtcgattg     420

acgttacccg cagaagaagc accggctaac tccgtgccag cagccgcggt aatacggagg     480

gtgcaagcgt taatcggaat tactgggcgt aaagcgcacg caggcggtct gtcaagtcgg     540

atgtgaaatc cccgggctca acctgggaac tgcattcgaa actggcaggc tagagtcttg     600

tagagggggg tagaattcca ggtgtagcgg tgaaatgcgt agagatctgg aggaataccg     660

gtggcgaagg cggccccctg gacaaagact gacgctcagg tgcgaaagcg tggggagcaa     720

acaggattag ataccctggt agtccacgcc gtaaacgatg tcgacttgga ggttgtgccc     780

ttgaggcgtg gcttccggag ctaacgcgtt aagtcgaccg cctgggga                  828
```

<210> SEQ ID NO 2
<211> LENGTH: 630
<212> TYPE: DNA
<213> ORGANISM: Erwinia persicinus

<400> SEQUENCE: 2

```
acgctggaga gtgtgatgtc tgccacggca gtggcgcgaa agcgggtacc aagccgcaaa      60

cctgttcaac ctgccatggt gcgggccagg ttcagatgcg tcagggcttc tttactgtgc     120

agcaggcgtg tccgacctgt catggtcgcg gctcggtcat taaagatccg tgcaatgcct     180

gtcatggtca tggccgggta gaacgttcga agacgctatc ggtgaaaatt ccggcgggcg     240

tggataccgg tgaccgcatt cgtctgactg gcgaagggga agcgggtgag cagggcgcgc     300

cagcgggcga tctgtatgtc caggtgcagg tgcgtaagca caatatcttt gaacgtgaag     360

agaataacct gtactgcgaa gtgccgatta actttgtgat ggcggcactg gggggagaaa     420

tcgaagtccc tacgctggat ggccgcgtga agctgaaggt tccggcggaa acgcagaccg     480
```

-continued gtaagctgtt ccgcatgcgg ggcaagggtg tgaaatccgt acgcggtggt gcacagggtg 540
acctgctgtg ccgcgtagtg gtcgaaaccc cggtcagcct gaatgagaag cagaaatcgc 600
tgctacgtga actggaggaa agctttggcg 630

<210> SEQ ID NO 3
<211> LENGTH: 368
<212> TYPE: DNA
<213> ORGANISM: Erwinia persicinus

<400> SEQUENCE: 3
accatccgtg ttaccgctga gcgcgacccg gctaacctga agtgggatgc agtaggcgtg 60
gatgtggttg cagaagcgac cggtatcttc ctgaccgacg aaactgcacg taaacacatc 120
gaagcgggcg cgaagaaagt tgttctgacc ggtccatcta aagatgacac cccaatgttc 180
gttatgggtg taaaccacaa gtcttacgct ggccaggata tcgtttcaaa tgcttcctgt 240
accaccaact gcctggcacc gctggcaaaa gtgatcaacg acaacttcgg tatcgttgaa 300
gcactgatga ccactgtaca cgcaacaact gcgactcaga aaaccgttga tggcccgtct 360
cacaaaga 368

<210> SEQ ID NO 4
<211> LENGTH: 496
<212> TYPE: DNA
<213> ORGANISM: Erwinia persicinus

<400> SEQUENCE: 4
ctgtgcattt atcgatgccg agcatgctct ggacccggtc tacgctaaaa aactgggcgt 60
ggatatcgat aacttgctgt gttctcagcc ggataccggt gagcaggcgc tggaaatctg 120
tgatgcgctg gcccgttccg gtgcggttga cgtcatcatc gtcgactccg tagcggcgtt 180
gacaccaaaa gcagaaatcg aaggtgaaat cggtgactct catatgggcc ttgcggcacg 240
tatgatgagc caggcgatgc gtaagctggc cggtaacctg aagaactccg gtacgctgct 300
gatctttatc aaccagatcc gtatgaaaat tggcgtgatg ttcggtaacc cggaaaccac 360
taccggtggt aacgctctga aattctacgc ttctgtccgt ctggatattc gccgcatcgg 420
cgcgatcaaa gagggtgatg aagtggtggg tagcgaaacc cgcgttaaag tggtgaaaaa 480
caaaatcgca gcaccg 496

<210> SEQ ID NO 5
<211> LENGTH: 828
<212> TYPE: DNA
<213> ORGANISM: Erwinia persicinus

<400> SEQUENCE: 5
agtcgaacgg tagcacagag agcttgctct cgggtgacga gtggcggacg ggtgagtaat 60
gtctgggaaa ctgcccgatg gagggggata actactggaa acggtagcta ataccgcata 120
acgtcttcgg accaaagtgg gggaccttcg ggcctcacac catcggatgt gcccagatgg 180
gattagctag taggtggggt aacggctcac ctaggcgacg atccctagct ggtctgagag 240
gatgaccagc cacactggaa ctgagacacg gtccagactc ctacgggagg cagcagtggg 300
gaatattgca caatgggcgc aagcctgatg cagccatgcc gcgtgtatga agaaggcctt 360
cgggttgtaa agtactttca gtggggagga aggcgatgaa gttaataact tcgtcgattg 420
acgttacccg cagaagaagc accggctaac tccgtgccag cagccgcggt aatacggagg 480
gtgcaagcgt taatcggaat tactgggcgt aaagcgcacg caggcggtct gtcaagtcgg 540
atgtgaaatc cccgggctca acctgggaac tgcattcgaa actggcaggc tagagtcttg 600
tagagggggg tagaattcca ggtgtagcgg tgaaatgcgt agagatctgg aggaataccg 660
gtggcgaagg cggccccctg gacaaagact gacgctcagg tgcgaaagcg tggggagcaa 720
acaggattag ataccctggt agtccacgcc gtaaacgatg tcgacttgga ggttgtgccc 780
ttgaggcgtg gcttccggag ctaacgcgtt aagtcgaccg cctgggga 828

<210> SEQ ID NO 6
<211> LENGTH: 630
<212> TYPE: DNA
<213> ORGANISM: Erwinia persicinus

<400> SEQUENCE: 6
acgctggaga gtgtgatgtc tgccacggca gtggcgcgaa agcgggtacc aagccgcaaa 60
cctgttcaac ctgccatggt gcgggccagg ttcagatgcg tcagggcttc tttactgtgc 120
agcaggcgtg tccgacctgt catggtcgcg gctcggtcat taaagatccg tgcaatgcct 180
gtcatggtca tggccgggta gaacgttcga agacgctatc ggtgaaaatt ccggcgggcg 240
tggataccgg tgaccgcatt cgtctgactg gcgaagggga agcgggtgag cagggcgcgc 300
cagcgggcga tctgtatgtc caggtgcagg tgcgtaagca caatatcttt gaacgtgaag 360
agaataacct gtactgcgaa gtgccgatta actttgtgat ggcggcactg gggggagaaa 420
tcgaagtccc tacgctggat ggccgcgtga agctgaaggt tccggcggaa acgcagaccg 480
gtaagctgtt ccgcatgcgg ggcaagggtg tgaaatccgt acgcggtggt gcacagggtg 540
acctgctgtg ccgcgtagtg gtcgaaaccc cggtcagcct gaatgagaag cagaaatcgc 600
tgctacgtga actggaggaa agctttggcg 630

<210> SEQ ID NO 7
<211> LENGTH: 368
<212> TYPE: DNA
<213> ORGANISM: Erwinia persicinus

<400> SEQUENCE: 7
accatccgtg ttaccgctga gcgcgacccg gctaacctga agtgggatgc agtaggcgtg 60
gatgtggttg cagaagcgac cggtatcttc ctgaccgacg aaactgcacg taaacacatc 120
gaagcgggcg cgaagaaagt tgttctgacc ggtccatcta aagatgacac cccaatgttc 180
gttatgggtg taaaccacaa gtcttacgct ggccaggata tcgtttcaaa tgcttcctgt 240
accaccaact gcctggcacc gctggcaaaa gtgatcaacg acaacttcgg tatcgttgaa 300
gcactgatga ccactgtaca cgcaacaact gcgactcaga aaaccgttga tggcccgtct 360
cacaaaga 368

<210> SEQ ID NO 8
<211> LENGTH: 496
<212> TYPE: DNA
<213> ORGANISM: Erwinia persicinus

<400> SEQUENCE: 8
ctgtgcattt atcgatgccg agcatgctct ggacccggtc tacgctaaaa aactgggcgt 60
ggatatcgat aacttgctgt gttctcagcc ggataccggt gagcaggcgc tggaaatctg 120
tgatgcgctg gcccgttccg gtgcggttga cgtcatcatc gtcgactccg tagcggcgtt 180
gacaccaaaa gcagaaatcg aaggtgaaat cggtgactct catatgggcc ttgcggcacg 240
tatgatgagc caggcgatgc gtaagctggc cggtaacctg aagaactccg gtacgctgct 300
gatctttatc aaccagatcc gtatgaaaat tggcgtgatg ttcggtaacc cggaaaccac 360
taccggtggt aacgctctga aattctacgc ttctgtccgt ctggatattc gccgcatcgg 420
cgcgatcaaa gagggtgatg aagtggtggg tagcgaaacc cgcgttaaag tggtgaaaaa 480
caaaatcgca gcaccg 496

<210> SEQ ID NO 9
<211> LENGTH: 828
<212> TYPE: DNA
<213> ORGANISM: Erwinia persicinus

<400> SEQUENCE: 9
agtcgaacgg tagcacagag agcttgctct cgggtgacga gtggcggacg ggtgagtaat 60
gtctgggaaa ctgcccgatg gagggggata actactggaa acggtagcta ataccgcata 120
acgtcttcgg accaaagtgg gggaccttcg ggcctcacac catcggatgt gcccagatgg 180
gattagctag taggtggggt aacggctcac ctaggcgacg atccctagct ggtctgagag 240
gatgaccagc cacactggaa ctgagacacg gtccagactc ctacgggagg cagcagtggg 300
gaatattgca caatgggcgc aagcctgatg cagccatgcc gcgtgtatga agaaggcctt 360
cgggttgtaa agtactttca gtggggagga aggcgatgaa gttaataact tcgtcgattg 420
acgttacccg cagaagaagc accggctaac tccgtgccag cagccgcggt aatacggagg 480
gtgcaagcgt taatcggaat tactgggcgt aaagcgcacg caggcggtct gtcaagtcgg 540
atgtgaaatc cccgggctca acctgggaac tgcattcgaa actggcaggc tagagtcttg 600
tagagggggg tagaattcca ggtgtagcgg tgaaatgcgt agagatctgg aggaataccg 660
gtggcgaagg cggcccctg gacaaagact gacgctcagg tgcgaaagcg tggggagcaa 720
acaggattag ataccctggt agtccacgcc gtaaacgatg tcgacttgga ggttgtgccc 780
ttgaggcgtg gcttccggag ctaacgcgtt aagtcgaccg cctgggga 828

<210> SEQ ID NO 10
<211> LENGTH: 630
<212> TYPE: DNA
<213> ORGANISM: Erwinia persicinus

<400> SEQUENCE: 10
acgctggaga gtgtgatgtc tgccacggca gtggcgcgaa agcgggtacc aagccgcaaa 60
cctgttcaac ctgccatggt gcgggccagg ttcagatgcg tcagggcttc tttactgtgc 120
agcaggcgtg tccgacctgt catggtcgcg gctcggtcat taaagatccg tgcaatgcct 180
gtcatggtca tggccgggta gaacgttcga agacgctatc ggtgaaaatt ccggcgggcg 240
tggataccgg tgaccgcatt cgtctgactg gcgaagggga agcgggtgag cagggcgcgc 300
cagcgggcga tctgtatgtc caggtgcagg tgcgtaagca caatatcttt gaacgtgaag 360
agaataacct gtactgcgaa gtgccgatta actttgtgat ggcggcactg gggggagaaa 420
tcgaagtccc tacgctggat ggccgcgtga agctgaaggt tccggcggaa acgcagaccg 480
gtaagctgtt ccgcatgcgg ggcaagggtg tgaaatccgt acgcggtggt gcacagggtg 540
acctgctgtg ccgcgtagtg gtcgaaaccc cggtcagcct gaatgagaag cagaaatcgc 600
tgctacgtga actggaggaa agctttggcg 630

<210> SEQ ID NO 11
<211> LENGTH: 368
<212> TYPE: DNA
<213> ORGANISM: Erwinia persicinus

<400> SEQUENCE: 11

```
accatccgtg ttaccgctga gcgcgacccg gctaacctga agtgggatgc agtaggcgtg     60
gatgtggttg cagaagcgac cggtatcttc ctgaccgacg aaactgcacg taaacacatc    120
gaagcgggcg cgaagaaagt tgttctgacc ggtccatcta aagatgacac cccaatgttc    180
gttatgggtg taaaccacaa gtcttacgct ggccaggata tcgtttcaaa tgcttcctgt    240
accaccaact gcctggcacc gctggcaaaa gtgatcaacg acaacttcgg tatcgttgaa    300
gcactgatga ccactgtaca cgcaacaact gcgactcaga aaaccgttga tggcccgtct    360
cacaaaga                                                             368
```

<210> SEQ ID NO 12
<211> LENGTH: 496
<212> TYPE: DNA
<213> ORGANISM: Erwinia persicinus

<400> SEQUENCE: 12

```
ctgtgcattt atcgatgccg agcatgctct ggacccggtc tacgctaaaa aactgggcgt     60
ggatatcgat aacttgctgt gttctcagcc ggataccggt gagcaggcgc tggaaatctg    120
tgatgcgctg gcccgttccg gtgcggttga cgtcatcatc gtcgactccg tagcggcgtt    180
gacaccaaaa gcagaaatcg aaggtgaaat cggtgactct catatgggcc ttgcggcacg    240
tatgatgagc caggcgatgc gtaagctggc cggtaacctg aagaactccg gtacgctgct    300
gatctttatc aaccagatcc gtatgaaaat tggcgtgatg ttcggtaacc cggaaaccac    360
taccggtggt aacgctctga aattctacgc ttctgtccgt ctggatattc gccgcatcgg    420
cgcgatcaaa gagggtgatg aagtggtggg tagcgaaacc cgcgttaaag tggtgaaaaa    480
caaaatcgca gcaccg                                                    496
```

<210> SEQ ID NO 13
<211> LENGTH: 828
<212> TYPE: DNA
<213> ORGANISM: Erwinia persicinus

<400> SEQUENCE: 13

```
agtcgaacgg tagcacagag agcttgctct cgggtgacga gtggcggacg ggtgagtaat     60
gtctgggaaa ctgcccgatg gagggggata actactggaa acggtagcta ataccgcata    120
acgtcttcgg accaaagtgg gggaccttcg ggcctcacac catcggatgt gcccagatgg    180
gattagctag taggtggggt aacggctcac ctaggcgacg atccctagct ggtctgagag    240
gatgaccagc cacactggaa ctgagacacg gtccagactc ctacgggagg cagcagtggg    300
gaatattgca caatgggcgc aagcctgatg cagccatgcc gcgtgtatga agaaggcctt    360
cgggttgtaa agtactttca gtggggagga aggcgatgaa gttaataact tcgtcgattg    420
acgttacccg cagaagaagc accggctaac tccgtgccag cagccgcggt aatacggagg    480
gtgcaagcgt taatcggaat tactgggcgt aaagcgcacg caggcggtct gtcaagtcgg    540
atgtgaaatc cccgggctca acctgggaac tgcattcgaa actggcaggc tagagtcttg    600
tagagggggg tagaattcca ggtgtagcgg tgaaatgcgt agagatctgg aggaataccg    660
gtggcgaagg cggccccctg gacaaagact gacgctcagg tgcgaaagcg tggggagcaa    720
acaggattag ataccctggt agtccacgcc gtaaacgatg tcgacttgga ggttgtgccc    780
ttgaggcgtg gcttccggag ctaacgcgtt aagtcgaccg cctgggga                 828
```

<210> SEQ ID NO 14
<211> LENGTH: 630
<212> TYPE: DNA
<213> ORGANISM: Erwinia persicinus

<400> SEQUENCE: 14
acgctggaga gtgtgatgtc tgccacggca gtggcgcgaa agcgggtacc aagccgcaaa 60
cctgttcaac ctgccatggt gcgggccagg ttcagatgcg tcagggcttc tttactgtgc 120
agcaggcgtg tccgacctgt catggtcgcg gctcggtcat taaagatccg tgcaatgcct 180
gtcatggtca tggccgggta gaacgttcga agacgctatc ggtgaaaatt ccggcgggcg 240
tggataccgg tgaccgcatt cgtctgactg gcgaagggga agcgggtgag cagggcgcgc 300
cagcgggcga tctgtatgtc caggtgcagg tgcgtaagca caatatcttt gaacgtgaag 360
agaataacct gtactgcgaa gtgccgatta actttgtgat ggcggcactg gggggagaaa 420
tcgaagtccc tacgctggat ggccgcgtga agctgaaggt tccggcggaa acgcagaccg 480
gtaagctgtt ccgcatgcgg ggcaagggtg tgaaatccgt acgcggtggt gcacagggtg 540
acctgctgtg ccgcgtagtg gtcgaaaccc cggtcagcct gaatgagaag cagaaatcgc 600
tgctacgtga actggaggaa agctttggcg 630

<210> SEQ ID NO 15
<211> LENGTH: 368
<212> TYPE: DNA
<213> ORGANISM: Erwinia persicinus

<400> SEQUENCE: 15
accatccgtg ttaccgctga gcgcgacccg gctaacctga agtgggatgc agtaggcgtg 60
gatgtggttg cagaagcgac cggtatcttc ctgaccgacg aaactgcacg taaacacatc 120
gaagcgggcg cgaagaaagt tgttctgacc ggtccatcta aagatgacac cccaatgttc 180
gttatgggtg taaaccacaa gtcttacgct ggccaggata tcgtttcaaa tgcttcctgt 240
accaccaact gcctggcacc gctggcaaaa gtgatcaacg acaacttcgg tatcgttgaa 300
gcactgatga ccactgtaca cgcaacaact gcgactcaga aaaccgttga tggcccgtct 360
cacaaaga 368

<210> SEQ ID NO 16
<211> LENGTH: 496
<212> TYPE: DNA
<213> ORGANISM: Erwinia persicinus

<400> SEQUENCE: 16
ctgtgcattt atcgatgccg agcatgctct ggacccggtc tacgctaaaa aactgggcgt 60
ggatatcgat aacttgctgt gttctcagcc ggataccggt gagcaggcgc tggaaatctg 120
tgatgcgctg gcccgttccg gtgcggttga cgtcatcatc gtcgactccg tagcggcgtt 180
gacaccaaaa gcagaaatcg aaggtgaaat cggtgactct catatgggcc ttgcggcacg 240
tatgatgagc caggcgatgc gtaagctggc cggtaacctg aagaactccg gtacgctgct 300
gatctttatc aaccagatcc gtatgaaaat tggcgtgatg ttcggtaacc cggaaaccac 360
taccggtggt aacgctctga aattctacgc ttctgtccgt ctggatattc gccgcatcgg 420
cgcgatcaaa gagggtgatg aagtggtggg tagcgaaacc cgcgttaaag tggtgaaaaa 480
caaaatcgca gcaccg 496

<210> SEQ ID NO 17
<211> LENGTH: 20
<212> TYPE: DNA
<213> ORGANISM: Artificial Sequence
<220> FEATURE:
<223> OTHER INFORMATION: Primer

<400> SEQUENCE: 17
tggaagaagc ggtacgcggc 20

<210> SEQ ID NO 18
<211> LENGTH: 20
<212> TYPE: DNA
<213> ORGANISM: Artificial Sequence
<220> FEATURE:
<223> OTHER INFORMATION: Primer

<400> SEQUENCE: 18
accggatgga ccgccaaagc 20

<210> SEQ ID NO 19
<211> LENGTH: 23
<212> TYPE: DNA
<213> ORGANISM: Artificial Sequence
<220> FEATURE:
<223> OTHER INFORMATION: Primer

<400> SEQUENCE: 19
tggcaccgtg gaagtcaaag acg 23

<210> SEQ ID NO 20
<211> LENGTH: 20
<212> TYPE: DNA
<213> ORGANISM: Artificial Sequence
<220> FEATURE:
<223> OTHER INFORMATION: Primer

<400> SEQUENCE: 20
cgccgcgcca gtctttgtga 20

<210> SEQ ID NO 21
<211> LENGTH: 21
<212> TYPE: DNA
<213> ORGANISM: Artificial Sequence
<220> FEATURE:
<223> OTHER INFORMATION: Primer

<400> SEQUENCE: 21
ctgacgctgc aggttatcgc t 21

<210> SEQ ID NO 22
<211> LENGTH: 21
<212> TYPE: DNA
<213> ORGANISM: Artificial Sequence
<220> FEATURE:
<223> OTHER INFORMATION: Primer

<400> SEQUENCE: 22
gcctgtttaa acggtgctgc g 21

BIOCONTROL COMPOSITIONS

TECHNICAL FIELD

This invention relates to novel strains of *Erwinia persicina* and compositions containing same. Methods for the biological control of plant pathogens using the novel strains and compositions are also provided.

BACKGROUND OF THE INVENTION

Plant disease represents a significant economic cost to modern agriculture. Current systems of agriculture often require one or a few crops or plant types to be grown over a large area. Such an ecologically unbalanced system is susceptible to disease.

Traditionally, control of plant pathogens has been pursued through the use of chemical pesticides. However, consumers are becoming increasingly concerned about chemical residues and their effects on animal and plant health, and the environment. Moreover, many plant pathogens are becoming resistant to available pesticides.

Biological control represents an alternative means of controlling plant disease which reduces dependence on chemicals. Such "natural" methods enjoy greater public acceptance, and may be more effective and sustainable than chemical control methods.

While a wide range of biological control agents including bacteria, yeast and fungi have been investigated for use in controlling plant disease, they must be carefully screened for a range of traits relevant to their proposed use. These traits include plant pathogenicity, antagonistic activity and specificity, amenability to manipulation in delivery systems and formulations, and performance under fluctuating field conditions with target plants. Establishment and performance in the field is often the most difficult challenge to overcome.

*Xanthomonas campestris* pv. *campestris* (Xcc) is the causal agent of black rot in brassicas. Black rot is a seed-borne disease, and in cool wet conditions, Xcc can spread symptomlessly through seed crops to infect the seeds (Rimmer et al. 2007). The seed is considered the primary source of the pathogen inoculum. Seed infection levels as low as 0.05% can lead to field epidemics of black rot (Schaad et al. 1980).

One object of the present invention is therefore to provide novel strains of *E. persicina* useful as biocontrol agents and/or growth promotants in Brassicaceae. Another object is to provide a composition comprising at least one of the novel *E. persicina* strains of the invention; and/or to at least provide the public with a useful choice.

SUMMARY OF THE INVENTION

The applicant's invention provides a number of new *Erwinia persicina* strains that are highly effective as biocontrol agents and/or growth promotants in Brassicaceae.

To the best of the applicant's knowledge, these are the first *Erwinia persicina* strains isolated with activity against any pathogens of Brassicaceae species, and the first *Erwinia persicina* strains isolated with activity against any *Xanthomonas* species. Surprisingly, the strains of *Erwinia persicina* have biological control activity against multiple plant pathogens.

Products

Strains

In one aspect the invention provides an isolated *Erwinia persicina* strain with activity against at least one of:

a) at least one *Xanthomonas* species, and
b) at least one Brassicaceae pathogen.

In one embodiment the at least one Brassicaceae pathogen is a *Xanthomonas* species.

In one embodiment the at least one *Xanthomonas* species causes black rot in a plant species.

In one embodiment the at least one *Xanthomonas* species causes black rot in the Brassicaceae plant species.

In one embodiment the at least one *Xanthomonas* species is a *Xanthomonas campestris*.

In a further embodiment the at least one *Xanthomonas* species is *Xanthomonas campestris* pv. *campestris*.

In one embodiment the Brassicaceae is from a *Brassica* genus. Preferred *Brassica* species include *B. oleracea* and *B. rapa*.

In one embodiment the *Erwinia persicina* strain is in the form of a biologically pure culture.

The isolated *E. persicina* strain or biologically pure culture may be selected from any one of the strains deposited as:

a) DSM 32302,
b) DSM 32304,
c) DSM 32305, and
d) DSM 32303.

In a further aspect the invention provides a biologically pure culture of the *Erwinia persicina* strain deposited as DSM 32302.

In a further aspect the invention provides a biologically pure culture of the *Erwinia persicina* strain deposited as DSM 32304.

In a further aspect the invention provides a biologically pure culture of the *Erwinia persicina* strain deposited as DSM 32305.

In a further aspect the invention provides a biologically pure culture of the *Erwinia persicina* strain deposited as DSM 32303.

Compositions

In a further aspect, the invention provides a composition comprising at least one *E. persicina* strain of the invention.

In one embodiment the composition comprises the strain and at least one of:

a) a carrier,
b) a diluent, and
c) an adjuvant.

In one embodiment the carrier is an agriculturally acceptable carrier.

Therefore in one embodiment, the invention provides a composition comprising one or more strains of *E. persicina* selected from those deposited as:

a) DSM 32302,
b) DSM 32304,
c) DSM 32305, and
d) DSM 32303, and at least one of:

i) a carrier,
ii) a diluent, and
iii) an adjuvant.

In one embodiment the carrier is an agriculturally acceptable carrier.

In one embodiment the composition comprises at least two *E. persicina* strains of the invention. In a further embodiment the composition comprises at least three *E. persicina* strains of the invention. In a further embodiment the composition comprises at least four *E. persicina* strains of the invention.

In one embodiment the composition is a bactericidal composition.

In one embodiment the composition of the invention is formulated as a seed coating.

In another embodiment, the composition is in the form of a pellet or granule.

In one embodiment, the composition is at least one of:

(a) a biological control composition, and (b) a plant growth promoting composition.

In one embodiment the strain in the composition is live, or viable.

In a further embodiment the strain in the composition is freeze dried or lyophilised.

In a further embodiment the strain in the composition is dead, or non-viable

Plants/Plant Parts in Combination with Compositions

In a further aspect the invention provides a plant or part thereof, in connection with a composition of the invention.

In one embodiment the plant, or part thereof, is in connection with the composition as a result of applying, spraying, bio-priming, or coating the plant, or part thereof with, the composition.

In a preferred embodiment, the invention provides a seed coated with a composition of the invention.

In a further embodiment the invention provides a seed coated with a strain of the invention.

In a further preferred embodiment, the invention provides a seed bio-primed with a composition of the invention.

In a further embodiment the invention provides a seed bio-primed with a strain of the invention.

Methods

In a further aspect the invention provides a method for controlling at least one of:

a) at least one Brassicaceae pathogen, and b) at least one *Xanthomonas* species, the method comprising contacting the at least one Brassicaceae pathogen, or the at least one *Xanthomonas* species with a strain or composition of the invention.

In another aspect, the invention provides a method for at least one of:

a) controlling at least one Brassicaceae pathogen on or in a plant, plant part, seed, or soil;

b) controlling at least one *Xanthomonas* species on or in a plant, plant part, seed, or soil; and c) promoting growth of a Brassicaceae plant;

the method comprising applying the at least one strain or composition to said plant, plant part, seed, or soil.

In one embodiment the strain or composition has a direct effect to control the at least one Brassicaceae pathogen or at least one *Xanthomonas* species.

In a further embodiment the strain or composition affects induced systemic resistance in the plant, plant part, or seed, to control the at least one Brassicaceae pathogen or at least one *Xanthomonas* species.

Preferably, the at least one plant pathogen is selected from a *Xanthomonas* species. More preferably the *Xanthomonas* species is a *Xanthomonas campestris*. Most preferably, the *Xanthomonas* species causes black rot (*Xanthomonas campestris* pv. *campestris*).

Preferably the plant, plant part, or seed is from a Brassicaceae plant.

In one embodiment the Brassicaceae plant is from a *Brassica* genus. Preferred *Brassica* species include *B. oleracea* and *B. rapa.*

In one embodiment the at least one strain or composition is applied to a seed hole before planting a seed. The seed then contacts the at least one strain or composition when it is planted in the seed hole.

In a preferred embodiment the at least one strain or composition is applied to a seed of a plant before planting.

In a more preferred embodiment the at least one strain or composition is applied to the seed in the form of a seed coat.

In another preferred embodiment the at least one strain or composition is applied to the seed by bio-priming.

In a further aspect the invention provides a method for inoculating a plant, or plant part, with at least one strain or composition of the invention, the method comprising contacting the plant, or plant part, with at least one strain or composition of the invention.

In one embodiment the plant part is a seed.

In a further embodiment the seed is coated with the at least one strain or composition of the invention.

In a further embodiment the seed is bio-primed with the at least one strain or composition of the invention.

In a further embodiment the seed is bio-primed by contacting the seed with a composition of the invention in liquid form.

In a further embodiment the plant, or plant part, is inoculated by horizontal transmission of at least one strain of the invention from another plant that has previously been inoculated with at least one strain or composition of the invention.

In a further aspect the invention provides a method for producing a plant, or plant part, inoculated with at least one strain or composition of the invention, the method comprising contacting the plant, or plant part, with at least one strain or composition of the invention.

In one embodiment the plant part is a seed.

In a further embodiment the inoculated seed is produced by coating the seed with at least one strain or composition of the invention.

In a further embodiment the inoculated seed is produced by bio-priming the seed with at least one strain or composition of the invention.

In a further embodiment the inoculated seed is bio-primed by contacting the seed with at least one composition of the invention in liquid form.

In a further embodiment the inoculated plant, or plant part, is inoculated by horizontal transmission of at least one strain of the invention from another plant that has previously been inoculated with at least one strain or composition of the invention.

In a further embodiment the inoculated plant, or plant part, is produced as a propagule or progeny of another plant that has previously been inoculated with at least one strain or composition of the invention. In this embodiment the propagule or progeny plant is inoculated as a consequence of vertical transmission of at least one strain of the invention from the other plant to the propagule or progeny. In a preferred embodiment the inoculated propagule is an inoculated seed.

Preferably the inoculated plant, or plant part, is more resistant to:

a) at least one Brassicaceae pathogen, and b) at least one *Xanthomonas* species, than the non-inoculated plant, or plant part.

Preferably, the at least one plant pathogen is selected from a *Xanthomonas* species. More preferably the *Xanthomonas* species is a *Xanthomonas campestris*. Most preferably, the *Xanthomonas* species causes black rot (*Xanthomonas campestris* pv. *campestris*).

Preferably the plant, plant part, or seed is from a Brassicaceae plant.

In one embodiment the Brassicaceae plant is from a *Brassica* genus. Preferred *Brassica* species include *B. oleracea* and *B. rapa*.

Definitions

The term "contacting" as used herein refers to the provision of a composition, or strain(s), of the invention to a plant in a manner useful to affect plant pathogen control.

The term "control", "controlling", "biocontrol" or "biological control" are used interchangeably herein to refer to reduction in numbers of pathogens, particularly seed borne pathogens, accomplished using the strains or compositions of the invention.

Generally comprehended is the reduction in disease incidence or severity, or inhibition of the rate of transmission. Transmission includes vertical and horizontal transmission.

The term "activity" or "bioactivity" means is able to "control" as defined above.

The term "inoculate" or "inoculating" refers to contacting a plant, or part thereof, with a strain or composition of the invention. Following inoculation, the strain of the invention, or in the composition of the invention, may remain on, grow on, or colonise at least one of:

a) the surface of the plant, or plant part,
b) the interior or the plant, or plant part,
c) the rhizosphere of the plant
d) the rhizosphere of a plant grown from the plant part.

The term "plant part" includes any part of a plant. Preferred plant parts include propagules.

The term "propagule" means any part of a plant that may be used in reproduction or propagation, either sexual or asexual, including seeds and cuttings. A preferred propagule is a seed.

The term "bio-prime" or "bio-priming" is well known to those skilled in the art. Bio-priming is a process of biological seed treatment that involves a combination of seed hydration (physiological aspect of disease control) and inoculation (biological aspect of disease control) of seed with a beneficial organism to protect seed, or plant produced from the seed (Nayaka et al. 2008; Reddy 2013). Bio-priming is also exemplified in Example 4.

The term "horizontal transmission" refers to transfer of an organism, such as a strain of the invention, from one plant to another plant.

The term "vertical transmission" refers to transfer of an organism, such as a strain of the invention, from one plant to a propagule or progeny of the same plant.

The term "rhizosphere" means the region of soil in the vicinity of plant roots in which the chemistry and microbiology is influenced by their growth, respiration, and nutrient exchange.

The term "comprising" as used in this specification means "consisting at least in part of". When interpreting each statement in this specification that includes the term "comprising", features other than that or those prefaced by the term may also be present. Related terms such as "comprise" and "comprises", and the terms "including", "include" and "includes" are to be interpreted in the same manner.

The term "consisting essentially of" when used in this specification refers to the features stated and allows for the presence of other features that do not materially alter the basic characteristics of the features specified.

The term "agriculturally acceptable carrier" covers all liquid and solid carriers known in the art such as water and oils, as well as adjuvants, dispersants, binders, wettants, surfactants, humectants, tackifiers, fillers, protectants, and the like that are ordinarily known for use in the preparation of control compositions, including bactericidal compositions.

The term "effective amount" as used herein means an amount effective to control or eradicate plant pathogens in accordance with the invention.

The term "biologically pure culture" or "biologically pure isolate" as used herein refers to a culture of an *E. persicina* strain of the invention comprising at least 90%, preferably 95%, preferably 99% and more preferably at least 99.5% cells of the *E. persicina* strain.

The term "plant pathogen" as used herein refers to organisms that are of inconvenience to plants. In one embodiment the term refers to organisms that cause damage to plants. The damage may relate to plant health, growth, yield, reproduction or viability, and may be cosmetic damage. Preferably the damage is of commercial significance. Preferably the plants are cultivated plants.

The term "Brassicaceae pathogen" as used herein refers to a plant pathogen of a Brassicaeae plant species.

DETAILED DESCRIPTION OF THE INVENTION

Products

Strains

*Erwinia persicina* is a Gram-negative bacterium that was first described (by the previous name of *Erwinia persicinus*) by Hao et al. (1990) after being isolated from a variety of fruits and vegetables. *Erwinia persicinus* was renamed as *Erwinia persicina* in 1998.

Surprisingly, the applicants have now identified strains of *Erwinia persicina* with activity against multiple plant pathogens.

To the best of the applicant's knowledge, these are the first *Erwinia persicina* strains isolated with activity against any pathogens of Brassicaceae species, and the first *Erwinia persicina* strains isolated with activity against any *Xanthomonas* species.

Therefore in one aspect the invention provides an isolated *Erwinia persicina* strain with activity against at least one *Xanthomonas* species. In another aspect, the invention provides an isolated *Erwinia persicina* strain with activity against at least one Brassicaceae pathogen.

The applicant's invention also provides that the *E. persicina* strains promote growth of Brassicaceae plants.

In particular, four strains of the bacterium, *Erwinia persicina*, have been isolated from brassica crops grown in New Zealand and the United Kingdom that show activity against black rot (caused by *Xanthomonas campestris* pv. *campestris*).

These four new *Erwinia persicina* strains have all been deposited in the Leibniz-Institut DSMZ-Deutsch Sammlung von Mikroorganismen and Zellkulturen GmbH, Inhoffenstraße7B, 38124 Braunschweig, Germany according to the Budapest Treaty for the purposes of patent procedure. The isolates have been accorded deposit numbers as indicated in the table below:

| Strain (as referred to in the Examples and Figures): | Deposited as DSM NO: | Deposit date |
|---|---|---|
| 75 | 32302 | 3 May 2016 |
| 76 | 32304 | 3 May 2016 |
| 90 | 32305 | 3 May 2016 |
| 1859 | 32303 | 3 May 2016 |

The deposit receipts and viability statements are attached herein.

Details of the isolation and selection processes employed to obtain the isolates and their growth characteristics are set out in the Examples.

The applicants have been the first to provide *E. persicina* strains deposited as DSM 32302, DSM 32304, DSM 32305 and DSM 32303 in isolated form.

Accordingly in one aspect, the invention provides the *E. persicina* deposited as DSM 32302.

In another aspect, the invention provides the *E. persicina* deposited as DSM 32304.

In another aspect, the invention provides the *E. persicina* deposited as DSM 32305.

In another aspect, the invention provides the *E. persicina* deposited as DSM 32303.

In one embodiment the *E. persicina* strains of the invention are isolated. Preferably, the strains are provided in the form of a biologically pure culture.

The strains of the invention have demonstrated activity against multiple plant pathogens including pathogens causing black rot. These four strains are the first *E. persicina* strains to be provided which show this activity.

Black rot is a particularly problematic pathogen, causing a range of issues for brassica production in New Zealand and other parts of the world.

In one embodiment an isolated *Erwinia persicina* strain of the invention has activity against at least one *Xanthomonas* species.

In one embodiment an isolated *Erwinia persicina* strain of the invention has activity against at least one Brassicaceae pathogen.

The term "Brassicaceae pathogen" as used herein means a pathogen of a Brassicaeae plant species.

In one embodiment the Brassicaceae pathogen is a *Xanthomonas* species.

Preferred *Xanthomonas* species include *Xanthomonas campestris* pathovar (pv.) *aberrans, Xanthomonas campestris* pv. *armoraciae, Xanthomonas campestris* pv. *barbareae, Xanthomonas campestris* pv. *incanae*, and *Xanthomonas campestris* pv. *raphani.*

Preferred *Xanthomonas* species also include *X. campestris* pathovars of species other than *Brassica*. Such pathovars are described on the world wide web (see for example http://www[dot]cabi[dot]org/cpc/search/?q=xanthomonas+campestris).

More preferably, the *Xanthomonas* species is black rot causing species. Preferably the *Xanthomonas* species is *Xanthomonas campestris*. The most preferred pathovar is *Xanthomonas campestris* pv. *campestris.*

Compositions

The present invention also provides a composition comprising at least one *E. persicina* strain of the invention and an agriculturally acceptable carrier.

In one embodiment the invention provides a composition comprising at least one strain of *E. persicina* selected from those deposited as:

a) *E. persicina* DSM 32302,
b) *E. persicina* DSM 32304,
c) *E. persicina* DSM 32305 and
d) *E. persicina* DSM 32303 and at least one agriculturally acceptable carrier, diluent and/or adjuvant.

The composition may include combinations of any two or more strains of the *E. persicina* of the invention.

The strain(s) of the invention are present in the composition in an amount effective to control the pathogen of interest. The effective concentration may vary depending on the form the *E. persicina* is used in, the environment to which the composition is to be applied, the type, concentration and degree of pathogen infection; temperature; season; humidity; stage in plant growing season; age of plant; method, rate and frequency of application; number and type of conventional fungicides, pesticides and the like being applied, and plant treatments (for example pruning, grazing, and irrigation). All factors may be taken into account in formulating the composition.

The compositions of the invention may be made by mixing one or more *E. persicina* strains of the invention with at least one agricultural carrier, diluent and/or adjuvant.

The *E. persicina* in the compositions may be formulated as cell suspensions.

*E. persicina* may be prepared for use in the compositions using standard techniques known in the art. Growth is commonly under aerobic conditions in a bioreactor at suitable temperatures and pH for growth. Typical growth temperatures are from 15 to 37° C., commonly 27° C. to 32° C.

Growth medium may be any known art medium suitable for *E. persicina* culture. For example nutrient agar (NA) or Luria-Bertani broth (LB).

The strains may be harvested using conventional washing, filtering or sedimentary techniques such as centrifugation, or may be harvested using a cyclone system. Harvested cells can be used immediately or stored under chilled conditions (for example in 25% (v/v) glycerol at −80° C.) or may be freeze dried.

The compositions of the invention may include humectants, spreaders, stickers, stabilisers, penetrants, emulsifiers, dispersants, surfactants, buffers, binders, protectants, fillers and other components typically employed in known art agricultural or control compositions.

The composition of the invention may be in liquid or solid form. Liquid compositions typically include water, saline or oils such as vegetable or mineral oils.

The compositions may be in the form of sprays, suspensions, concentrates, foams, drenches, slurries, injectables, gels, dips, pastes and the like.

Liquid compositions may be prepared by mixing a liquid agriculturally acceptable carrier with the *E. persicina* cells. Conventional formulation techniques may be used to produce liquid compositions.

In one embodiment the composition is in solid form. The composition may be produced by drying the liquid composition of the invention. Alternatively, a solid composition useful in the invention may be prepared by mixing *E. persicina* cells of the invention with a variety of inorganic or biological materials. For example, solid inorganic agricultural carriers may include carbonates, sulphates, phosphates or silicates, pumice, lime, bentonite, or mixtures thereof.

The composition may be formulated as dusts, granules, pellets, seed coatings, wettable powders or the like. The compositions may be formulated before application to provide liquid compositions.

The compositions of the invention may be in the form of controlled release, or sustained release formulations.

The compositions of the invention may also include other control agents such as pesticides, insecticides, fungicides, bactericides, nematocides, virucides, growth promoters, nutrients, germination promoters and the like. Preferably the other control agents are compatible with the function of the *E. persicina* strains of the invention.

Where strain(s) of the invention are used directly, the same combinations of strains, preparation and application criteria discussed above, apply.

The strains/compositions of the invention may advantageously be freeze dried. Methods for freeze drying bacterial cells are known in the art. Exemplary methods include that of Leslie et al. (1995).

The applicant's data indicate that the *E. persicina* strains and compositions are more stable when freeze dried. This is demonstrated in Example 14.

The applicant's data indicate that the *E. persicina* strains and compositions are most effective when used as a seed coat, or via bio-priming.

Seed coating compositions and methods are well known to those skilled in the art. Any seed coating method can be used according to the present invention. Generally, a solution of the seed coating composition is prepared by suspending a known amount of the bioactive compound in water.

This is then mixed with a sticker, for example, Peridiam (Bayer). If desired, other carriers, diluents or adjuvants may be added to form a solution of the seed coating composition of the invention. In one embodiment, the seed coating composition may include a dye. Seeds are then mixed with the seed coating composition solution to form a coating on the seeds. The seeds are then dried such that a solid coating of the composition forms.

Those skilled in the art will appreciate that the process described may be reiterative allowing multiple coatings to be applied to the seeds. Similarly, it will be appreciated that the additional coatings are not limited to the compositions of the invention, but may include any of the compounds widely used in seed coats such as insecticides, fertilisers, fungicides, moldicides, biocides and colouring agents for seed identification. Likewise, the coating of the invention may be applied to a seed already bearing another or other coatings.

Each coating may employ a different coating composition according to the invention.

Exemplary methods for producing seeds coated with the strains/compositions of the invention include those described in US20100266560 and WO2009061221A3.

Methods

In another aspect, the invention also provides a method for at least one of:

a) controlling at least one Brassicaceae pathogen on a seed, plant, plant part, and/or in soil;

b) controlling at least one *Xanthomonas* species on a seed, plant, plant part, and/or in soil; and/or c) promoting Brassicaceae plant growth;

the method comprising contacting said seed, plant, plant part, and/or soil, with a composition according to the invention, or one or more *E. persicina* strains according to the invention.

Spraying, dusting, soil soaking, seed coating, bio-priming, foliar spraying, misting, aerosolizing and fumigation are all possible application techniques.

In one embodiment the composition or strain(s) of the invention is applied to at least one of:

a) seeds, b) foliage, c) inflorescence, d) growing medium, and e) a sowing hole before planting a seed.

The growing medium may be soil or potting mix.

Applications may be once only or repeated as required. Application at different times in plant life cycles, are also contemplated. For example, seed application, followed by foliar application during transplant raising.

Seed coating or bio-priming with the strains or compositions of the invention may be combined with other physical or chemical seed treatments. Such seed treatments include steam treatment, hot water treatment, priming, fungicide seed treatment, and insecticide seed treatment.

Pathogen

In one embodiment at least one plant pathogen is selected from a *Xanthomonas* species. Preferred *Xanthomonas* species include *Xanthomonas campestris*. In one embodiment, the *Xanthomonas* species is black rot, *Xanthomonas campestris* pv. *campestris.*

A wide range of plants may be treated using the compositions of the invention. Such plants include cereal, vegetable and arable crops, grasses, lawns, pastures, fruit trees and ornamental trees and plants.

Preferred plant species are those from the Brassicaceae.

Preferred Brassicaceae genera include: *Aethionema, Agallis, Alliaria, Alyssoides, Alyssopsis, Alyssum, Ammosperma, Anastatica, Anchonium, Andrzeiowskia, Anelsonia, Aphragmus, Aplanodes, Arabidella, Arabidopsis, Arabis, Arcyosperma, Armoracia, Aschersoniodoxa, Asperuginoides, Asta, Atelanthera, Athysanus, Aubrieta, Aurinia, Ballantinia, Barbarea, Beringia, Berteroa, Berteroella, Biscutella, Bivonaea, Blennodia, Boechera, Boleum, Boreava, Bornmuellera, Borodinia, Botscantzevia, Brachycarpaea, Brassica, Braya, Brayopsis, Brossardia, Bunias, Cakile, Calepina, Calymmatium, Camelina, Camelinopsis, Capsella, Cardamine, Cardaminopsis, Cardaria, Carina valva, Carrichtera, Catadysia, Catenulina, Caulanthus, Caulostramina, Ceratocnemum, Ceriosperma, Chalcanthus, Chamira, Chartoloma, Cheesemania, Cheiranthus, Chlorocrambe, Chorispora, Christolea, Chrysobraya, Chrysochamela, Cithareloma, Clastopus, Clausia, Clypeola, Cochlearia, Coelonema, Coincya, Coluteocarpus, Conringia, Cordylocarpus, Coronopus, Crambe, Crambella, Cremolobus, Crucihimalaya, Cryptospora, Cuphonotus, Cusickiella, Cycloptychis, Cymatocarpus, Cyphocardamum, Dactylocardamum, Degenia, Delpinophytum, Descurainia, Diceratella, Dichasianthus, Dictyophragmus, Didesmus, Didymophysa, Dielsiocharis, Dilophia, Dimorphocarpa, Diplotaxis, Dipoma, Diptychocarpus, Dithyrea, Dolichirhynchus, Dontostemon, Douepea, Draba, Drabastrum, Drabopsis, Dryopetalon, Eigia, Elburzia, Enarthrocarpus, Englerocharis, Eremobium, Eremoblastus, Eremodraba, Eremophyton, Ermania, Ermaniopsis, Erophila, Eruca, Erucaria, Erucastrum, Erysimum, Euclidium, Eudema, Eutrema, Euzomodendron, Farsetia, Fezia, Fibigia, Foleyola, Fortuynia, Galitzkya, Geococcus, Glaribraya, Glastaria, Glaucocarpum, Goldbachia, Gorodkovia, Graellsia, Grammosperma, Guillenia, Guiraoa, Gynophorea, Halimolobos, Harmsiodoxa, Hedinia, Heldreichia, Heliophila, Hemicrambe, Hemilophia, Hesperis, Heterodraba, Hirschfeldia, Hollermayera, Hormathophylla, Homungia, Hornwoodia, Hugueninia, Hymenolobus, Ianhedgea, Iberis, Idahoa, Iodanthus, Ionopsidium, Irenepharsus, Isatis, Ischnocarpus, Iskandera, Iti, Ivania, Jundzillia, Kernera, Kremeriella, Lachnocapsa, Lachnoloma, Leavenworthia, Lepidium, Lepidostemon, Leptaleum, Lignariella, Lithodraba, Lobularia, Lonchophora, Loxostemon, Lunaria, Lyocarpus, Lyrocarpa, Macropodium, Malcolmia, Mancoa, Maresia, Mathewsia, Matthiola, Megacarpaea, Megadenia, Menkea, Menonvillea, Microlepidium, Microsysymbrium, Microstigma, Morettia, Moricandia, Moriera, Morisia, Murbeckiella, Muricaria, Myagrum, Nasturtiopsis, Nasturtium, Neomartinella, Neotchihatchewia, Neotorularia, Nerisyrenia, Neslia, Nesocrambe, Neuontobotrys, Notoceras, Notothlaspi, Ochthodium, Octoceras, Olimarabidopsis, Onuris, Oreoloma, Oreophyton, Omithocarpa, Orychophragmus, Otocarpus, Oudneya, Pachycladon,*

*Pachymitus, Pachyphragma, Pachypterygium, Parlatoria, Parodiodoxa, Parolinia, Parrya, Parryodes, Paysonia, Pegaeophyton, Peltaria, Peltariopsis, Pennellia, Petiniotia, Petrocallis, Petrocallis, Petroravenia, Phlebolobium, Phlegmatospermum, Phoenicaulis, Physaria, Physocardamum, Physoptychis, Physorrhynchus, Platycraspedum, Polyctenium, Polypsecadium, Pringlea, Prionotrichon, Pritzelago, Pseuderucaria, Pseudoarabidopsis, Pseudocamelina, Pseudoclausia, Pseudofortuynia, Pseudovesicaria, Psychine, Pterygiosperma, Pterygostemon, Pugionium, Pycnoplinthopsis, Pycnoplinthus, Pyramidium, Quezeliantha, Quidproquo, Raffenaldia, Raphanorhyncha, Raphanus, Rapistrum, Reboudia, Redowskia, Rhammatophyllum, Rhizobotrya, Ricotia, Robeschia, Rollinsia, Romanschulzia, Roripella, Rorippa, Rytidocarpus, Sameraria, Sarcodraba, Savignya, Scambopus, Schimpera, Schivereckia, Schizopetalon, Schlechteria, Schoenocrambe, Schouwia, Scoliaxon, Selenia, Sibara, Sibaropsis, Silicularia, Sinapidendron, Sinapis, Sisymbrella, Sisymbriopsis, Sisymbrium, Smelowskia, Sobolewskia, Sohms-Laubachia, Sophiopsis, Sphaerocardamum, Spirorhynchus, Spryginia, Staintoniella, Stanfordia, Stanleya, Stenopetalum, Sterigmostemum, Stevenia, Straussiella, Streptanthella, Streptanthus, Streptoloma, Stroganowia, Stubebdorffia, Subularia, Succowia, Synstemon, Synthlipsis, Taphrospermum, Tauscheria, Teesdalia, Teesdaliopsis, Tetracme, Thellungiella, Thelypodiopsis, Thelypodium, Thlaspeocarpa, Thlaspi, Thysanocarpus, Trachystoma, Trichotolinum, Trochiscus, Tropidocarpum, Turritis, Vella, Warea, Weberbauera, Werdermannia, Winklera, Xerodraba, Yinshania, Zerdana*, and *Zilla*.

A preferred Brassicaceae genera is *Brassica*.

Preferred *Brassica* species include: *B. balearica* (Mallorca cabbage), *B. carinata* (Abyssinian mustard or Abyssinian cabbage), *B. elongata* (elongated mustard), *B. fruticulosa* (Mediterranean cabbage), *B. hilarionis* (St Hilarion cabbage), *B. juncea* (Indian mustard, brown and leaf mustards, Sarepta mustard), *B. napus* (forage rape, rapeseed, canola, rutabaga, swede, Swedish turnip, swede turnip), *B. narinosa* (broadbeaked mustard), *B. nigra* (black mustard), *B. oleracea* (kale, cabbage, collard, greens, broccoli, cauliflower, kai-lan, Brussels sprouts, kohlrabi), *B. perviridis* (tender green, mustard spinach), *B. rapa* (syn *B. campestris*, Chinese cabbage, turnip, rapini, komatsuna, Bok choy or pak Choi), *B. rupestris* (brown mustard), *B. septiceps* (seventop turnip) and *B. tournefortii* (Asian mustard)

Preferred *Brassica* species include *B. oleracea, B. napus* and *B. rapa*.

Preferred *Brassica* plant include: cabbage, broccoli, cauliflower, Brussels sprouts, kale, forage rape, swede, turnip and Chinese cabbage.

Concentration of the Strains in Compositions and Methods of the Invention

The concentration at which the strains are used in the compositions and methods of the invention will vary depending on how the strain/composition is used.

For seed coating, the strain should be present at a concentration in the range: $3\times10^2$ to $3\times10^{11}$ colony forming unit (CFU)/g seed, more preferably $3\times10^3$ to $3\times10^{10}$ CFU/g seed, more preferably $3\times10^4$ to $3\times10^9$ CFU/g seed.

For application to a sowing hole the strain should be present at a concentration in the range: $2\times10^4$ to $2\times10^{10}$ CFU/hole, $2\times10^5$ to $2\times10^9$ CFU/hole, more preferably $2\times10^6$ to $2\times10^8$ CFU/hole, more preferably at $2\times10^7$ CFU/hole.

Although not preferred, the strain may also be applied to the growth medium, as a drench, as a foliar spray, or as a spray applied at flowering, or as a spray at seed set.

For a potting mix growth medium the strain should be applied at least $3\times10^6$ CFU/L, more preferably at least $3\times10^7$ CFU/L, more preferably at least $3\times10^8$ CFU/L, more preferably at least $3\times10^9$ CFU/L, more preferably at least $3\times10^{10}$ CFU/L, $3\times10^{11}$ CFU/L, more preferably at least $3\times10^{12}$ CFU/L, more preferably at least $3\times10^{13}$ CFU/L.

For a drench at sowing the strain should be applied at least $3\times10^{11}$ CFU/L, more preferably at least $3\times10^{12}$ CFU/L, more preferably at least $3\times10^{13}$ CFU/L.

As a foliar spray the strain should be applied at least $3\times10^{13}$ CFU/L, more preferably at least $3\times10^{14}$ CFU/L, more preferably at least $3\times10^{15}$ CFU/L.

For a spray applied at flowering the strain should be applied at least $3\times10^6$ CFU/L, more preferably at least $3\times10^7$ CFU/L, more preferably at least $3\times10^8$ CFU/L, more preferably at least $3\times10^9$ CFU/L, more preferably at least $3\times10^{10}$ CFU/L, $3\times10^{11}$ CFU/L, more preferably at least $3\times10^{12}$ CFU/L, more preferably at least $3\times10^{13}$ CFU/L.

BRIEF DESCRIPTION OF THE DRAWINGS

The invention will now be described with reference to the Figures in the accompany drawings in which:

FIG. 1. Primers used for genetic analysis of *Erwinia* isolates. The SEQ ID NOs for each primer are indicated.

FIG. 3. Alignment of the DNA sequences of the 16S ribosomal RNA region from *Erwinia persicina* isolates 75 (1=SEQ ID NO:1), 76 (5=SEQ ID NO:5), 90 (9=SEQ ID NO:9) and 1859 (13=SEQ ID NO:13).

FIG. 4. Alignment of the DNA sequences of the heat shock protein dnaJ gene from *Erwinia persicina* isolates 75 (2=SEQ ID NO:2), 76 (6=SEQ ID NO:6), 90 (10=SEQ ID NO:10) and 1859 (14=SEQ ID NO:14).

FIG. 5. Alignment of the DNA sequences of the glyceraldehyde-3-phosphate dehydrogenase gene from *Erwinia persicina* isolates 75 (3=SEQ ID NO:3), 76 (7=SEQ ID NO:7), 90 (11=SEQ ID NO:11) and 1859 (15=SEQ ID NO:15).

FIG. 6. Alignment of the DNA sequences of the recombinase A gene from *Erwinia persicina* isolates 75 (4=SEQ ID NO:4), 76 (8=SEQ ID NO:8), 90 (12=SEQ ID NO:12) and 1859 (16=SEQ ID NO:16).

FIG. 7. Occurrence of bacterial isolates across the diverse genera with bioactivity against *Xanthomonas campestris* pv. *campestris* (Xcc) and/or *Sclerotinia sclerotiorum* (Ss) in dual culture assays. Isolates were evaluated for their ability to inhibit the growth of 2-3 Xcc isolates on YDCA and/or PDA, and two Ss isolates on PDA at 25° C. Isolates with a mean bioactivity score of ≥1 in at least one dual culture assay were classified as bioactive. This threshold value was significantly different from a bioactivity score of 0 in those assays that were statistically analysed using an analysis of variance.

FIG. 8. Effect of bacterial isolates, including *Erwinia persicina* isolates 75, 76, 90 and 599, on the percentage black rot disease incidence in cabbage and forage rape seedlings 8 days after sowing on germination blotters. Each bacterial isolate was applied at a target rate of $6\times10^7$ CFU/g seed, to seed inoculated with *Xanthomonas campestris* pv. *campestris* (Xcc) isolate ICMP 4013 or ICMP 6497. Seed for the positive and negative controls (with and without Xcc, respectively) was treated with bacteriological peptone water. Assays were held at 30° C. light for 8 hours followed by 20° C. dark for 16 hours.

FIG. 9. Effect of bacterial isolates, including *Erwinia persicina* isolates 75, 76, 90 and 599, on the percentage germination of cabbage and forage rape seed 5 days after sowing on germination blotters. Each bacterial isolate was applied at a target rate of $6\times10^7$ CFU/g seed, to seed inoculated with *Xanthomonas campestris* pv. *campestris* (Xcc) isolate ICMP 4013 or ICMP 6497. Seed for the positive and negative controls (with and without Xcc, respectively) was treated with bacteriological peptone water. Assays were held at 30° C. light for 8 hours followed by 20° C. dark for 16 hours.

FIG. 10. Effect of fungal and bacterial isolates, including *Erwinia persicina* isolates 76 and 90, applied at two rates to seed, on the incidence of black rot in cabbage after 6 weeks in the growth room. Each isolate was applied at low and high target rates of $3\times10^8$ and $3\times10^9$ CFU/g seed, respectively, to seed artificially inoculated with *Xanthomonas campestris* pv. *campestris* (Xcc) isolate ICMP 6497. Seed for the positive and negative controls (with and without Xcc, respectively) was treated with bacteriological peptone water. Growth room conditions cycled from 25° C. light for 13 h to 15° C. dark for 11 h, with a constant relative humidity of 79%.

FIG. 12. Effect of fungal and bacterial isolates, including *Erwinia persicina* isolates 76 and 90, applied at two rates to seed, on emergence of cabbage in the growth room. Each isolate was applied at low and high target rates of $3\times10^8$ and $3\times10^9$ CFU/g seed, respectively, to seed artificially inoculated with *Xanthomonas campestris* pv. *campestris* (Xcc) isolate ICMP 6497. Seed for the positive and negative controls (with and without Xcc, respectively) was treated with bacteriological peptone water. Growth room conditions cycled from 25° C. light for 13 h to 15° C. dark for 11 h, with a constant relative humidity of 79%.

FIG. 13. Effect of fungal and bacterial isolates, including *Erwinia persicina* isolate 76, on emergence of cabbage in the growth room. Each isolate was applied at a target rate of $3\times10^9$ CFU/g seed, to seed artificially inoculated with *Xanthomonas campestris* pv. *campestris* (Xcc) isolate ICMP 21080. Seed for the positive and negative controls (with and without Xcc, respectively) was treated with bacteriological peptone water. Growth room conditions cycled from 25° C. light for 13 h to 15° C. dark for 11 h, with a constant relative humidity of 79%.

FIG. 14. Effect of *Erwinia persicina* isolate and application rate on emergence and incidence of black rot in cabbage after 6 weeks in the growth room. Each isolate was applied at six different rates to seed artificially inoculated with *Xanthomonas campestris* pv. *campestris* (Xcc) isolate ICMP 21080. Seed for the positive and negative controls (with and without Xcc, respectively) was treated with bacteriological peptone water. Growth room conditions cycled from 25° C. light for 13 h to 15° C. dark for 11 h, with a constant relative humidity of 79%.

FIG. 16. Effect of biocontrol agent (BCA) and application rate on black rot disease incidence in cabbage after 6 weeks under 79% relative humidity and temperature regimes of (A) 20° C. day for 13 h/10° C. night for 11 h, and (B) 25° C. day for 13 h/15° C. night for 11 h. Each isolate, including *Erwinia persicina* isolate 76 (--▼--), was applied at target rates of $3\times10^7$ (low), $3\times10^8$ (medium) and $3\times10^9$ (high) CFU/g seed, to seed artificially inoculated with *Xanthomonas campestris* pv. *campestris* (Xcc) isolate ICMP 6497 (10 replicates of each). Seed for the positive (Xcc) control (······○······; 30 replicates) was treated with bacteriological peptone water. The error bars indicate the LSD (5%) for comparison of treatments with 10 versus 30 replicates (a) and 10 versus 10 replicates (b).

FIG. 17. Effect of biocontrol agent (BCA) and application rate on emergence of cabbage under 79% relative humidity and temperature regimes of (A) 20° C. day for 13 h/10° C. night for 11 h, and (B) 25° C. day for 13 h/15° C. night for 11 h. Each isolate, including *Erwinia persicina* isolate 76 (--▼--) was applied at target rates of $3\times10^7$ (low), $3\times10^8$ (medium) and $3\times10^9$ (high) CFU/g seed, to seed artificially inoculated with *Xanthomonas campestris* pv. *campestris* (Xcc) isolate ICMP 6497 (10 replicates of each). Seed for the positive (······○······; 30 replicates) and negative (—●—; 20 replicates) controls (with and without Xcc, respectively) was treated with bacteriological peptone water. The error bars indicate the LSD (5%) for comparison of treatments with 20 versus 30 replicates (a), 10 versus 30 replicates (b) and 10 versus 10 replicates (c).

control (······○······; 30 replicates) was treated with bacteriological peptone water. Growth room conditions cycled from 25° C. light for 13 h to 15° C. dark for 11 h, with a constant relative humidity of 79%. The error bars indicate the LSD (5%) for comparison of treatments with 30 versus 30 replicates (a), 15 versus 30 replicates (b) and 15 versus 15 replicates (c).

Figure 19:
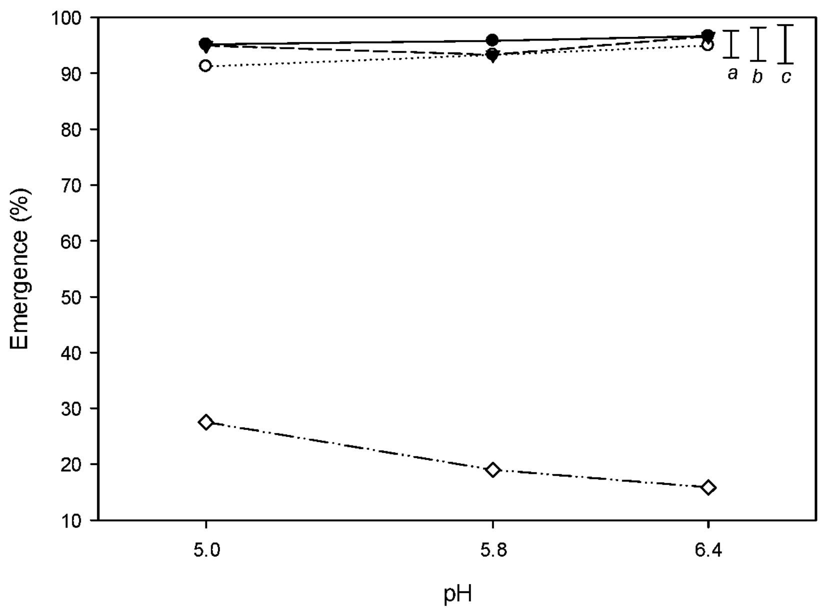

FIG. 19. Effect of potting mix pH and biocontrol agent (BCA) on emergence of cabbage in the growth room. Each isolate, including *Erwinia persicina* isolate 76 (--▼--), was applied at a target rate of $3\times10^9$ CFU/g seed, to seed artificially inoculated with *Xanthomonas campestris* pv. *campestris* (Xcc) isolate ICMP 6497 (15 replicates of each). Seed for the positive (······○······, 30 replicates) and negative (—●—; 15 replicates) controls (with and without Xcc, respectively) was treated with bacteriological peptone water. Growth room conditions cycled from 25° C. light for 13 h to 15° C. dark for 11 h, with a constant relative humidity of 79%. The error bars indicate the LSD (5%) for comparison of treatments with 30 versus 30 replicates (a), 15 versus 30 replicates (b) and 15 versus 15 replicates (c).

FIG. 20. Effect of biocontrol agent application to seed on emergence and incidence of back rot in cabbage under wet growth room conditions. Each isolate, including *Erwinia persicina* isolates 75, 76, 90 and 1859, was applied to seed ($3\times10^9$ CFU/g seed) artificially inoculated with *Xanthomonas campestris* pv. *campestris* (Xcc) isolate ICMP 21080. Seed for the positive and negative controls (with and without Xcc, respectively) was treated with bacteriological peptone water. Growth room conditions cycled from 25° C. light for 13 h to 15° C. dark for 11 h, with a constant relative humidity of 79%.

FIG. 21. Effect of biocontrol agent application to seed and/or potting mix on emergence in cabbage under greenhouse and growth room conditions. Each isolate, including *Erwinia persicina* isolate 76, was applied to seed ($3\times10^9$ CFU/g seed) artificially inoculated with *Xanthomonas campestris* pv. *campestris* (Xcc) isolate ICMP 21080, and/or to the potting mix of the sowing hole ($2\times10^7$ CFU/hole). Seed for the positive and negative controls (with and without Xcc, respectively) was treated with bacteriological peptone water. Growth room conditions cycled from 25° C. light for 13 h to 15° C. dark for 11 h, with a constant relative humidity of 79%.

FIG. 22. Effect of biocontrol agent application to seed and/or potting mix on black rot disease incidence in cabbage in the greenhouse. Each isolate, including *Erwinia persicina* isolate 76, was applied to seed ($3\times10^9$ CFU/g seed) artificially inoculated with *Xanthomonas campestris* pv. *campestris* (Xcc) isolate ICMP 21080, and/or to the potting mix of the sowing hole ($2\times10^7$ CFU/hole). Seed for the positive and negative controls (with and without Xcc, respectively) was treated with bacteriological peptone water.

FIG. 23. Effect of biocontrol agent application to seed and/or potting mix on black rot disease incidence in cabbage in the growth room. Each isolate, including *Erwinia persicina* isolate 76, was applied to seed ($3\times10^9$ CFU/g seed) artificially inoculated with *Xanthomonas campestris* pv. *campestris* (Xcc) isolate ICMP 21080, and/or to the potting mix of the sowing hole ($2\times10^7$ CFU/hole). Seed for the positive and negative controls (with and without Xcc, respectively) was treated with bacteriological peptone water. Growth room conditions cycled from 25° C. light for 13 h to 15° C. dark for 11 h, with a constant relative humidity of 79%.

FIG. 24. Chemical spray programme followed in the pot trial.

Figure 25:
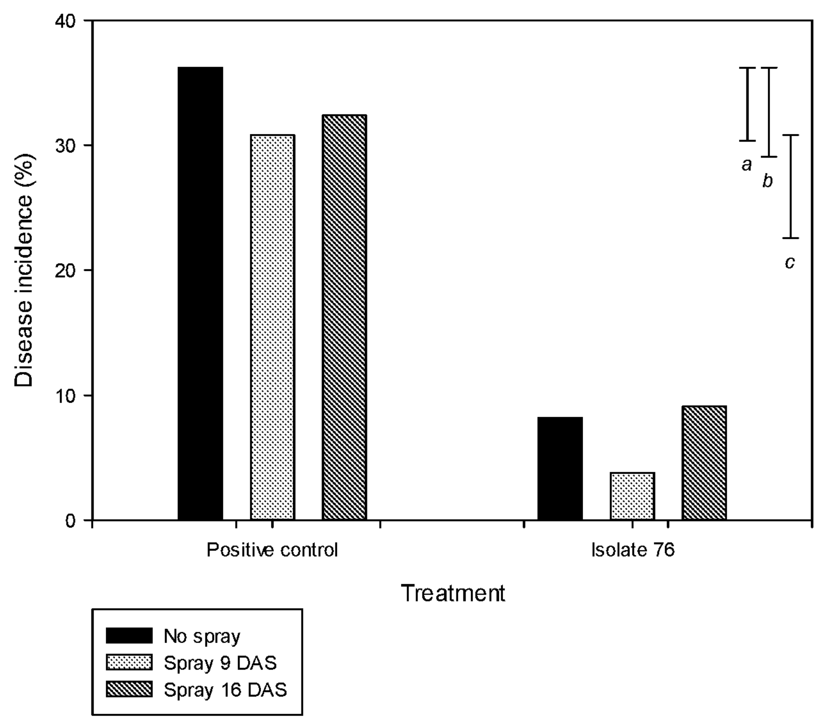

FIG. 25. Effect of chemical sprays and *Erwinia persicina* isolate 76 on black rot disease incidence in cabbage after 6 weeks under greenhouse conditions. *E. persicina* was applied at a target rate of $3\times10^9$ CFU/g to seed artificially inoculated with *Xanthomonas campestris* pv. *campestris* (Xcc) isolate ICMP 21080. Seed for the positive (Xcc) control was treated with bacteriological peptone water. Seedlings were left unsprayed or sprayed weekly with chemicals starting 9 and 16 d after sowing (DAS) as outlined in FIG. 24. The error bars indicates the LSD (5%) for comparison of the unsprayed seedlings (a), the unsprayed and sprayed seedlings (b) and sprayed seedlings (c).

FIG. 26. Effect of bacterial isolates on emergence and plant growth parameters in cabbage 22 and 43 d after sowing (DAS) in the greenhouse. Each isolate, including *Erwinia persicina* isolates 76, 90 and 599, were applied to the seed at a target rate of $3\times10^9$ CFU/g seed. Seed for the negative control was treated with bacteriological peptone water.

Figure 27:
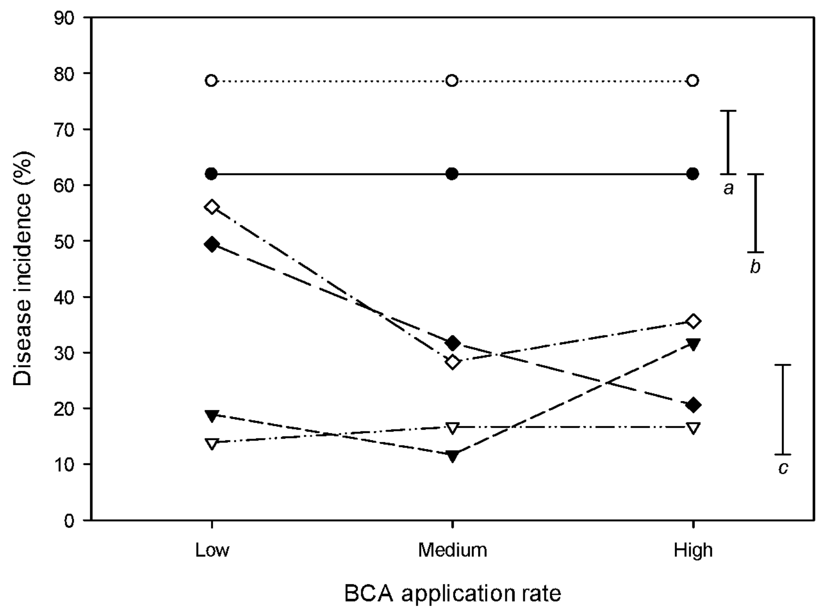

FIG. 27. Effect of biocontrol agent (BCA) formulation and rate on black rot disease incidence in cabbage after 6 weeks in the growth room. Each isolate was applied as a seed coating and standard seed treatment (*Erwinia persicina* isolate 76: --▼-- and —·▽··, respectively) at target rates of $3\times10^7$ (low), $3\times10^8$ (medium) and $3\times10^9$ (high) CFU/g seed, to seed artificially inoculated with *Xanthomonas campestris* pv. *campestris* (Xcc) isolate ICMP 21080 (15 replicates of each). Seed for the positive (Xcc) controls was treated with the seed coating (—●—) and standard seed treatment (······○······) without BCA (30 replicates of each). Growth room conditions cycled from 25° C. light for 13 h to 15° C. dark for 11 h, with a constant relative humidity of 79%. The error bars indicate the LSD (5%) for comparison of treatments with 30 versus 30 replicates (a), 15 versus 30 replicates (b) and 15 versus 15 replicates (c).

Figure 28:
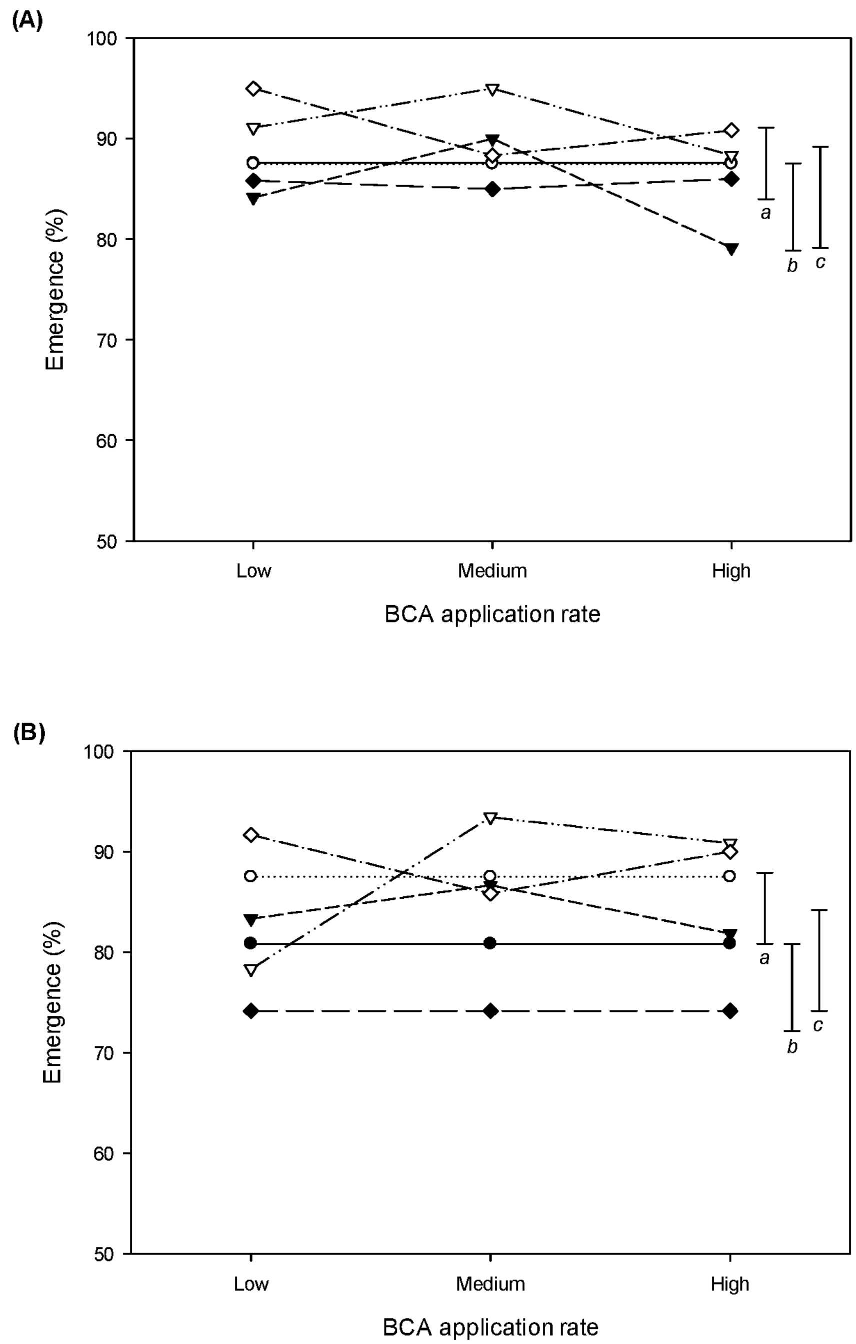

FIG. 28. Effect of biocontrol agent (BCA) formulation and rate on emergence of cabbage in the growth room after application to (A) bare seed and (B) seed artificially inoculated with *Xanthomonas campestris* pv. *campestris* isolate ICMP 21080. Each isolate was applied as a seed coating and standard seed treatment (*Erwinia persicina* isolate 76: --▼-- and —·▽··, respectively) at target rates of $3\times10^7$ (low), $3\times10^8$ (medium) and $3\times10^9$ (high) CFU/g seed (15 replicates of each). Seed for the positive (Xcc) controls was treated with the seed coating (—●—) and standard seed treatment (······○······) without BCA (30 replicates of each). Growth room conditions cycled from 25° C. light for 13 h to 15° C. dark for 11 h, with a constant relative humidity of 79%. The error bars indicate the LSD (5%) for comparison of treatments with 30 versus 30 replicates (a), 15 versus 30 replicates (b) and 15 versus 15 replicates (c).

FIG. 29. Application rates of the granule, freeze-dried and non-formulated inoculum of *Erwinia persicina* isolate 76 to the potting mix, and for the latter two to the seed and as a drench and foliar spray.

FIG. 30. Main effects of *Erwinia persicina* isolate 76 formulation and application method on emergence and black rot disease incidence in cabbage after 6 weeks in the growth room and glasshouse. Granule (GL), freeze-dried (FD) and non-formulated (NF) inoculum of *E. persicina* were applied to the potting mix, and for the latter two to the seed and as a drench and foliar spray as outlined in FIG. 29. All seed was artificially inoculated with *Xanthomonas campestris* pv. *campestris* isolate (Xcc) ICMP 21080. Seed for the freeze-dried and non-formulated positive (Xcc) controls were treated with water containing sucrose and bacteriological peptone, respectively. Growth room conditions cycled from 25° C. light for 13 h to 15° C. dark for 11 h, with a constant relative humidity of 79%.

FIG. 31. Two-way interactions between seed inoculants and other methods of application of *Erwinia persicina* isolate 76 on black rot disease incidence in cabbage after 6 weeks in the growth room and glasshouse. Granule (GL), freeze-dried (FD) and non-formulated (NF) inoculum of *E. persicina* were applied to the potting mix, and for the latter two to the seed and as a drench and foliar spray as outlined in FIG. 29. All seed was artificially inoculated with *Xanthomonas campestris* pv. *campestris* (Xcc) isolate ICMP 21080. Seed for the freeze-dried and non-formulated positive (Xcc) controls were treated with water containing sucrose and bacteriological peptone, respectively. Growth room conditions cycled from 25° C. light for 13 h to 15° C. dark for 11 h, with a constant relative humidity of 79%.

Figure 32:
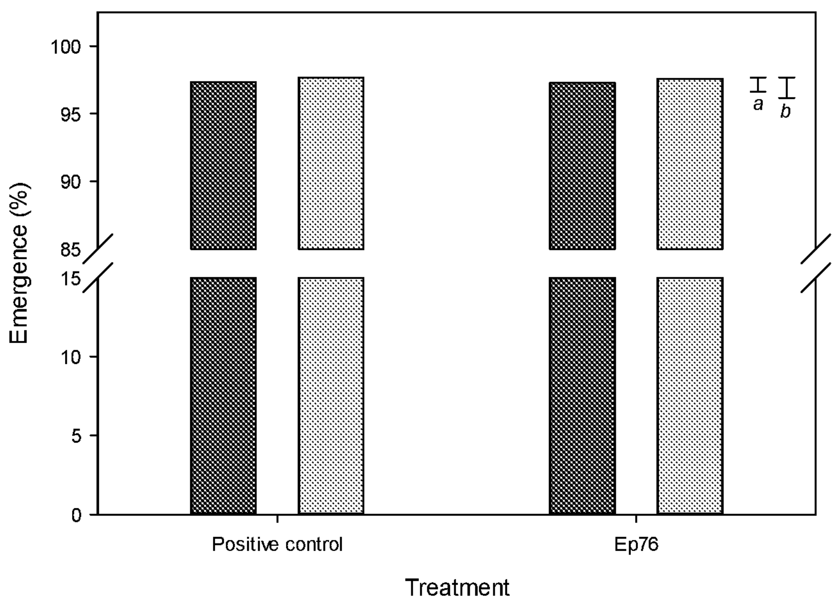

FIG. 32. Effect of seed treatment and growing medium on emergence of cabbage in the nursery. *Erwinia persicina* isolate 76 (Ep76) was applied to seed with a sticker (Peridiam) and dye (Red) and sown in commercial potting mix (Method A; dark grey bars) or without a sticker and dye and sown in saturated in-house potting mix (Method B; light grey bars). Seed for the positive control was treated in a similar manner but without Ep76. The error bars indicate the LSD (5%) for comparison of the different treatments and methods (a) except when comparing the different methods for the same treatment (b).

Figure 33:
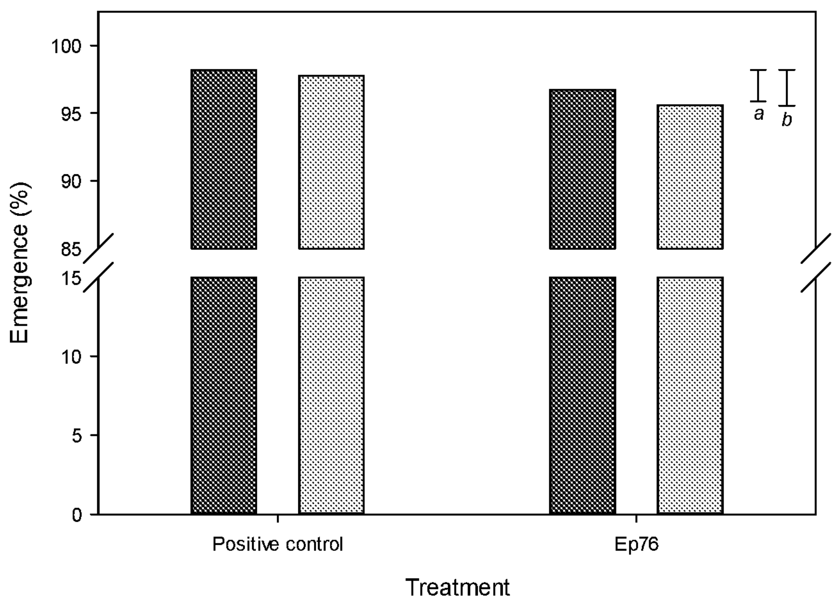

FIG. 33. Effect of seed treatment and location on emergence of cabbage. Untreated seed (positive control) and seed treated with *Erwinia persicina* isolate 76 (Ep76) were grown in the growth room (dark grey bars) and nursery (light grey bars). The error bars indicate the LSD (5%) for comparison of the different seed treatments and locations (a) except when comparing the different seed treatments at the same location (b).

FIG. 34. Effect of *Erwinia persicina* isolate 76 (Ep76) on symptom and latent *Xanthomonas campestris* pv. *campestris* (Xcc) infection of cabbage in the nursery. Ep76 was applied to naturally Xcc-infested seed at a target rate of $3\times10^9$ CFU/g seed with a sticker (Peridiam) and dye (Red) and sown in commercial potting mix for Method A, or without a sticker and dye and sown in saturated in-house potting mix for Method B. Seed for the positive control was treated in a similar manner but without Ep76.

Figure 35:
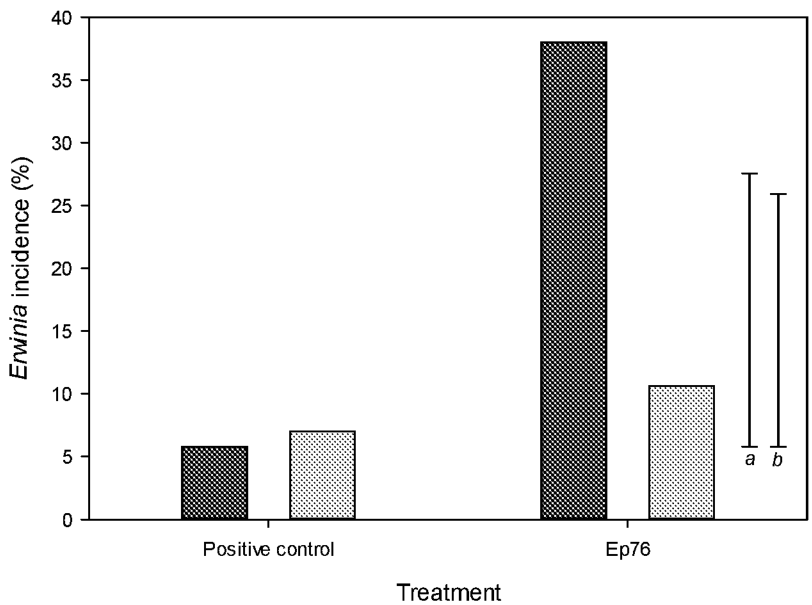

FIG. 35. Incidence of *Erwinia* species in the vascular fluid of cabbage after 6 weeks in the nursery. *Erwinia persicina* isolate 76 (Ep76) was applied to naturally *Xanthomonas campestris* pv. *campestris*-infested seed at a target rate of $3\times10^9$ CFU/g seed with a sticker (Peridiam) and dye (Red) and sown in commercial potting mix (Method A; dark grey bars) or without a sticker and dye and sown in saturated in-house potting mix (Method B; light grey bars). Seed for the positive control was treated in a similar manner but without Ep76. The error bars indicate the LSD (5%) for comparison of the different treatments and methods (a) except when comparing the different methods for the same treatment (b).

FIG. 36. Incidence of *Xanthomonas campestris* pv. *campestris* (Xcc) and *Erwinia* species in the vascular fluid of cabbage after 6 weeks in the growth room and nursery. Naturally Xcc-infested seed was untreated (positive control) or treated with *Erwinia persicina* isolate 76 (Ep76) at a target rate of $3\times10^9$ CFU/g seed. Growth room conditions cycled from 25° C. light for 13 h to 15° C. dark for 11 h, with a constant relative humidity of 79%.

Figure 37:
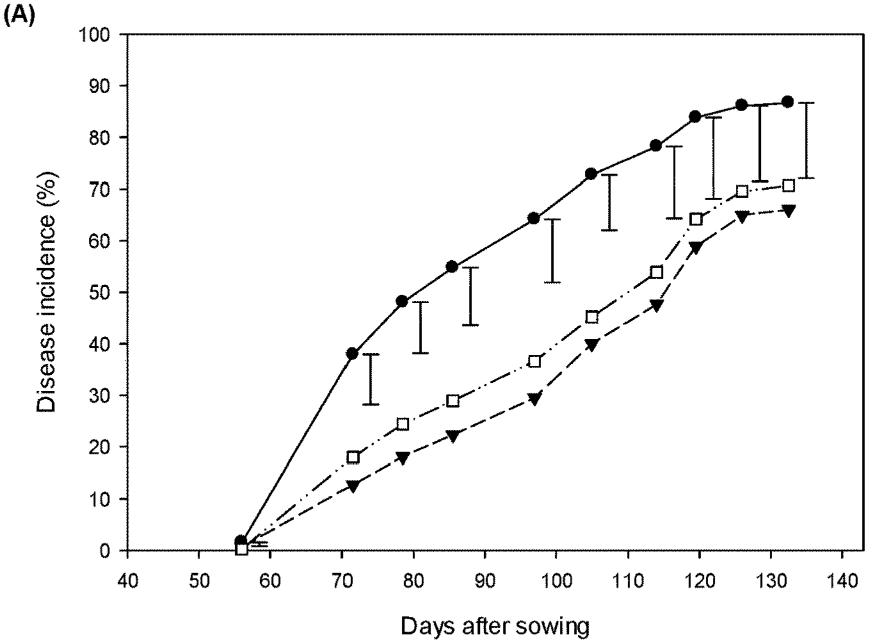

FIG. 37. Effect of seed application of biocontrol agents (BCAs) on black rot disease incidence in naturally infested cabbage under field conditions at Lincoln, New Zealand. (A) Disease progress curves and (B) average disease incidence in plants after seed application of BCA (*Erwinia persicina* isolate 76: --▼--). Each BCA was applied at a target rate of $3\times10^9$ CFU/g seed. Seed for the positive control (—●—) was treated with bacteriological peptone water. The error bar to the right of the positive control data points indicates the LSD (5%) for that timepoint.

Figure 38:
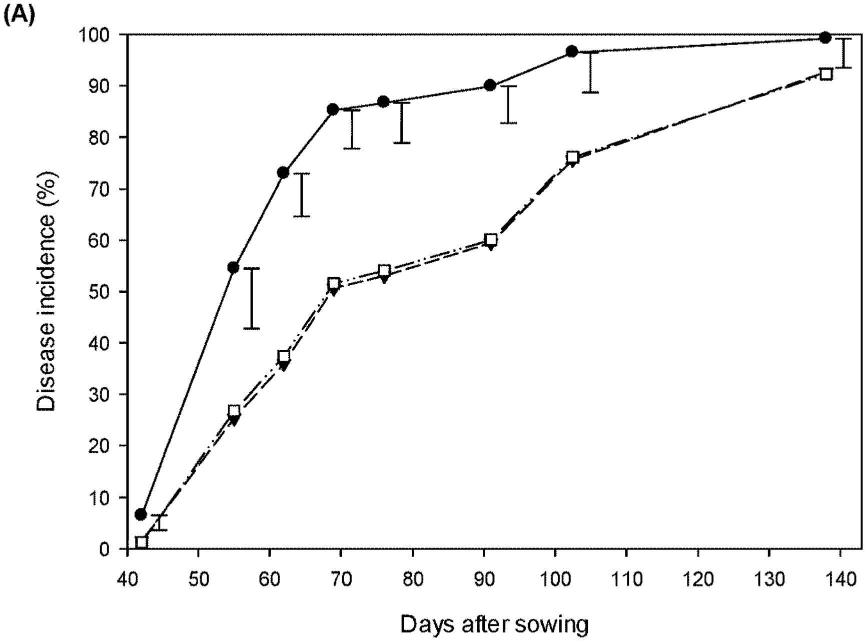

FIG. 38. Effect of seed and foliar application of biocontrol agents (BCAs) on black rot disease incidence in naturally infested cabbage under field conditions at Lincoln, New Zealand. (A) Disease progress curve and (B) average disease incidence in plants after seed and foliar application of BCA (*Erwinia persicina* isolate 76: --▼--). Each BCA was applied to seed at target rate of $3\times10^9$ CFU/g seed and as a foliar spray of $1\times10^{11}$ CFU/L. Seed for the positive control (—●—) was treated with bacteriological peptone water and the spray without BCA was applied to transplants. The error bar to the right of the positive control data points indicates the LSD (5%) for that timepoint.

EXAMPLES

The following non-limiting Examples are provided to illustrate the present invention and in no way limit the scope thereof.

Example 1: Process for Isolation of *Erwinia persicina*

As part of a search for novel biocontrol agents (BCAs) of pests and diseases of brassicas, microbes were isolated from 47 seed lots of 10 brassica plant types; the vegetables: broccoli, cabbage, cauliflower, raddish, kohlrabi and pak choi, and the forage plants: kale, turnip, rape and swede.

Seeds from each seed lot (stored in moisture-proof containers at 4° C.) were randomly divided into two groups of approximately equal numbers. One of these groups was further subdivided in half or thirds for surface sterilization with 1, 2 and/or 3% NaOCl. The seeds were surface-sterilized in 70% (v/v) ethanol for 30 s followed by shaking at 200 rpm for 2 min in 1, 2 or 3% NaOCl with 0.01% (v/v) Tween 20. They were then rinsed three times with sterile reverse osmosis (RO) water and dried on sterile filter paper. Half of the seeds were lightly macerated in a sterile mortar and pestle, and were, together with the remaining whole seeds, spread evenly in separate sterile Petri dishes containing 1.3% (w/v) nutrient agar (NA) or 2.4% (w/v) potato dextrose agar (PDA). The second group of non-surface sterilized seeds was spread in a similar manner either lightly macerated or whole on NA or PDA.

The Petri dishes were incubated in the dark at 25° C. (NA) or 20° C. (PDA) and checked regularly for approximately 4 wk. As soon as bacteria or fungi emerged from the seeds, they were sub-cultured individually onto sterile NA (bacteria) or PDA (fungi), and were incubated as described above to obtain pure cultures. For long-term storage of the bacteria, a single colony was grown overnight in sterile 2.5% (w/v) Luria-Bertani Miller Broth (LB) on a shaker at 180 rpm, 25° C. in dark. The culture was stored in sterile 25% (v/v) glycerol at −80° C.

A total of 1485 microbes were isolated onto standard microbiological media and pure cultures were obtained. They consisted of:

1101 isolates of bacteria 384 isolates of fungi.

Putative taxonomic identities were assigned (as described in Example 2) to 731 bacteria and 234 fungi based on comparisons of their 16S ribosomal RNA (16S rRNA, bacteria only) or internal transcribed spacer (ITS, fungi only) DNA sequences, with those in the EzTaxon and/or GenBank databases. *Bacillus* was the predominant bacterial genus recovered. Only 13 isolates belonged to the genus *Erwinia*.

DSM 32302 was isolated from forage rape seed obtained from PGG Wrightson Seeds Ltd, New Zealand.

DSM 32304 was isolated from forage rape seed obtained from PGG Wrightson Seeds Ltd, New Zealand.

DSM 32305 was isolated from turnip seed obtained from PGG Wrightson Seeds Ltd, New Zealand.

DSM 32303 was isolated from kohlrabi seed obtained from South Pacific Seeds Ltd, New Zealand.

Example 2: Molecular Genetic Identification

Isolates of *Erwinia* were identified by partial DNA sequence analysis of the 16S rRNA region, and genes for the heat shock protein dnaJ (dnaJ), glyceraldehyde-3-phosphate dehydrogenase (gapDH) and recombinase A (recA). PCR amplifications were performed on a single colony grown overnight on NA at 25 or 28° C. in the dark. For the 16S rRNA region, a direct colony PCR was carried out in 25 μL reactions containing 1.25 U of AccuSure DNA polymerase (Bioline), 1×AccuBuffer (Bioline), 6.25 nmol of each dNTP (Bioline) and 5 pmol of primer pair f8-27 and r1510 (Invitrogen; Lipson and Schmidt 2004). These were incubated in a thermal cycler for 10 min at 95° C., followed by 30 cycles of 1 min at 95° C., 1 min at 55° C. and 2.5 min at 68° C., and then 10 min at 68° C.

For the other genes, DNA extraction from the colony and subsequent PCR amplification of the DNA with 5 pmol of each primer (FIG. 1) was carried out using the REDExtract-N-Amp Plant PCR kit (Sigma-Aldrich) following the manufacturer's instructions. The reactions were held in a thermal cycler for 3 min at 94° C., followed by 10 cycles of 30 s at 94° C., 30 s at 65° C. (−1° C. per cycle) and 1 min at 72° C., 25 cycles of 30 s at 94° C., 30 s at 55° C. and 1 min at 72° C., and then 10 min at 72° C.

Amplification products were purified with Agencourt AMPure or Agencourt AMPure XP (Beckman Coulter) according to the manufacturer's instructions. Purified products were sequenced in the forward direction by Macrogen Inc (South Korea) or Lincoln University Sequencing Facility (New Zealand).

*E. persicina* isolates ICMP 8932 and ICMP 12532, and *Erwinia rhapontici* isolate ICMP 15975 (Landcare Research) were also characterised. Genomic DNA was isolated from a culture grown overnight in LB on a shaker at 180 rpm, 25° C. in the dark with the Gentra Puregene Yeast/Bact. kit (Qiagen) following the manufacturer's instructions. PCR amplification of the DNA (10 ng) was carried out with the REDExtract-N-Amp Plant PCR kit as described above, only for the 16S rRNA region, reactions were incubated in a thermal cycler for 3 min at 94° C., followed by 35 cycles of 1 min at 94° C., 1 min at 55° C., and 2 min at 72° C., and then 10 min at 72° C.

The DNA sequences from the *Erwinia* isolates were compared with the corresponding sequences from *E. persicina* (ICMP 8932 and ICMP 12532), *E. rhapontici* (ICMP 15975), and type strains of other *Erwinia* taxa and *Xanthomonas campestris* pv. *campestris* (Xcc; available from GenBank, National Center for Biotechnology Information, USA). These were aligned in Sequencher (Gene Codes Corporation) using the dirty data assembly algorithm, and assembly parameters of 60% minimum match and minimum overlap of 50. Some manual adjustments were made to the alignments to reposition or remove gaps.

Phylogenetic trees were estimated from the alignments of each gene in MEGA6 (Tamura et al. 2013) using the Maximum Likelihood method based on the Tamura 3-parameter model (Tamura 1992). A discrete Gamma distribution with 5 rate categories was used to model evolutionary rate differences among sites. All positions containing gaps were eliminated. The initial tree(s) for the heuristic search were obtained by applying the Neighbor-Joining method to a matrix of pairwise distances estimated using the Maximum Composite Likelihood approach. The robustness of the tree was measured by the Bootstrap method with 1000 replications. A Bootstrap value of 70% or greater was considered well supported. Xcc type strain ICMP 13 was used as the outgroup for rooting the tree.

Figure 2:
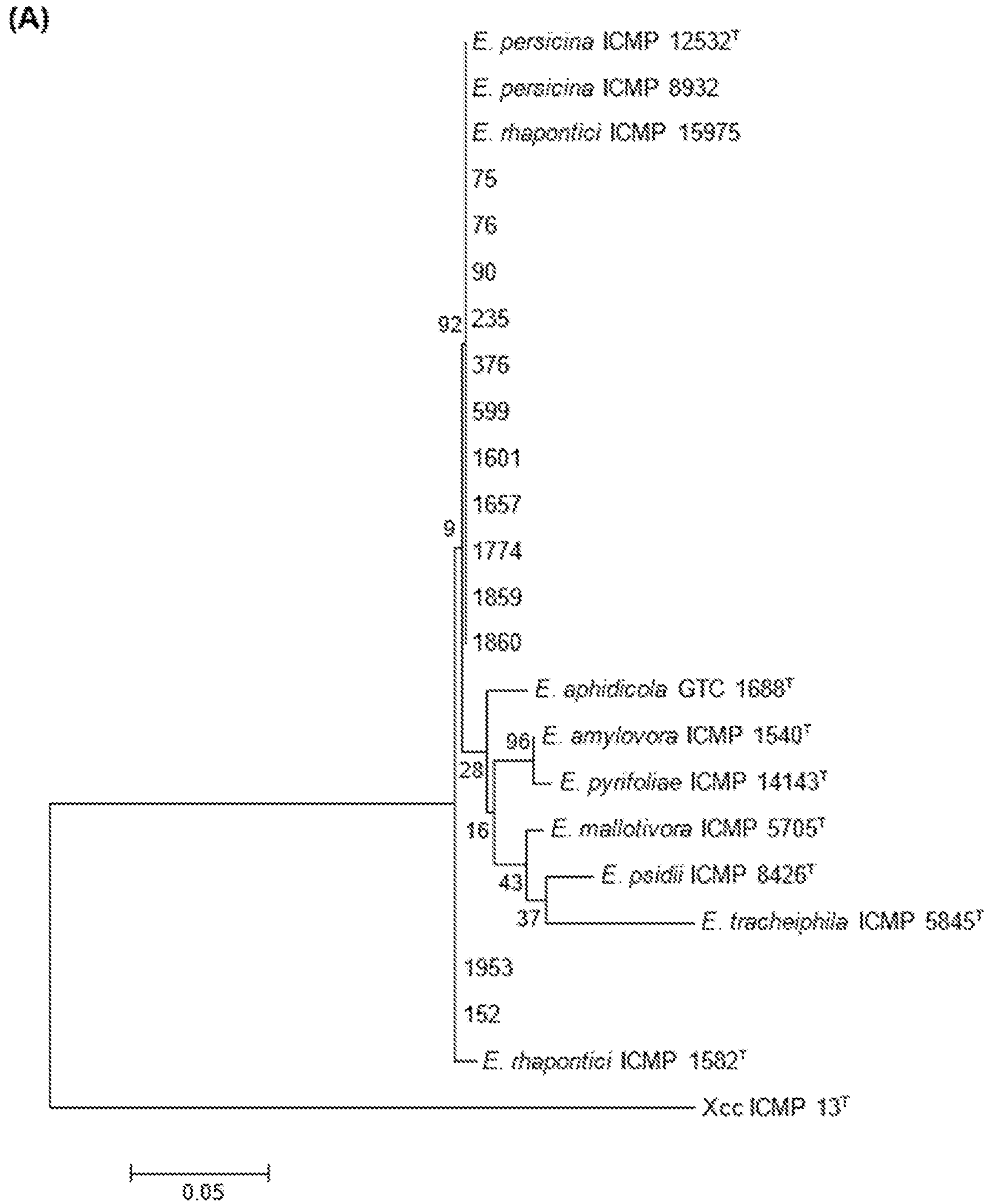
FIG. 2. Molecular phylogenetic analysis of the 16S ribosomal RNA region (16S rRNA; A), heat shock protein dnaJ (dnaJ; B), glyceraldehyde-3-phosphate dehydrogenase (gapDH; C) and recombinase A (recA; D) genes in *Erwinia persicina* isolates from brassicas (75, 76, 90, 152, 235, 376, 599, 1601, 1657, 1774, 1859, 1860, 1953) by the Maximum Likelihood method based on the Tamura 3-parameter model (Tamura, 1992). The trees with the highest log likelihood are shown. The percentage of trees in which the associated isolates clustered together is indicated next to the branches. The trees are rooted on *Xanthomonas campestris* pv. *campestris* and are drawn to scale with branch lengths measured in the number of substitutions per site. Included in the analysis were type strains (denoted by 'T') of different *Erwinia* species. Isolates that displayed genetic heterogeneity between colonies are marked with an asterisk. A total of 818, 627, 366 and 441 positions were analysed from the 16S rRNA region, dnaJ, gapDH and recA genes, respectively.
Figure 2:
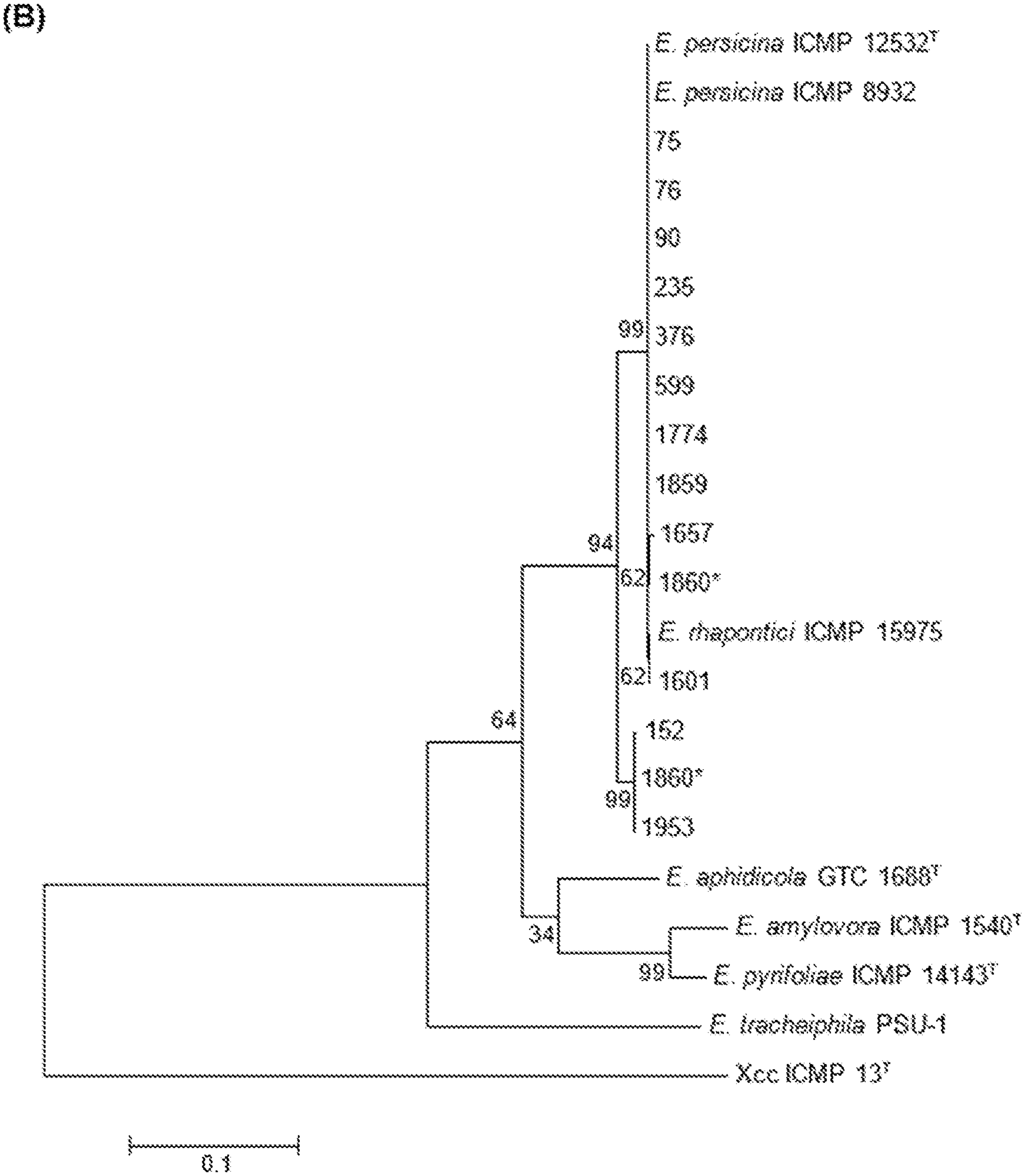
Figure 2:
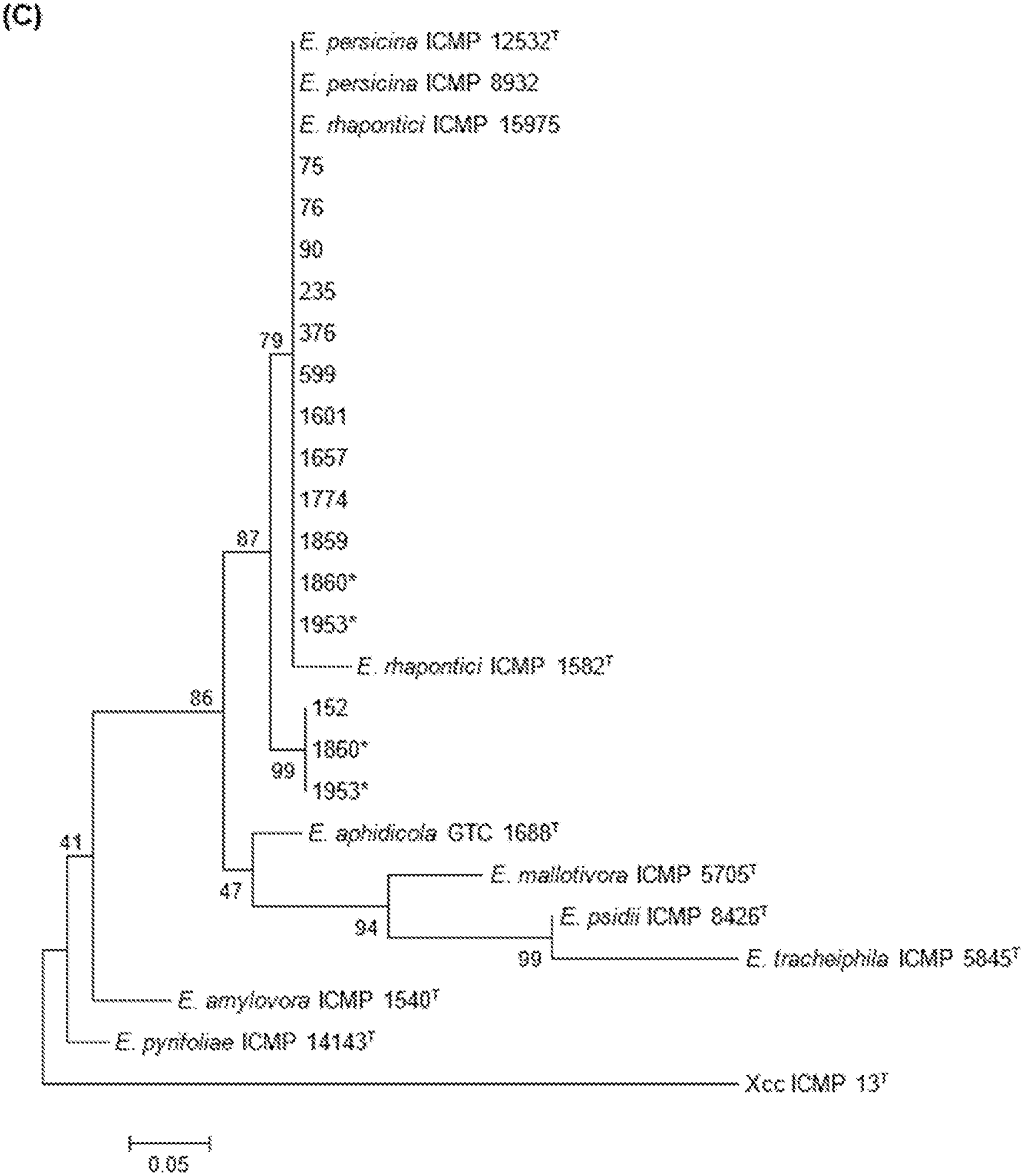
Figure 2:
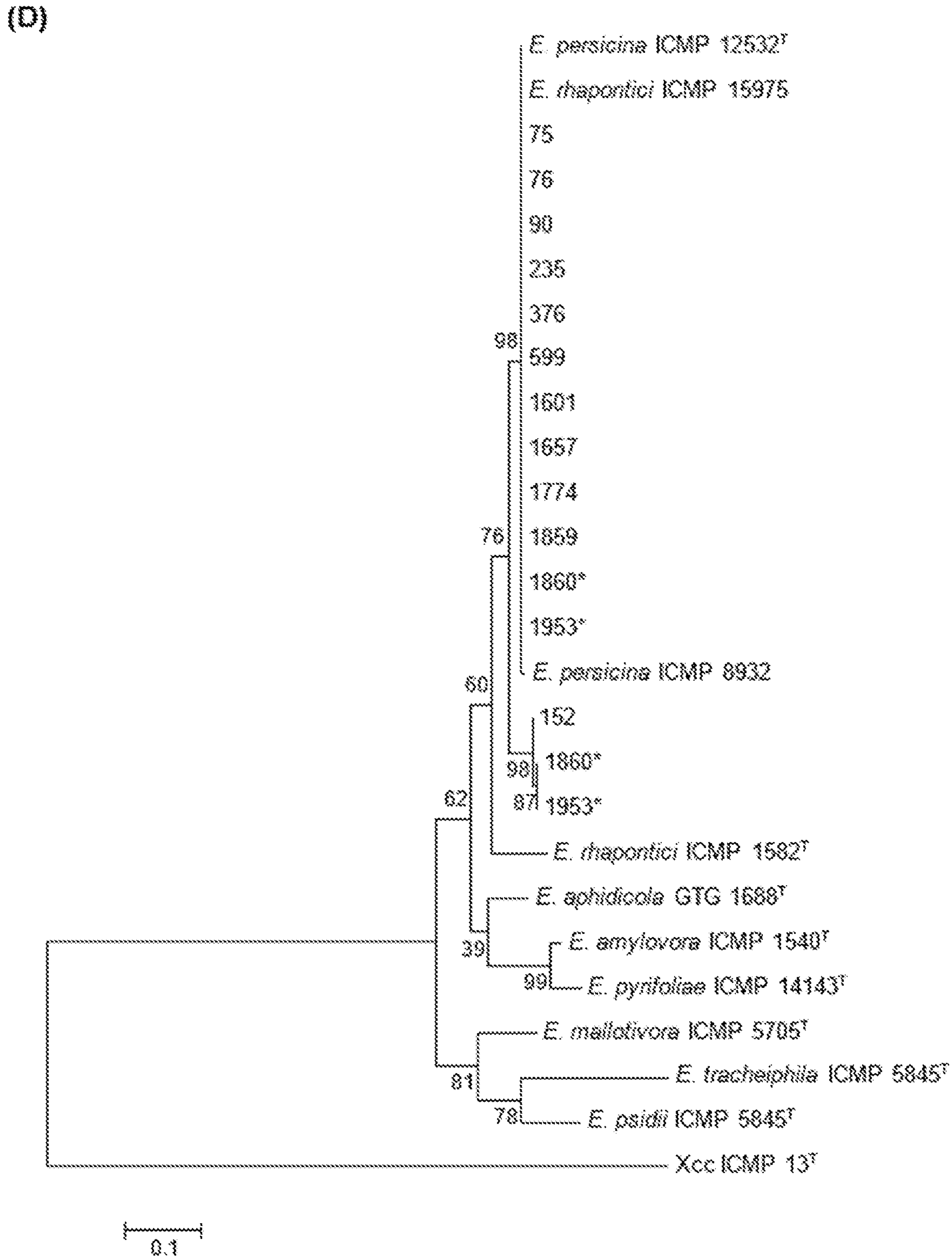

*Erwinia* 75, 76, 90 and 1859 isolates displayed 100% sequence identity to the type strain of *E. persicina* (ICMP 12532). These isolates clustered in the phylogenetic trees with this type strain to form a well-supported group separate from most other *Erwinia* taxa (FIG. 2).

SEQ ID NO. 1 to 4 were used to characterise DSM 32302, SEQ ID NO. 5 to 8 were used to characterise DSM 32304; SEQ ID NO. 9 to 12 were used to characterise DSM 32305 and SEQ ID NO. 13 to 16 were used characterise DSM 32303.

Alignments of the sequences of SEQ ID NO: 1 to 16 are shown in FIGS. 3-6, and display the characteristics of each strain.

Example 3: In Vitro Screening

Bacterial isolates representative of the range of taxa present in brassicas were evaluated in dual culture assays against Xcc isolates Xcc2 (I. Harvey, PLANTwise), ICMP 2 and/or ICMP 4013 (Landcare Research), and against *Sclerotinia sclerotiorum* (Ss) isolates LU462 and LU471 from kale (Lincoln University Culture Collection).

For each Xcc isolate, inoculum grown on yeast dextrose chalk agar (YDCA) at 25° C. in the dark for 3-5 d, was resuspended in 0.1 M $MgSO_4$ and adjusted to an optical density of 0.80±0.01 at 600 nm (estimated concentration of $2\times10^8$ CFU/mL). This inoculum (0.1 mL) was spread over the agar surface in separate sterile Petri dishes containing either YDCA or PDA. The test bacteria were introduced soon after.

Bacterial cells grown on NA at 25° C. in the dark for 1-5 d were applied, using an inoculation loop, to the Xcc-inoculated Petri dishes at four equidistant inoculation points, 18 mm from the edge. For each bacterial isolate, two Petri dishes (2×YDCA, or in later experiments 1×YDCA and 1×PDA) were prepared against each Xcc isolate. The Petri dishes were incubated in a random order at 25° C. in the dark.

In the dual culture assays with Ss, separate sterile Petri dishes containing PDA were inoculated with the bacterial isolates as described above, and were incubated overnight at 25° C. in the dark before the pathogen was introduced. A mycelial disc of Ss (6 mm in diameter) was removed from a culture grown on PDA at 20° C. in the dark for 4-6 d and transferred to the centre of the Petri dish with the test bacteria. Two Petri dishes were prepared for each bacterial isolate against each Ss isolate, and were incubated in a random order at 20° C. in the dark.

The dual culture assays were assessed 2-8 d after pathogen inoculation. The bacterial isolates were given scores in the assays against Xcc as 0=no inhibitory effects on Xcc growth, 1=small effects, 2=moderate effects, or 3=large effects. Against Ss, they were scored as 0=no inhibitory effects on Ss growth, 1=Ss and test bacterium approach one another and stop growing, or 2=Ss growth is inhibited at a distance leaving a clear zone of inhibition or becomes overgrown by the test bacterium.

The bioactivity scores of the bacterial isolates in each dual culture assay were statistically analysed using an analysis of variance (ANOVA) for a completely randomised experimental design with a treatment structure of 2 (pathogen isolate)×>1 (test isolate). For those dual culture assays carried out on two different media, the treatment structure was amended to 2 (media)+2 (pathogen isolate)×>1 (test isolate). Test isolates that exclusively scored zero, or conversely, the greatest bioactivity score, were omitted from ANOVA to avoid violating the assumption of equal variance. These were compared to the variable treatments using the least significant effect (LSEffect 5%), that is the least significant difference (LSD 5%) divided by the square root of 2.

A total of 38 bacterial isolates showed bioactivity against both pathogens in vitro (FIG. 7). The bacterial isolates were from five genera: *Bacillus, Brevibacillus, Erwinia, Paenibacillus* or *Pseudomonas*. These included *E. persicina* isolates 75, 76 and 90. *E. persicina* isolate 1859 was not evaluated. The taxonomic identities of four bacterial isolates were unknown.

Some of the bacterial isolates only displayed antagonism towards one pathogen, and these included, in addition to some of the aforementioned genera, isolates from the bacterial genera *Chryseobacterium, Pantoea* and *Variovorax* (FIG. 7). Isolates from 26 bacterial genera showed no in vitro bioactivity against Xcc or Ss.

Example 4: Bioactivity in Seedling Bioassays with Xcc

The bioactivity of *E. persicina* isolates 75, 76, 90 and 599 were, in addition to a number of other bacterial isolates, evaluated against Xcc isolates ICMP 4013 and ICMP 6497 (Landcare Research) in cabbage and forage rape seedling bioassays.

Xcc inoculum was prepared from YDCA cultures that had been grown in the dark at 25° C. for 3 d. The inoculum, resuspended in sterile 0.1% (w/v) bacteriological peptone (BP) water, was adjusted to a concentration of $1\times10^7$ colony forming units (CFU)/mL based on its optical density at 600 nm.

Seeds from cabbage and forage rape were surface-sterilised in 1% NaOCl with 0.01% (v/v) Tween 20. Xcc inoculum ($1\times10^7$ CFU/mL) or sterile BP water (negative control) was applied to the surface-sterilized seed at a rate of 3 mL/g seed under vacuum at 6.7 kPa with continuous mixing for 5 min. The seeds were collected in sterile Miracloth and dried overnight in open Petri dishes in a laminar flow cabinet.

The bacterial isolates were grown in 100 mL of LB on a shaker at 180 rpm, 30° C. in the dark for 18 h. The bacterial cells were collected from the culture by centrifugation at 3,220×g for 20 min, washed with sterile BP water, and centrifuged again before resuspending in sterile BP water. The inoculum was adjusted to a concentration of $1\times10^8$ CFU/mL based on its optical density at 600 nm and applied to the Xcc-inoculated seeds at a rate of 0.6 mL/g seed. Sterile BP water was applied to the negative and positive controls. The seeds were mixed manually with the inoculum and incubated overnight in a closed but not sealed Petri dish in a laminar flow cabinet.

For each seed treatment, 25 seeds were evenly spaced on two layers of germination blotter (60 mm×90 mm, Anchor Steel Blue Blotter, Anchor Paper Company) moistened with 10 mL of sterile RO water. The blotters and seed were transferred to a clean plastic container with clear sides and an additional 3 mL of sterile RO water was added before sealing the container.

A minimum of 10 germination blotters were prepared for each seed treatment. Assays were arranged in a randomised complete block design at 30° C. light (1000 lux) for 8 h and 20° C. dark for 16 h. In order to minimize the variance of the difference between the control and treatment, the number of positive and negative controls in each block was approximately equal to the square root of the total number of treatments.

Germination was assessed 5 d after sowing (DAS) according to the International Seed Testing Association (ISTA) guidelines (Don, 2009). The occurrence of disease symptoms was assessed in normal seedlings 8 DAS. Symptoms typically manifested as a transparent to light brown lesion on the upper hypocotyl.

The percentage germination and disease incidence was statistically analysed using an ANOVA for a randomised complete block design with 10 blocks+>1 (test isolate). Treatments that consistently had germination or disease levels close to 0 or 100% were omitted from the analysis to avoid violating the assumption of equal variance. These were statistically compared to the variable treatments using the LSEffect 5%.

Combined analysis of germination and disease incidence in different brassica species, against different pathogen isolates and overall, were carried out on the data means for each isolate in each assay using an unbalanced analysis of variance. In cases where multiple seed lots or pathogens were tested in the same assay, the main effect means for the isolates were used in order to achieve independence in the data. All statistical analyses were performed using GenStat.

*E. persicina* isolates 75, 76 and 90 reduced the incidence of black rot in cabbage and/or forage rape seedlings on average by 88-99% (FIG. 8). Disease levels were lower in seedlings treated with these isolates than with *E. persicina* isolate 599. None of the isolates from other bacterial genera showed higher levels of bioactivity against Xcc than *E. persicina* isolates 75, 76 and 90.

Seedling emergence was high from seed treated with *E. persicina* isolates 75, 76 and 90 (FIG. 9).

Example 5: Biocontrol of Xcc in Cabbage

*E. persicina* isolates 76 and 90 were evaluated, among other bacterial and fungal isolates, for biocontrol activity in cabbage against Xcc isolates ICMP 6497 and ICMP 21080 (Landcare Research).

The pathogen was applied to cabbage seed together with *E. persicina* isolates 76 and 90 and other bacterial and fungal isolates following the methods described in Example 4 with some modifications. The inoculum of Xcc was increased to a concentration of $1\times10^9$ CFU/mL and that of the bacterial and fungal isolates to $5\times10^8$ and/or $5\times10^9$ CFU/mL.

The treated seed was sown in 2×2 cell trays containing 25 mL/cell of saturated potting mix (pH 5.8). Two seeds were sown in each cell to a depth of 10 mm and was thinned to one normal seedling per cell after 1 wk. Each cell tray was placed on an individual saucer. The potting mix was composed of Kiwipeat (600 L/m$^3$, New Zealand Growing Media), pumice (400 L/m$^3$, Egmont Commercial), Osmocote Exact Mini (1.5 kg/m$^3$, Everris International), dolomite lime (5 kg/m$^3$, Golden Bay Dolomite), finely ground agricultural lime (2 kg/m$^3$, Oxford Lime Company), superphosphate (1 kg/m$^3$, Ravensdown) and Hydraflo (1 kg/m$^3$, Everris International).

The pot trials were arranged following a randomised complete block design in a growth room (BDW120 Plant Growth Cabinets; Conviron) at the New Zealand Biotron (Lincoln University). Conditions in the growth room cycled from 25° C. light (400 μmol/m$^2$/s) for 13 h to 15° C. dark for 11 h, with a constant relative humidity of 79%. In order to minimize the variance of the difference between the control and treatment, the number of positive controls (and sometimes negative controls) in each block was approximately equal to the square root of the total number of treatments.

The pot trials were lightly watered overhead with a hand-held watering wand 1 DAS. Thereafter, they were watered as required to maintain the potting mix in a moist condition. Liquid fertiliser (Agrichem High NK, PGG Wrightson Turf) was used at weekly intervals from 2-3 wk after sowing. The fertiliser, diluted 1:200, was applied to the pot trials at sufficient levels to saturate the potting mix and was gradually increased over time to fill the saucer.

Seedling emergence was assessed 7-8 DAS and were according to their above ground appearance, categorised as normal or abnormal following the International Seed Testing Association (ISTA) guidelines for *Brassica* seedlings (Don, 2009). Normal seedlings were assessed for black rot disease symptoms at weekly intervals from 14 DAS onwards. The presence of characteristic V-shaped chlorotic lesions and blackened veins (Rimmer et al. 2007) were recorded for up to 21 DAS on the cotyledons and 42 DAS on the true leaves.

The percentage emergence and disease incidence was statistically analysed using an ANOVA as described in Example 4. Disease incidence was based on the cumulative total of infected plants across successive weeks.

Figure 11:
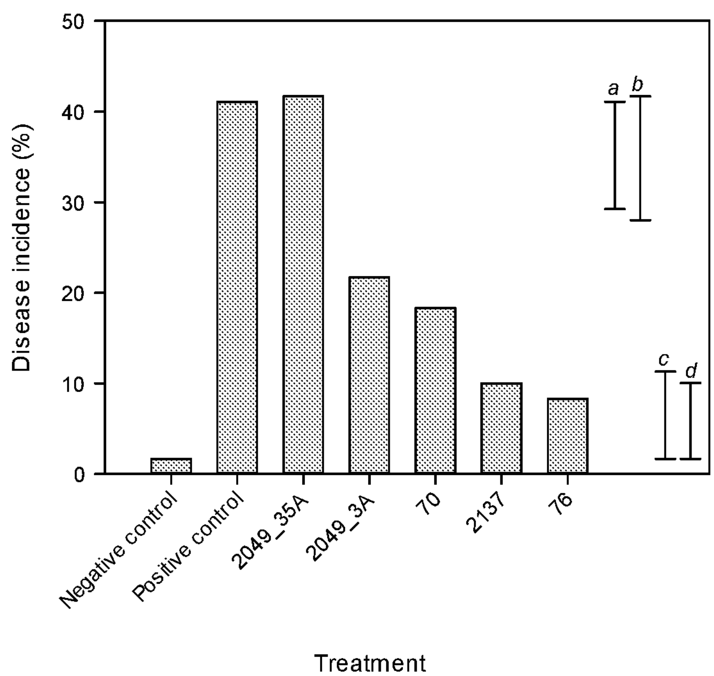
FIG. 11. Effect of bacterial isolates, including *Erwinia persicina* isolate 76, on the incidence of black rot in cabbage after 6 weeks in the growth room. Each isolate was applied at a target rate of $3\times10^9$ CFU/g seed, to seed artificially inoculated with *Xanthomonas campestris* pv. *campestris* (Xcc) isolate ICMP 21080. Seed for the positive and negative controls (with and without Xcc, respectively) was treated with bacteriological peptone water. Growth room conditions cycled from 25° C. light for 13 h to 15° C. dark for 11 h, with a constant relative humidity of 79%. The error bars indicate the LSD (5%) for comparison of an isolate against the positive control (a) or another isolate (b), and the LSEffect (5%) for comparison of the negative control against an isolate (c) or the positive control (d).

In warm, humid conditions that favour the disease, *E. persicina* isolates 76 and 90 significantly decreased black rot levels by 80-98% when applied at different rates (FIGS. 10 and 11).

There were no negative effects on emergence with *E. persicina* isolate 76 (FIGS. 12 and 13).

Example 6: Effect of Application Rate on Symptom and Latent Xcc Infection

The ability of *E. persicina* isolates 76, 90, 1774 and 1860 when applied to seed at different rates, to control both symptom and latent Xcc infections in cabbage were compared.

The pot trial was conducted as described in Example 5 with some amendments. Cabbage seed was artificially inoculated with Xcc isolate ICMP 21080 (Landcare Research). *E. persicina* was applied to this seed at six different concentrations; $5\times10^4$, $5\times10^5$, $5\times10^6$, $5\times10^7$, $5\times10^8$ and $5\times10^9$ CFU/mL.

The seedlings were assessed weekly for black rot symptoms in the cotyledons and true leaves until 28 and 42 DAS, respectively. The occurrence of latent Xcc infections were tested in seedlings treated with *E. persicina* at concentrations of $\geq3\times10^6$ CFU/g seed and in the controls. One seedling (or two positive control seedlings) that had not displayed disease symptoms throughout the pot trial was randomly selected from each block. The vascular fluid was extracted from the plant using a Scholander pressure chamber (Plant Water Status Console 3000F01, ICT International).

The plant cut at the base of the stem just above the potting mix, was mounted inside the pressure chamber. The stem inserted in a short length of sterile silicon-rubber tubing, was threaded through the specimen holder into a sterile 1.7 mL collection tube. A total of 2,760 kPa was applied to the chamber for 2 min or longer if necessary, to collect >0.1 mL of vascular fluid. Appropriate 10-fold serial dilutions of the vascular fluid were spread (0.1 mL) over the agar surface of sterile Petri dishes containing FS agar medium. The occurrence of Xcc was determined after 3 d at 28° C. in the dark. The cultures were examined for small, pale, mucoid colonies surrounded by a zone of starch hydrolysis.

The percentage emergence was statistically analysed using an ANOVA for a randomised complete block design with 15 blocks and a factorial treatment structure of 4 (*E. persicina* isolate)×6 (rate)+1 (positive control)+1 (negative control). The *E. persicina* isolates 76, 90, 1774 and 1860 were applied at six target rates of $3\times10^4$, $3\times10^5$, $3\times10^6$, $3\times10^7$, $3\times10^8$ and $3\times10^9$ CFU/g to seed artificially inoculated with Xcc isolate ICMP 21080. Also included were seed treated only with Xcc (positive control) or BP water (negative control). For the rate factor, linear and quadratic contrasts were included in the analysis, as well as contrasts to examine the effects of the *E. persicina* isolates. All statistical analyses were performed using GenStat.

The negative control was omitted from the ANOVA of the percentage of symptom and latent infections, and total disease incidence. This was necessary due to the absence of infection, to avoid violation of the ANOVA assumption of equal variance. This treatment was statistically compared to the variable treatments using LSEffect 5%. The percentage of symptom infections was based on the cumulative total of plants with symptoms across successive weeks. The total disease incidence was calculated based on the total number of plants with symptoms and latent infections. The latter was estimated for each treatment in each block by multiplying the number of symptomless plants by the proportion of plants with latent infections. The rate factor in the factorial treatment structure was reduced to four for ANOVA of the percentage latent infection and total disease incidence.

Figure 15:
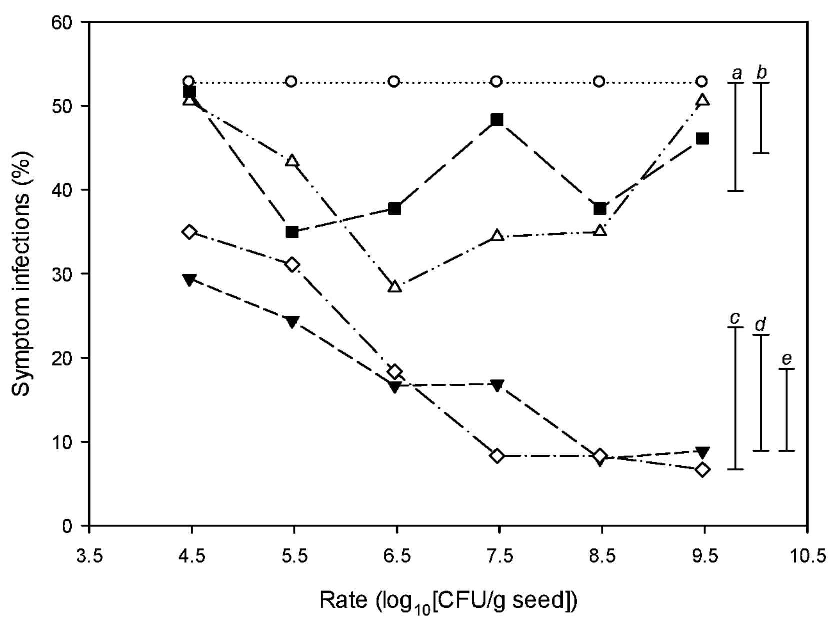
FIG. 15. Effect of *Erwinia persicina* isolate and application rate on the incidence of black rot symptoms in cabbage after 6 weeks under growth room conditions. *E. persicina* isolates 76 (--▼--), 90 (-·◇·-), 1774 (-··Δ-··) and 1860 (-■-) were applied individually at six different rates to seed artificially inoculated with *Xanthomonas campestris* pv. *campestris* (Xcc) isolate ICMP 21080. Seed for the positive (Xcc) control (······○······) was treated with bacteriological peptone water. Growth room conditions cycled from 25° C. light for 13 h to 15° C. dark for 11 h, with a constant relative humidity of 79%. The error bars indicate the LSD (5%) for comparison of the positive control against isolates 90, 1774 and 1860 (a) and isolate 76 (b), and for comparisons between isolates 90, 1774 and 1860 (c), isolate 76 and the other isolates (d) and the different rates of isolate 76 (e).

The biocontrol activity of *E. persicina* isolates 76 and 90 against Xcc differed significantly from *E. persicina* isolates 1774 and 1860 ($p<0.001$, FIG. 14). Isolates 76 and 90 significantly decreased symptom infections at all application rates (FIG. 15). Latent infections tended to be lower with these isolates which combined with reduced symptom infections contributed to a significant reduction in the total disease incidence (FIG. 14). Both isolates when applied at medium to high rates ($3\times10^6$-$3\times10^9$ CFU/g seed) reduced the total disease incidence by 63-79%.

Example 7: Impact of Temperature on Biocontrol Activity

The efficacy of *E. persicina* isolate 76 and other BCAs when applied at different rates to Xcc-inoculated cabbage seed were compared under two different temperature regimes.

The pot trial was conducted as described in Example 5 with some amendments. Cabbage seed was artificially inoculated with Xcc isolate ICMP 6497 (Landcare Research). *E. persicina* isolate 76 and three other BCAs were applied to the seed at concentrations of $5\times10^7$, $5\times10^8$ and $5\times10^9$ CFU/mL. One of the pot trials was held in a growth room under the same conditions as described in Example 5. For the other pot trial, growth room conditions cycled from 20° C. light (400 μmol/m$^2$/s) for 13 h to 10° C. dark for 11 h.

The percentage emergence at the two temperature regimes was analysed together using an ANOVA for a randomised complete block design with 2 (main plots)+10 (blocks) and a factorial treatment structure of 2 (temperature regime)×(4 (BCA isolate)×3 (low, medium and high rate)+1 (Xcc inoculant)+1 (BP inoculant)). The main plots were the 2 temperature regimes of 20° C. D/10° C. N and 25° C. D/15° C. N. The four BCA isolates, including *E. persicina* isolate 76, were applied at three target rates; low: 3×10$^7$ CFU/g; medium: 3×10$^8$ CFU/g; and high: 3×10$^9$ CFU/g. Also included were seeds treated with inoculants Xcc isolate ICMP 6497 or BP water. For the rate factor, linear and quadratic contrasts were included in the analysis, as well as contrasts to examine the effects of BCA and Xcc inoculant. All statistical analyses were performed using GenStat.

For ANOVA of the percentage disease incidence which was based on the cumulative total of infected plants across successive weeks, 13 treatments that were derived from seed pre-treated with Xcc inoculant were included in the analysis. There were no symptoms detected in the negative control (BP inoculant) and to avoid violation of the ANOVA assumption of equal variance, this treatment was omitted from the analysis. ANOVA was performed as described for emergence using a 2 (temperature regime)×(4 (BCA isolate)×3 (high, medium and low rate)+1 (Xcc inoculant)) factorial treatment structure.

Application of *E. persicina* isolate 76 to seed reduced black rot in cabbage seedlings (FIG. 16). This isolate significantly reduced the incidence of disease under both temperature regimes by 73-100%. All three application rates were effective.

The presence of *E. persicina* isolate 76 did not affect emergence of cabbage seed under warmer or cooler temperature regimes (FIG. 17).

Example 8: Impact of pH on Biocontrol Activity

The effect of pH on the biocontrol activity of *E. persicina* isolate 76 against black rot in cabbage was investigated together with another BCA.

The pot trial was conducted as described in Example 5 with some amendments. Cabbage seed was artificially inoculated with Xcc isolate ICMP 6497 (Landcare Research) and treated with *E. persicina* isolate 76 and one other BCA. These were sown in potting mix of pH 5.0, pH 5.8 and pH 6.4. The potting mix pH was reduced to pH 5.0 by excluding the agricultural lime and decreasing the levels of dolomite lime to 3 kg/m$^3$, and was raised to pH 6.4 by increasing the levels of both agricultural lime and superphosphate to 7 kg/m$^3$. The potting mix pH was tested at the start and end of the pot trials following the Australian Standard for Potting Mixes (AS 3743-2003).

The percentage emergence in the pH pot trials was statistically analysed using an ANOVA for a randomised complete block design with 15 blocks and a 3 (pH)×4 (2 (BCA isolate)+1 (Xcc inoculant)+1 (BP inoculant)) factorial treatment structure. The pH of the potting mixes were pH 5.0, 5.8 or 6.4. The BCA isolates were *E. persicina* isolate 76 and one other BCA. Also included were seeds treated with inoculants Xcc isolate ICMP 6497 or BP water. Linear and quadratic polynomial contrasts of the pH factor, and contrasts to examine the effects of BCA, BCA isolate and Xcc inoculant were included in the analysis.

For ANOVA of the percentage disease incidence which was based on the cumulative total of infected plants across successive weeks, 9 treatments that were derived from seed pre-treated with Xcc inoculant were included in the analysis. There were no symptoms detected in the treatment with BP water inoculant at the different pH levels and to avoid violation of the ANOVA assumption of equal variance, this treatment was omitted from the analysis. ANOVA was performed as described for emergence using a 3 (pH)×3 (2 (BCA isolate)+1 (Xcc inoculant)) factorial treatment structure.

The potting mixes were at the start and end of the pot trial close to the target pH levels of 5.0, 5.8 and 6.4. In the absence of BCA, the level of black rot in cabbage was significantly higher at pH 6.4 than pH 5.0 and 5.8 ($p=0.004$, FIG. 18).

Figure 18:
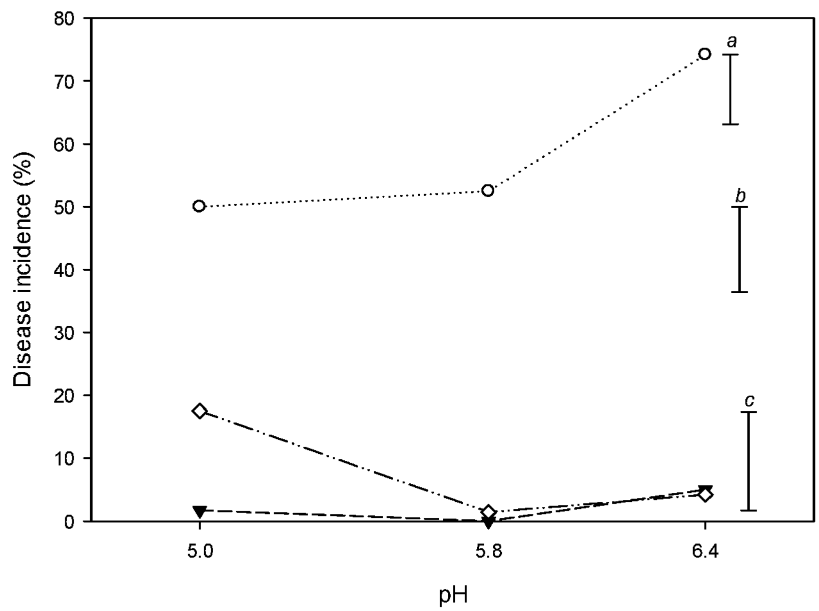
FIG. 18. Effect of potting mix pH and biocontrol agent (BCA) on black rot disease incidence in cabbage after 6 weeks in the growth room. Each isolate, including *Erwinia persicina* isolate 76 (--▼--), was applied at a target rate of $3\times10^9$ CFU/g seed, to seed artificially inoculated with *Xanthomonas campestris* pv. *campestris* (Xcc) isolate ICMP 6497 (15 replicates of each). Seed for the positive (Xcc)

*E. persicina* isolate 76 resulted in a 93-100% reduction in disease levels across all pH levels (FIG. 18). This isolate was also more effective at controlling black rot at pH 5.0 than the other BCA.

The rate of emergence of cabbage was high across all pH levels in the presence of *E. persicina* isolate 76 (FIG. 19).

Example 9: Biocontrol Activity Under Wet Conditions

The biocontrol activity of 13 isolates of *E. persicina* from brassica (75, 76, 90, 152, 235, 376, 599, 1601, 1657, 1774, 1859, 1860 and 1953) was evaluated against Xcc isolate ICMP 21080 (Landcare Research).

The pot trials were carried out as described in Example 5, with some exceptions. The seeds were inadvertently covered after Xcc inoculation. The pot trial was carried out in 3×6 cell trays and only a single seed was sown in each cell. The potting mix was kept excessively wet during the course of the pot trial. The true leaves of seedlings were only assessed for black rot symptoms up to 30 DAS.

The percentage emergence and disease incidence were statistically analysed using an ANOVA for a randomised complete block design with five blocks and 15 treatments. The treatments included the positive and negative controls, and *E. persicina* isolates 75, 76, 90, 152, 235, 376, 599, 1601, 1657, 1774, 1859, 1860 and 1953.

The seedlings were overwatered and disease levels 30 days after sowing (DAS) were high, reaching from 95% in the positive control (FIG. 20). Black rot symptoms were detected on both the cotyledons and true leaves of the negative control.

Under these conditions, four of the *Erwinia* isolates; 75, 76, 90 and 1859, significantly reduced symptom infections by Xcc isolate ICMP 21080 (FIG. 20). There were no differences detected in the biocontrol activity of these isolates.

There were no negative effects on emergence with the different *Erwinia* isolates (FIG. 20).

Example 10: Effect of Application Method on Symptom and Latent Xcc Infection

The efficacy of *E. persicina* isolate 76 when applied to the seed and/or sowing hole against both symptom and latent Xcc infection was investigated under greenhouse and growth room conditions, together with two other BCAs Cabbage seed was inoculated with Xcc isolate ICMP 21080 (Landcare Research) and treated with BP water, *E. persicina* isolate 76, or one of two other BCAs as described in Example 5. For potting mix application, inoculum was prepared in the same way to a target concentration of $2\times10^7$ CFU/mL and applied to the potting mix 1 DAS. The 2×2 cell trays were filled with saturated potting mix (pH 5.8, see Example 5) and a total of $2\times10^7$ CFU were applied to the sowing hole of each 25 mL cell. The cells trays were stored in plastic bags at ambient until the seed was sown the next day as described in Example 5.

The seedlings were raised as described in Example 5, only one of the pot trials was held in a Durolite-clad greenhouse at Lincoln University (New Zealand). The set point temperatures for heating and venting of the greenhouse were 17 and 24° C., respectively.

Seedling emergence and the occurrence of black rot disease symptoms were assessed as described in Example 5. There were some exceptions. In the growth room, disease symptoms in the true leaves were assessed up to 40 DAS. Emergence was assessed 9 DAS in the greenhouse, and disease symptoms in the cotyledons and true leaves up to 35 and 49 DAS, respectively.

Seedlings were tested for the presence of latent infections. One seedling that had not displayed disease symptoms throughout the pot trial was randomly selected from each cell tray. In addition, a random selection of diseased seedlings was tested as positive controls. Seedlings were sampled 41-46 DAS from the pot trial in the growth room and 50-65 DAS from the pot trial in the greenhouse. Fluid was extracted from the vascular vessels of the plant shoots following the methods described in Example 6.

The percentage emergence was statistically analysed using an ANOVA for a randomised complete block design with 15 blocks in the growth room and 40 blocks in the greenhouse, and a 3 (BCA isolate)×3 (application method)+1 (Xcc inoculant)+1 (BP inoculant) factorial treatment structure. The BCA isolates were *E. persicina* isolate 76 and two other BCAs. Also included were seeds treated with inoculants Xcc isolate ICMP 21080 or BP water. Contrasts to examine the effect of seed or potting mix applications in the application method factor, and of BCA, BCA isolate and Xcc inoculant were included in the analysis.

For ANOVA of the percentage symptom and latent infections and total disease incidence in the growth room, and percentage symptom infections in the greenhouse, the BP inoculant factor was omitted from the factorial treatment structure. This was necessary due to the absence of infection, to avoid violation of the ANOVA assumption of equal variance. This treatment was statistically compared to the variable treatments using the LSEffect 5%. ANOVA of the percentage latent infections and total disease incidence in the greenhouse was performed as described for emergence. The percentage of symptom infections was based on the cumulative total of infected plants across successive weeks. The total disease incidence was calculated based on the total number of plants with symptom and latent infections. The latter was estimated for each treatment in each block by multiplying the number of symptomless plants by the proportion of plants with latent infections.

The method of application significantly affected emergence of cabbage seed in the greenhouse but not in the growth room (FIG. 21). In the greenhouse, *E. persicina* isolate 76 increased emergence when applied to the seed but reduced emergence as a potting mix application. There were no significant interactions between seed and potting mix applications.

In both the greenhouse and growth room, *E. persicina* isolate 76 had a major effect on disease incidence, causing a decrease in both symptom and latent Xcc infections (FIGS. 22 and 23). Seed and potting mix applications of this isolate both individually and in combination, significantly reduced black rot on average by 73%.

Example 11: Compatibility with Agrichemicals

The efficacy of *E. persicina* isolate 76 against Xcc isolate ICMP 21080 (Landcare Research) was assessed in the greenhouse under a chemical spray programme used in a commercial nursery for raising brassica transplants.

*E. persicina* isolate 76 was applied to cabbage seed artificially inoculated with Xcc isolate ICMP 21080 following the methods described in Example 5, only the seeds were held at ambient temperature for 1 d and then at 4° C. for 4 d before they were sown. A single seed was sown in each cell of a 2×2 cell tray and 10 cell trays of the same treatment were placed together on a plastic tray. The trays were arranged in a Durolite-clad greenhouse at Lincoln University (New Zealand) following a randomised complete block design with a total of 8 blocks. In each block the unsprayed treatments were replicated twice to minimize the variance of the difference between these and the sprayed treatments. The set point temperatures for heating and venting of the greenhouse were 17 and 24° C., respectively.

The pot trial was watered and fertilised as described in Example 5 with at least one watering between fertiliser and chemical spray applications. Care was taken to ensure the seedlings were not water stressed at the time of spraying and that the foliage was dry. Chemical sprays were applied weekly to the selected seedlings starting 9 and 16 days after sowing as outlined in FIG. 24 using a trigger pump sprayer (Jet500, McGregor) calibrated to spray 2 mL per tray of 40 seedlings. The seedlings were moved to a separate area to be sprayed to avoid spray drift.

The seedlings were assessed as described in Example 5.

The percentage emergence was statistically analysed using an ANOVA for a randomised complete block design with eight blocks and two treatments. The treatments were Xcc-inoculated seed treated with or without *E. persicina* isolate 76. For ANOVA of the percentage disease incidence, the factorial treatment structure of 2 (seed inoculant)×3 (spray) was used. Seedlings from Xcc-inoculated seed treated with or without *E. persicina* isolate 76 were left unsprayed or sprayed weekly with chemicals starting 9 or 16 DAS. For the spray factor, contrasts were included to examine the effects of spraying and spray timing.

The chemical spray programme had no effect on the efficacy of *E. persicina* isolate 76 (FIG. 25). Application of this isolate to seed significantly reduced the incidence of disease in the sprayed seedlings to similar levels as detected in unsprayed seedlings. The chemical sprays did not reduce disease levels in the positive control.

Example 12: Plant Growth Promotion

*E. persicina* isolates 75, 76, 90 and 599, together with some other bacterial isolates, were evaluated for their ability to promote cabbage plant growth in the greenhouse.

Cabbage seeds were surface-sterilized and inoculated with the bacterial isolates following the methods described in Example 4. The treated seeds were sown in moist potting mix in 0.9 L plastic planter bags (Egmont Commercial). Six seeds were sown in each bag to a depth of 10 mm and were thinned to one randomly selected normal seedling 8 DAS. The potting mix was composed of Kiwipeat (600 L/$m^3$, New Zealand Growing Media), pumice (400 L/$m^3$, Egmont Commercial), Osmocote Exact Mini (1.5 kg/$m^3$, Everris International), dolomite lime (4 kg/$m^3$, Golden Bay Dolomite), and Hydraflo (1 kg/$m^3$, Everris International). Each bag was placed on a saucer and water was applied overhead as required to maintain the potting mix in a moist condition.

The pot trial was conducted in a Durolite-clad greenhouse at Lincoln University (New Zealand). The set point temperatures for heating and venting of the greenhouse were 17 and 24° C., respectively. The pot trial was split into two experiments according to harvest date (22 or 43 DAS). Each experiment was arranged in a randomised complete block design with 10 blocks. In order to minimize the variance of the difference between the negative controls and treatments, there were three negative controls in each block.

Seedling emergence was assessed 7 DAS as described in Example 5. The pot trials were harvested at 22 and 43 DAS. The number of completely unfurled leaves on the plant was recorded. The dry weights of the roots and shoots were measured after complete drying at 65-70° C. The roots were carefully washed in water to remove the potting mix before drying.

The percentage seedling emergence, number of leaves and shoot and root dry weights were statistically analysed using an ANOVA for randomised complete block design with a treatment structure of 10 (replicate)+5 (bacterial isolate). A combined analysis of emergence was carried out on the data means for each isolate for the two harvest dates.

There were no negative effects observed on cabbage emergence and growth with *E. persicina* (FIG. 26). Isolate 76 increased the shoot dry weight by 45% in young cabbage seedlings (22 DAS). An increase in both shoot dry weight (37%) and root dry weight (59%) were also detected with *E. persicina* isolate 599 43 DAS.

Example 13: Seed Coating Formulation

The efficacy of a seed coating formulation of *E. persicina* isolate 76 against Xcc isolate ICMP 21080 (Landcare Research) were compared with the seed treatment described in Example 5. A second BCA was also tested.

For formulation as a seed coating, cells of *E. persicina* isolate 76 and the other BCA were formulated as described for Formulation 5 in Swaminathan et al. (2015). This formulation was applied to untreated (bare) cabbage seed and seed artificially inoculated with Xcc isolate ICMP 21080 following the methods described in Example 5.

*E. persicina* isolate 76 and the other BCA were also applied to the seed with or without Xcc following the standard seed treatment method described in Example 5, only three different concentrations of the BCA were used; $5\times10^7$, $5\times10^8$ and $5\times10^9$ CFU/mL.

The pot trials were conducted and assessed as described in Example 5.

The percentage emergence was statistically analysed using an ANOVA for a randomised complete block design with 15 blocks and a 2 (formulation)×2 (Xcc presence or absence)×(2 (BCA isolate)×3 (low, medium and high rate)+1 (BCA absence)) factorial treatment structure. Formulations were the seed coating and standard seed treatment and were applied to seed inoculated with Xcc isolate ICMP 21080 and dried overnight, or to bare seed. The BCA, *E. persicina* isolate 76 and one other BCA, were applied at three target rates; low: $3\times10^7$ CFU/g; medium: $3\times10^8$ CFU/g; and high: $3\times10^9$ CFU/g. Also included was seed not treated with BCA. For the rate factor, linear and quadratic polynomial contrasts were included in the analysis.

For ANOVA of the percentage disease incidence, only 14 treatments that were derived from seed pre-treated with Xcc inoculant were included in the analysis. The remaining 14 treatments that were derived from bare seed, were omitted to avoid violation of the ANOVA assumption of equal variance. No symptoms were detected in 12 of the omitted treatments and in the remaining 2 treatments, symptoms occurred in 3% of plants. ANOVA was performed as described for emergence using the same contrasts and a 2 (formulation)×(2 (BCA isolate)×3 (high, medium and low rate)+1 (BCA absence)) factorial treatment structure.

The seed coating formulation of *E. persicina* isolate 76 displayed high levels of disease control comparable to that of the standard seed treatment (FIG. 27). This isolate formulated as a seed coating reduced disease levels by 49-81% when applied at three different rates. *E. persicina* isolate 76 was more effective at reducing black rot than the other BCA.

Neither BCA or application rate had a major effect on emergence but emergence was affected by formulation (FIG. 28). In comparison to the standard seed treatment, emergence was significantly lower (8%) with the seed coating ($p<0.001$). Pre-treatment of seed with the pathogen also reduced emergence from 88% to 84% ($p<0.001$).

Example 14: Formulation and Application of *E. persicina*

The efficacies of granule and freeze-dried formulations of *E. persicina* isolate 76 against Xcc isolate ICMP 21080 (Landcare Research) were compared to the standard non-formulated preparation. The individual and combined effects of applying formulated and non-formulated inoculum to the seed and potting mix, and as a drench and foliar spray were examined in a factorial design.

For the granule formulation, cells of *E. persicina* isolate 76 were coated onto zeolite as described in patent WO2008023999 (Swaminathan and Jackson, 2008). For the freeze-dried formulation, cells of *E. persicina* 76 were freeze-dried in 5% (w/v) sucrose solution as described in Wessman et al. (2013). Suspensions of the freeze-dried formulation were prepared on the day of application in tap water at the target concentrations listed in FIG. 29.

The non-formulated inoculum was prepared following the methods described in Example 5 with some modifications. *E. persicina* isolate 76 was cultured in 500 mL of LB broth on a shaker at 250 rpm, 30° C. in the dark for 16 h. The inoculum was resuspended in sterile BP water adjusted to the target concentrations listed in FIG. 29. These were prepared on the day of application.

Cabbage seeds were artificially inoculated with Xcc isolate ICMP 21080 and treated with suspensions of the freeze-dried and non-formulated inoculum of *E. persicina* isolate 76 following the methods described in Example 5. Seeds for their respective controls were treated with 0.7% (w/v) sucrose or BP water.

The granule formulation and suspensions of the freeze-dried and non-formulated inoculum were incorporated by hand into the bulk and cover potting mix at the rates outlined in FIG. 29. Separate bulk and cover mixes were prepared for each type of inoculum. The composition of the potting mix was as described in Example 5 and was moistened at a rate of 0.04 L/L mix. The bulk mix was used to fill the cell trays before sowing and the cover mix to cover the seed after sowing.

After sowing, suspensions of the freeze-dried and non-formulated inoculum were applied individually to the mix as a drench using a piston-pressurised hand sprayer (Solo 456, Solo NZ) and 22 d later to the seedlings as a foliar spray using a trigger pump sprayer (Jet500, McGregor). The rates used are as outlined in FIG. 29.

A factorial design of 2 (seed inoculant)×2 (seed formulation)×4 (bulk mix)×4 (cover mix)×3 (drench)×3 (foliar spray) was followed to prepare a total of 576 unique treatment combinations. Two treated seeds were sown in each cell to a depth of 10 mm in a 2×2 cell tray containing 25 mL of potting mix per cell. An additional 64 cell trays were prepared with seed from the negative control, half of which were treated with sucrose and the remaining with BP water. These were sown in moist untreated potting mix.

After the drench was applied, the cell trays were placed inside plastic bags in a growth room overnight. The pot trial was, due to space constrants, distributed across two growth rooms (BDW120 Plant Growth Cabinets, Conviron) in the New Zealand Biotron (Lincoln University). Conditions in the growth rooms cycled from 25° C. light (400 μmol/m$^2$/s) for 13 h to 15° C. dark for 11 h, with a constant relative humidity of 79%. The entire pot trial was repeated in the nursery. The cell trays were initially placed in a Durolite-clad greenhouse but 5 DAS were moved to a glasshouse due to low light conditions. They were returned to the greenhouse for the final week of the pot trial. The cell trays were arranged in a completely randomised order on individual saucers. The negative control was randomly distributed among the other cell trays and used as an indicator of secondary spread.

The pot trial was watered and fertilised as described in Example 5 and was thinned 7 DAS to one normal seedling per cell. The temperature and relative humidity were recorded every 30 min in the growth rooms and at the nursery with a datalogger (Hobo U23 Pro V2, Onset).

Seedling emergence and the occurrence of black rot disease symptoms were assessed in the pot trials using methods similar to those described in Example 5. Disease assessments were carried out 15, 21 and 42 DAS.

The percentage emergence was statistically analysed using an ANOVA for a complete randomised design with a factorial treatment structure of 2 (seed inoculant)×2 (seed formulation)×4 (bulk mix)×4 (cover mix)×3 (drench). A fifth factor of 3 (foliar spray) was added to the factorial treatment structure for ANOVA of the percentage disease incidence. The Xcc-inoculated seed was treated with or without *E. persicina* isolate 76 as a freeze-dried formulation or non-formulated preparation that contained sucrose or BP, respectively. The bulk and cover mixes were treated with water or *E. persicina* isolate 76 as a granule or freeze-dried formulation, or as a non-formulated preparation. The latter two treatments and water were applied as a drench and foliar spray. The two locations, growth room and greenhouse, were analysed separately, and for the former, the two growth rooms were used as a covariate for ANOVA. Contrasts were included in the analysis of the bulk mix, cover mix, drench and foliar spray factors to examine the effects of *E. persicina* and formulation. The percentage of disease incidence was based on the cumulative total of seedlings with symptoms across successive weeks. All statistical analyses were performed using GenStat.

The average temperature and relative humidity of the growth rooms were higher than at the nursery.

Emergence was high for the different formulations and methods of application of *E. persicina* isolate 76 both in the growth room and glasshouse (FIG. 30).

Both in the growth room and glasshouse, application of *E. persicina* to seed was the main factor affecting disease incidence (FIG. 30). Disease levels were reduced on average by 51%. The efficacy of the freeze-dried formulation was higher than the non-formulated preparation in the glasshouse but no differences were detected in the growth room (FIG. 31).

In the absence of a seed application, the addition of *E. persicina* isolate 76 as a freeze-dried formulation or a non-formulated preparation to the bulk mix in the growth room and cover mix in the glasshouse, significantly reduced disease levels compared to the positive control (FIG. 31). Disease levels were higher or tended to be higher than a seed application, and application to both the seed and potting mix did not enhance efficacy.

Addition of the granule formulation of *E. persicina* to the bulk and cover mixes in the glasshouse and to the bulk mix in the growth room, significantly increased disease levels compared to the freeze-dried formulation and non-formulated preparation (FIG. 31). In the absence of a seed application, disease levels were greater or equivalent to the positive control.

There was no evidence that application of *E. persicina* as a drench after sowing or as a foliar spray 22 DAS reduced the incidence of disease (FIG. 31)

Example 15: Biocontrol Activity in Nursery-Raised Seedling Transplants

The ability of *E. persicina* isolate 76 to prevent symptomless spread of Xcc in cabbage seedlings during transplant-raising in the nursery was investigated in two pot trials conducted under different watering regimes.

For both pot trials, *E. persicina* isolate 76 was applied as a seed treatment to cabbage seed naturally infected with Xcc. Inoculum of *E. persicina* isolate 76 was prepared at a concentration of 5×10$^9$ CFU/mL in non-sterile tap water using freeze-dried cells of this isolate. In the first pot trial, the commercial sticker Peridiam (6.67 mg/mL, Bayer) and Red dye (6.67 mg/mL, Bayer) were added to half of the inoculum. The inoculum was applied to the seed at a rate of 0.6 mL/g seed and dried overnight in a closed but not sealed Petri dish in a laminar flow cabinet. In the first pot trial, seed for the positive control was treated in a similar manner but without the BCA, whereas bare 'untreated' seed was used as the positive control in the second pot trial.

The different seed treatments in the first pot trial were sown following different methods. For Method A, seed treatments with the sticker and dye were sown in 144 cell trays (25 mL per cell) containing potting mix used in a commercial nursery for brassica transplant raising. This potting mix was composed of peat (0.75 m$^3$/m$^3$, New Zealand Growing Media), blinding sand (particle size 1-4 mm, 0.2 m$^3$/m$^3$, North End Sand and Single Supplies), Yara PG Mix 12-14-24 (Orange, 1.2 kg/m$^3$, Yara), Nutricote Micro TE 70 Day (1 kg/m$^3$, Yates), dolomite lime (6.6 kg/m$^3$, Ravensdown), gypsum (1.5 kg/m$^3$, Ravensdown), rock phosphate (0.3 kg/m$^3$, Summit-Quinphos) and Penetraide Re-Wetting Granules (0.5 kg/m$^3$, Searles), and had a moisture content of 15%. For Method B, seed treatments without the sticker and dye were sown in 144 cell trays containing saturated in-house potting mix as described in Example 5. A single seed was sown in each cell to a depth of 10 mm and 14 cell trays were prepared for each of the four treatments in a replicate.

The cell trays were placed in an unheated greenhouse with wind-break cloth ends and those sown in commercial potting mix (Method A) were watered within 20 min of sowing. After 2 wk in the greenhouse, the cell trays were moved to a shade house and grown for a further 4 wk. The trial was arranged in a split plot design with the positive control and BCA seed treatment forming the main plots, and Methods A and B the subplots. Plastic barriers were erected between the main plots to reduce the likelihood of cross-contamination. There were a total of three replicates. The set up of each replicate was staggered at 2 wk intervals with 4 wk between the sowing of the first and third replicate.

In the second pot trial, bare 'untreated' seed and seed treated with *E. persicina* isolate 76 were sown in 144 cell trays containing commercial potting mix and watered within 20 min of sowing. For each replicate, two cell trays were prepared of each treatment. The trial was arranged in a split plot design with four replicates. One tray of each treatment in a replicate was placed in a growth room at the New Zealand Biotron (Lincoln University). Conditions in the growth room cycled from 25° C. light (400 $\mu mol/m^2/s$) for 13 h to 15° C. dark for 11 h, with a constant relative humidity of 79%. The remaining trays were grown outside at the nursery at Lincoln University. The trays were placed in individual enclosures with half of the sides covered in plastic to prevent cross contamination between treatments and the remaining sides and top with vent netting to protect from cabbage white butterfly. Sticky yellow and blue insect traps (Egmont Commercial) were suspended in each enclosure to trap aphids, whitefly and thrips. The set up of the four replicates was staggered at 1 wk intervals. The seedlings were grown for 6 wk.

The trials were watered as required to maintain the potting mix in a moist condition. In the first pot trial this was done manually overhead with a hand-held watering wand until the seedlings were moved to the shade house, where automated overhead micro-jet sprinklers were largely used. The second pot trial was watered over the surface of the potting mix until the seedlings emerged, after that it was watered from below. This involved manually filling the cell tray bases with water and then when the surface of the potting mix became moist, draining them of the excess water.

Liquid fertiliser (diluted 1:200, Agrichem High NK, PGG Wrightson Turf) was applied overhead in first pot trial and from below in the cell tray bases in the second pot trial at weekly intervals starting 14-21 DAS. The chemical spray programme of a commercial nursery as described in Example 11 was followed in the first pot trial to control downy mildew and insect pests. The seedlings were sprayed weekly starting 14 DAS.

For each of the trials, the temperature and relative humidity were recorded every 30 min using a datalogger (Hobo U23 Pro V2, Onset). In the second pot trial, the occurrence of surface moisture and guttation on the plants, and rainfall was recorded daily before 8 am.

Seedling emergence was assessed 7-8 DAS as described in Example 4. The trials were assessed at different stages for black rot symptoms. The presence of characteristic V-shaped chlorotic lesions and blackened veins (Rimmer et al., 2007) were recorded once in the cotyledons and 2-3 times in the true leaves 20-23 and 20-44 DAS, respectively, in the first pot trial. Disease assessments were carried out on the true leaves at the end of the second pot trial (42 DAS).

A random selection of seedlings that had not displayed symptoms were tested for the presence of Xcc and *Erwinia species in the vascular fluid* 43-51 DAS in the first pot trial and 42-46 DAS in second pot trial. Some seedlings with symptoms in the true leaves were also tested. Fluid was extracted from the vascular vessels of the plant shoots following the methods described in Example 6.

The fluid was tested for Xcc by PCR amplification with the primer pairs Zup2311 and Zup2312 (Rijlaarsdam et al., 2004). DNA was extracted from the fluid (50 μL) and amplified with 0.25 μM of each primer using the REDExtract-N-Amp Plant PCR kit (Sigma-Aldrich) following the manufacturer's instructions. Reactions were incubated in a thermal cycler for 3 min at 94° C., followed by 35 cycles of 30 s at 94° C., 30 s at 60° C. and 1 min at 72° C., and then 10 min at 72° C.

Amplification products (10 μL) were separated by agarose gel (1.5% w/v) electrophoresis in 1×TAE buffer, stained with ethidium bromide and visualized by UV transillumination on a VersaDoc Imager (Bio-Rad Laboratories). The molecular weight maker HyperLadder 50 bp (Bioline) was included on each gel for size determination of the products.

The presence of *Erwinia* species in the vascular fluid was evaluated by PCR amplification with the primer pair *Erwinia* 1F (5'-AACCTTCGCTCAGTTTCCAG-3') and *Erwinia* 1R (5'-CCTGACGTTCATCCACCAG-3'), designed to a protein of unknown function in *E. persicina* isolate 76. Reactions were conducted as described above for the Zup primer pair, except that the annealing temperature was raised to 63° C. The product, 263 bp in length, was detected by agarose gel electrophoresis.

Standards of Xcc isolate ICMP 21080 (Landcare Research) and *E. persicina* isolate 76 were included in each PCR run. The inoculum used for these standards was prepared as described in Example 4, only in the second pot trial, the latter standards were prepared from the same inoculum used for the seed treatment. The inoculum was serially diluted 10-fold to obtain standards with concentrations ranging from 10 to $1\times10^6$ CFU/mL.

In first pot trial, the percentage emergence and incidence of Xcc and *E. persicina* isolate 76 was statistically analysed using an ANOVA for a split plot design with 3 (replicate)+2 (main plot)+2 (subplot) and a factorial treatment structure of 2 (seed treatment)×2 (method). The main plots were the seed treatment, either control or *E. persicina* isolate 76, and the subplots the method used to treat and grow the seed. In Method A, the seed treatment was applied in combination with a sticker and dye and grown in commercial potting mix, whereas in Method B, the seed treatment was applied in tap water alone and grown in saturated in-house potting mix. All statistical analyses involving ANOVA were performed using GenStat (VSN International).

The incidence of Xcc in the first pot trial was divided into the percentage symptom infection, latent infection and total disease incidence. The total disease incidence was calculated based on the total number of plants with symptoms and latent infections. The latter was estimated for each treatment in each replicate by multiplying the number of symptomless plants by the proportion of plants with latent infections. A Chi-squared test was conducted to test the hypothesis that latent Xcc infection was related to whether or not Ep76 occurred in the vascular fluid of seedlings treated with this isolate using Method A.

In the second pot trial, the percentage emergence and incidence of Xcc and *E. persicina* isolate 76, and frequency of leaf surface moisture and guttation, was statistically analysed using an ANOVA for a split plot design with 4 (replicate)+2 (main plot)+2 (subplot) and a factorial treatment structure of 2 (location)×2 (seed treatment). The main plots were the location, either the nursery or growth room, and the subplots the seed treatment, either control or *E. persicina* isolate 76.

Emergence was high in both pot trials for seed treated with *E. persicina* isolate 76 (FIGS. 32 and 33).

Disease symptoms were detected in <6% of seedlings in the first pot trial (FIG. 34). Latent infections were more frequent (>24%). Xcc infections were lowest in seedlings grown in commercial potting mix from seed treated with *E. persicina* isolate 76 in combination with a sticker and dye (Method A) but differences were only significant when compared to the positive control grown in saturated in-house potting mix (Method B). Both symptom and latent infections were significantly higher than the other treatments in this positive control. When seed was treated with *E. persicina* isolate 76 in tap water and grown in saturated in-house potting mix (Method B), symptom and latent infections were comparable to those in the positive control grown in commercial potting mix (Method A).

*Erwinia* species were detected in the vascular fluid of 6 week old seedlings (FIG. 35). The occurrence of *Erwinia* was significantly higher in seedlings grown in commercial potting mix from seed treated with *E. persicina* isolate 76 in combination with a sticker and dye (Method A). The presence of *Erwinia* in the vascular fluid did not have an effect on Xcc infection ($\chi_1^2=0.71$, $p>0.05$). Fifty-six percent of seedlings infected with Xcc were also host to *Erwinia.*

In the second pot trial, the level of Xcc infection in cabbage seedlings after 6 weeks was low (FIG. 36). Xcc was detected in the vascular fluid of <4% of positive control plants. Xcc infection levels tended to be lower in seedlings grown from seed treated with *E. persicina* isolate 76. They also tended to be lower in the growth room than the nursery.

*Erwinia species occurred in* <14% of seedlings in the second pot trial (FIG. 36). The presence of *Erwinia* in the vascular fluid was significantly higher in plants grown from seed treated with *E. persicina* isolate 76. Colonization rates were not found to differ between the growth room and nursery.

Example 16: Biocontrol Activity in the Field

The ability of *E. persicina* isolate 76 to protect against natural seed-borne inoculum of Xcc and its impact on disease development in the field was investigated and compared to a second BCA.

Two field trials were conducted at two different sites at Lincoln University (New Zealand). Cabbage seed naturally infested with Xcc was treated with *E. persicina* isolate 76 or another BCA following the methods described in Example 5. Following commercial practices, seedling transplants were raised in the nursery. The treated seed was sown in 144 cell trays containing 25 mL/cell of saturated potting mix (pH 5.8, see Example 5). A single seed was sown in each cell to a depth of 10 mm. The cell trays, arranged following a randomised complete block design, were initially placed in a Durolite-clad greenhouse, before being moved to an unheated greenhouse with wind-break cloth ends and/or a shade house, and then outside to be hardened. The seedlings were watered and fertilised as described in Example 5.

In addition to the seed treatment, the BCAs were also applied to the foliage of seedling transplants raised for the second field trial. *E. persicina* isolate 76 was cultured in 250 mL of LB broth on a shaker at 200 rpm, 30° C. in the dark for 16 h. The concentration of bacterial inoculum was determined by measuring optical density of the culture at 600 nm. Based on this measurement, an appropriate volume of culture was combined with tap water and the sticker/wetting agent Bind-R-Duo (0.8 mL/L, SST New Zealand) to prepare a spray of $1\times10^{11}$ CFU/L. The BCAs were only applied to foliage of seedlings grown from seed treated with the same isolate. The foliage was sprayed to run-off using a piston-pressurised hand sprayer (Solo 456, Solo NZ) with a water rate of 6.5 mL/s.

The seedlings were mechanically transplanted in the field. For the first field trial, the first replicate was transplanted 42 d after sowing (DAS) and the remaining three replicates were, due to inclement weather conditions, transplanted 3 d later. The second field trial was transplanted 41 DAS. Only those seedlings that were likely to survive transplantation were transferred to the field. The field trials were arranged in a randomised complete block design with four blocks and around 600 plants per treatment per block.

Prior to transplantation, fertilizers were applied to the soil to meet the nutrient requirements of cabbage. Herbicides were applied before and after transplantation for weed control. Once in the field, plants were irrigated using overhead sprinklers to maintain normal plant growth. Insecticides were applied as required both in the nursery and field to protect the plants from insect pests.

The field trials were regularly assessed for the occurrence of black rot symptoms. In the second field trial assessments were only conducted after field transplantation.

The percentage emergence and disease incidence was statistically analysed using an ANOVA for a randomised complete block design. Disease incidence was based on the cumulative total of infected plants across successive weeks. The first and last rows of plants in a plot were considered buffer plants and were excluded from the analysis. The average disease incidence was determined by calculating the area under the curve following the trapezoid rule and dividing by the number of days between the first and last assessment.

Seed application of *E. persicina* isolate 76 with or without foliar applications during transplant raising, delayed the progression of black rot in the field (FIGS. 27 and 38).

REFERENCES

Don, R. (2009). ISTA Handbook on Seedling Evaluation. The International Seed Testing Association (ISTA), Bassersdorf.

Hao M. V., Brenner D. J., Steigerwalt A. G., Kosako Y., Komagata K. (1990). *Erwinia persicinus*, a new species isolated from plants. *International Journal of Systematic Bacteriology.* 40: 379-383.

Leslie S. B., Israeli E., Lighthart B., Crowe J. H. and Crowe L. M. (1995). Trehalose and sucrose protect both membranes and proteins in intact bacteria during drying. *Applied and Environmental Microbiology.* 61: 3592-3597.

Lipson D. A. and Schmidt S. K. (2004). Seasonal changes in an alpine soil bacterial community in the Colorado Rocky Mountains. *Applied and Environmental Microbiology.* 70: 2867-2879.

Nayaka S. C., Niranjana S. R., Shankar A. C. U., Raj S. N., Reddy M. S., Prakesh H. S. and Mortensen C. N. (2008). Seed biopriming with a novel strain of *Trichoderma harzianum* for the control of toxigenic Fusarium verticillioides and fumonisins in maize. *Archives of Phytopathology and Plant Protection.* 1: 1-19.

Reddy P. P. (2013). Bio-priming of seeds. In: Recent Advances in Crop Protection, pp 83-90. Springer, Berlin.

Rijlaarsdam A., Woudt B., Simons G., Koenraadt H., Oosterhof J., Asma M., Buddiger P., Roorda P., Grimault V. and de Koning J. (2004). Development of specific primers for the molecular detection of *Xanthomonas campestris* pv. *campestris*. In: *EPPO Conference on Quality of Diagnosis and New Diagnostic Methods for Plant Pests*. Noordwijkerhout, the Netherlands.

Rimmer S. R., Shattuck V. I. and Buchwaldt L. (2007). Compendium of brassica diseases. APS Press, St. Paul.

Schaad N. W., Sitterly W. R. and Humaydan H. (1980). Relationship of incidence of seedborne *Xanthomonas campestris* to black rot of crucifers. *Plant Disease*. 64: 91-92.

Swaminathan J. and Jackson T. A. (2008). A composition to improve delivery of an active agent. Patent Cooperation Treaty (PCT) Application Number PCT/NZ2007/000226; Publication Number WO2008/023999.

Swaminathan J., van Koten C., Henderdon H. V., Jackson T. A. and Wilson M. J. (2015). Formulations for deliverying *Trichoderma atroviridae* spores as seed coating, effects of temperature and relative humidity on storage stability. *Journal of Applied Microbiology*. 120: 425-431.

Tamura K. (1992). Estimation of the number of nucleotide substitutions when there are strong transition-transversion and G+C-content biases. *Molecular Biology and Evolution*. 9: 678-687.

Tamura K., Stecher G., Peterson D., Filipski A. and Kumar S. (2013). MEGA6: Molecular Evolutionary Genetics Analysis version 6.0. *Molecular Biology and Evolution*. 30: 2725-2729.

Wessman P., Hakansson S., Leifer K. and Rubino S. (2013). Formulations for freeze-drying of bacteria and their influence on cell survival. *Journal of Visualized Experiments*. 78: e4058, doi:10.3791/4058.

The invention claimed is:

1. A method for controlling at least one *Xanthomonas* species, the method comprising contacting at least one *Xanthomonas* species with an isolated *Erwininis persicina* strain with activity against at least one *Xanthomonas* species.

2. A method for controlling at least one *Xanthomonas* species on or in a plant, plant part, seed, or soil comprising applying at least one of: i) an isolated *Erwininis persicina* strain with activity against at least one *Xanthomonas* species, and ii) a composition comprising an isolated *Erwininis persicina* strain with activity against at least one *Xanthomonas* species, to the plant, plant part, seed, or soil.

3. The method of claim 2 in which the strain or composition has a direct effect to control the at least one *Xanthomonas* species.

4. The method of claim 2 in which the strain or composition affects induced systemic resistance in the plant, plant part, or seed, to control the at least one *Xanthomonas* species.

5. The method of claim 1 in which the at least one *Xanthomonas* species is at least one of: a) *Xanthomonas campestris*, b) a *Xanthomonas* species that causes black rot, and c) *Xanthomonas campestris* pv. *campestris*.

6. The method of claim 2 in which the plant, plant part, or seed is at least one of:

a) from a Brassicaceae plant, b) from a Brassicaceae plant of the *Brassica* genus, c) from *B. oleracea*, and d) from *B. rapa*.

7. The method of claim 2 in which the at least one strain or composition is applied to a seed hole before planting a seed, and the seed then contacts the at least one strain or composition when it is planted in the seed hole.

8. The method of claim 2 in which the at least one strain or composition is applied to a seed of a plant before planting.

9. The method of claim 8 in which the at least one strain or composition is applied to the seed:

a) in the form of a seed coat, or b) by bio-priming.

10. A method for inoculating a plant, or plant part against at least one *Xanthamoos* species comprising contacting the plant, or plant part, with at least one of: i) an isolated *Erwininis persicina* strain with activity against at least one *Xanthomonas* species, and ii) a composition comprising an isolated *Erwininis persicina* strain with activity against at least one *Xanthomonas* species.

11. The method of claim 10 in which the plant part is a seed.

12. The method of claim 11 in which the seed is coated or bio-primed with at least one of: i) the isolated *Erwininis persicina* strain with activity against at least one *Xanthomonas* species, and ii) the composition comprising an isolated *Erwininis persicina* strain with a ctivity against at least one *Xanthomonas* species.

* * * * *